US012615159B2

(12) United States Patent
Gilchrist et al.

(10) Patent No.: US 12,615,159 B2
(45) Date of Patent: Apr. 28, 2026

(54) SYSTEM AND METHOD FOR DIRECT, STRUCTURED, AND VERSIONED DATA STORAGE AND RETRIEVAL ON A BLOCKCHAIN NETWORK

(71) Applicants: Jamie Brian Gilchrist, Midlothian (GB); Bao Tran, Saratoga, CA (US)

(72) Inventors: Jamie Brian Gilchrist, Midlothian (GB); Bao Tran, Saratoga, CA (US)

(73) Assignee: DataFair Inc., Saratoga, CA (US)

( * ) Notice: Subject to any disclaimer, the term of this patent is extended or adjusted under 35 U.S.C. 154(b) by 0 days.

(21) Appl. No.: 18/754,147

(22) Filed: Jun. 25, 2024

(65) Prior Publication Data

US 2025/0392474 A1     Dec. 25, 2025

(51) Int. Cl.
| | |
|---|---|
| H04L 29/06 | (2006.01) |
| H04L 9/00 | (2022.01) |
| H04L 9/08 | (2006.01) |
| H04L 9/30 | (2006.01) |
| H04L 9/32 | (2006.01) |

(52) U.S. Cl.
CPC .......... H04L 9/3247 (2013.01); H04L 9/0869 (2013.01); H04L 9/0894 (2013.01); H04L 9/3066 (2013.01); H04L 9/3271 (2013.01); H04L 9/50 (2022.05)

(58) Field of Classification Search
None
See application file for complete search history.

(56) References Cited

U.S. PATENT DOCUMENTS

| | | | |
|---|---|---|---|
| 2009/0060197 A1* | 3/2009 | Taylor | H04L 9/0844 380/29 |
| 2021/0117340 A1* | 4/2021 | Trikalinou | H04L 9/0637 |
| 2022/0138286 A1* | 5/2022 | Zage | G06N 3/094 726/26 |

* cited by examiner

*Primary Examiner* — Andrew J Steinle
(74) *Attorney, Agent, or Firm* — PatentPC; Bao Tran

(57) ABSTRACT

The present embodiment discloses a novel process and system for storing versioned data on the Bitcoin blockchain network. This process involves generating derived public keys linked to specific versions and data parts using a key tweaking method, and storing each data part on the blockchain using its associated derived public key. Information about versions and parts are stored in root transactions. An API is provided for managing the stored data, with options for encryption, checksums, data anchoring, timestamping, segmentation, and digital signatures. AIDIOS, a data protocol designed for direct storage and retrieval on the Bitcoin blockchain, is also included. This system allows for significant amounts of data to be stored directly on the blockchain.

19 Claims, 13 Drawing Sheets

FIG. 2

| Field | Bit Range | Bit Count | Description |
|---|---|---|---|
| Version (9) | 0 to 7 | 8 | Identifies the schema version used (currently v1.0.0) to encode metadata associated with each data part (51), critical for data integrity and system updates. |
| Node Type | 8 to 22 | 15 | Determines the type of data node (data or root), essential for navigating the data structure. |
| Total Parts (23) | 23 to 31 | 9 | Indicates the total number of parts into which the file is divided, facilitating efficient data management and retrieval. |
| Part Number (46) | 32 to 40 | 9 | Specifies the position of the data fragment within the overall data structure, critical for reconstructing the data accurately. |
| Checksum (33) | 41 to 72 | 32 | Provides a 32-bit checksum to ensure data integrity, verifies that data has not been altered post-storage. |
| Reserved | 73 to 102 | 30 | Reserved for future use, ensuring flexibility for system enhancements and potential additional metadata. |

FIG. 3

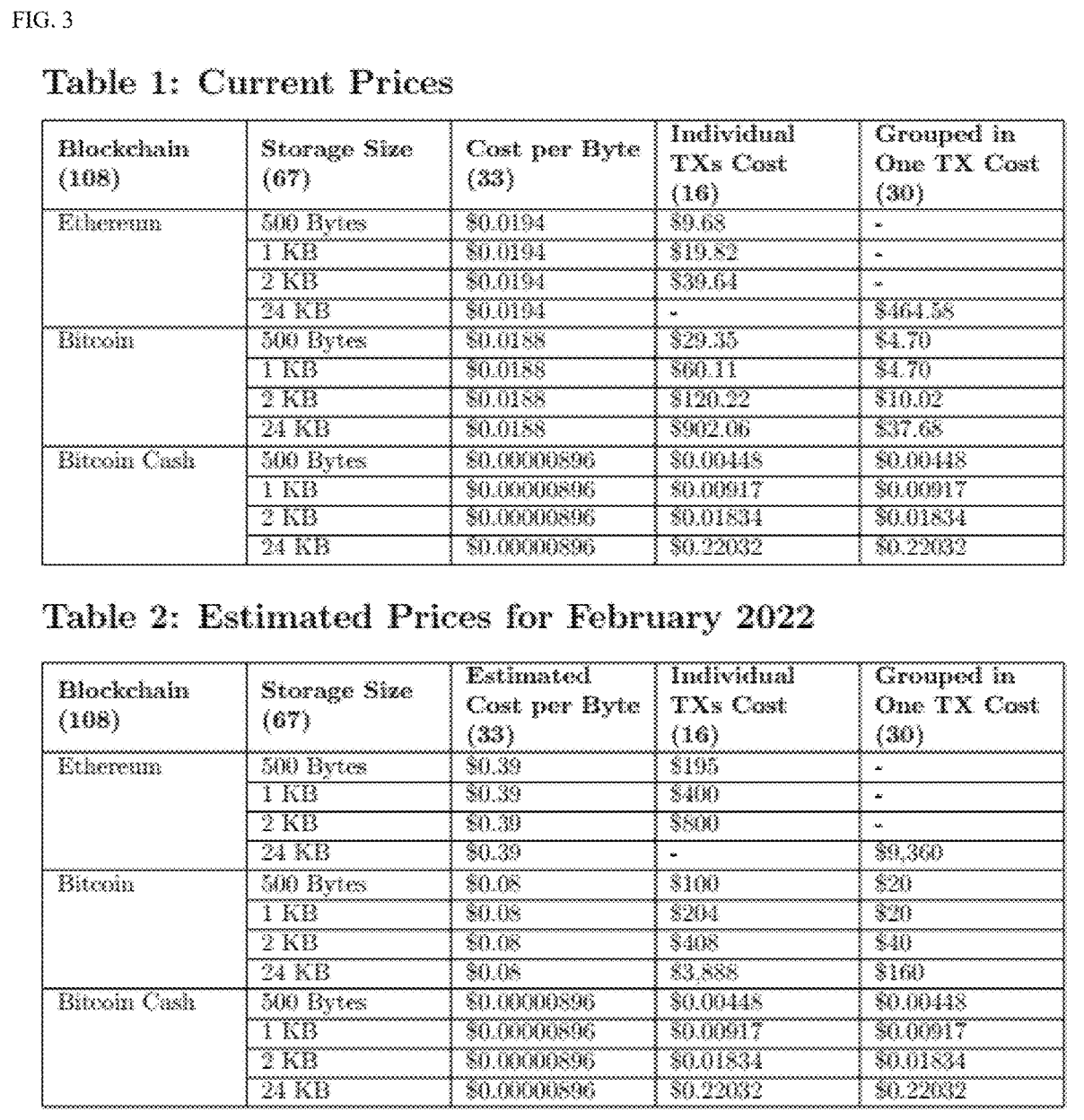

Table 1: Current Prices

| Blockchain (108) | Storage Size (67) | Cost per Byte (33) | Individual TXs Cost (16) | Grouped in One TX Cost (30) |
|---|---|---|---|---|
| Ethereum | 500 Bytes | $0.0194 | $9.68 | - |
|  | 1 KB | $0.0194 | $19.82 | - |
|  | 2 KB | $0.0194 | $39.64 | - |
|  | 24 KB | $0.0194 | - | $464.58 |
| Bitcoin | 500 Bytes | $0.0188 | $29.35 | $4.70 |
|  | 1 KB | $0.0188 | $60.11 | $4.70 |
|  | 2 KB | $0.0188 | $120.22 | $10.02 |
|  | 24 KB | $0.0188 | $902.06 | $37.68 |
| Bitcoin Cash | 500 Bytes | $0.00000896 | $0.00448 | $0.00448 |
|  | 1 KB | $0.00000896 | $0.00917 | $0.00917 |
|  | 2 KB | $0.00000896 | $0.01834 | $0.01834 |
|  | 24 KB | $0.00000896 | $0.22032 | $0.22032 |

Table 2: Estimated Prices for February 2022

| Blockchain (108) | Storage Size (67) | Estimated Cost per Byte (33) | Individual TXs Cost (16) | Grouped in One TX Cost (30) |
|---|---|---|---|---|
| Ethereum | 500 Bytes | $0.39 | $195 | - |
|  | 1 KB | $0.39 | $400 | - |
|  | 2 KB | $0.39 | $800 | - |
|  | 24 KB | $0.39 | - | $9,360 |
| Bitcoin | 500 Bytes | $0.08 | $100 | $20 |
|  | 1 KB | $0.08 | $204 | $20 |
|  | 2 KB | $0.08 | $408 | $40 |
|  | 24 KB | $0.08 | $3,888 | $160 |
| Bitcoin Cash | 500 Bytes | $0.00000896 | $0.00448 | $0.00448 |
|  | 1 KB | $0.00000896 | $0.00917 | $0.00917 |
|  | 2 KB | $0.00000896 | $0.01834 | $0.01834 |
|  | 24 KB | $0.00000896 | $0.22032 | $0.22032 |

FIG. 4

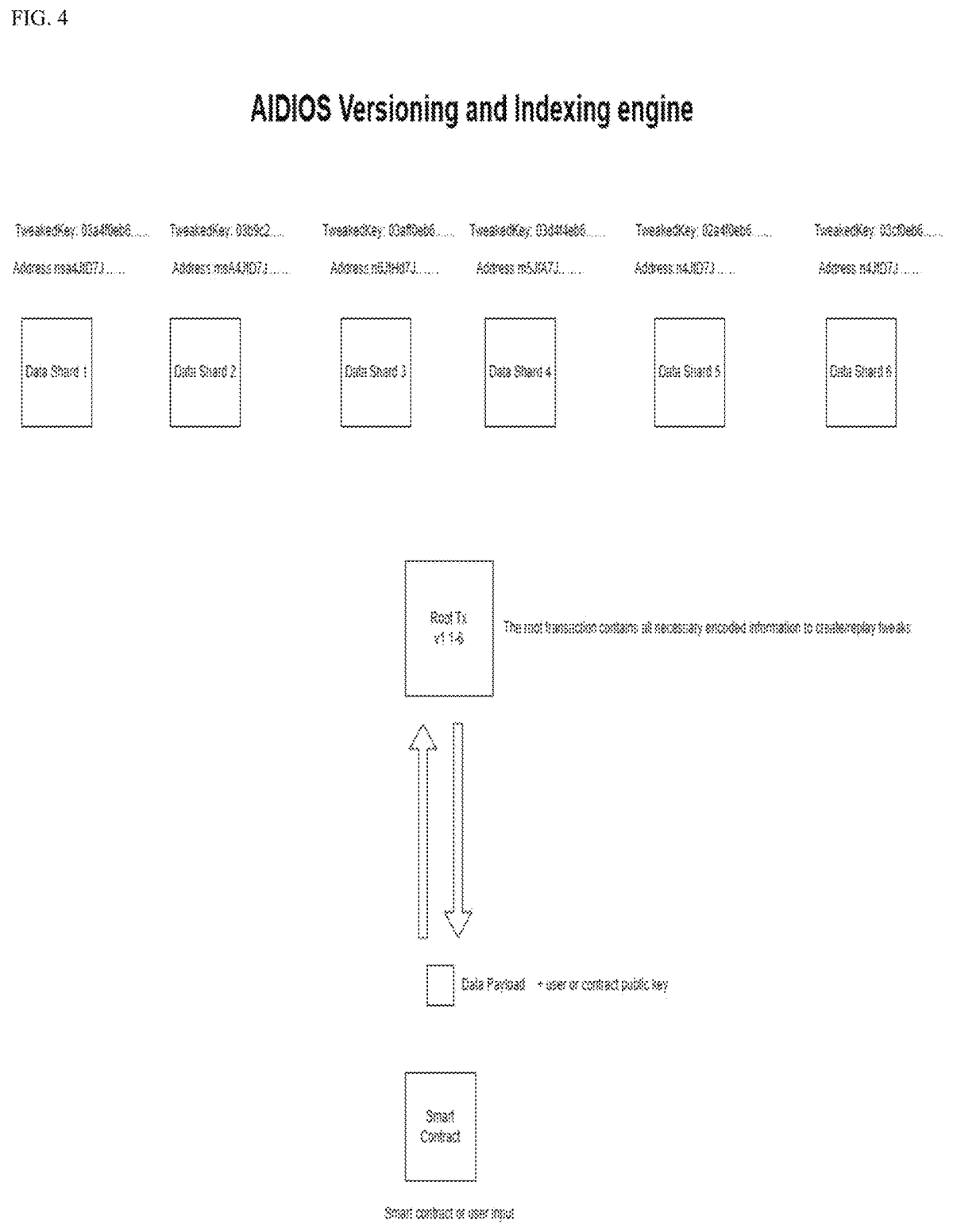

AIDIOS Versioning and Indexing engine

| TweakedKey: 03a4f6eb6 ..... | TweakedKey: 0389c2 .... | TweakedKey: 03af9eb6 ..... | TweakedKey: 03d4f4eb6 ..... | TweakedKey: 02a4f9eb6 .... | TweakedKey: 03c9eb6 ..... |
|---|---|---|---|---|---|
| Address: nsa4J87J..... | Address: nsA4J87J.... | Address: n8JH87J..... | Address: n5J8A7J..... | Address: n4J87J..... | Address: n4J87J ..... |
| Data Shard 1 | Data Shard 2 | Data Shard 3 | Data Shard 4 | Data Shard 5 | Data Shard 6 |

Root Tx
v1 1-6

The root transaction contains all necessary encoded information to create/replay tweaks Data Payload  + user or contract public key Smart
Contract Smart contract or user input

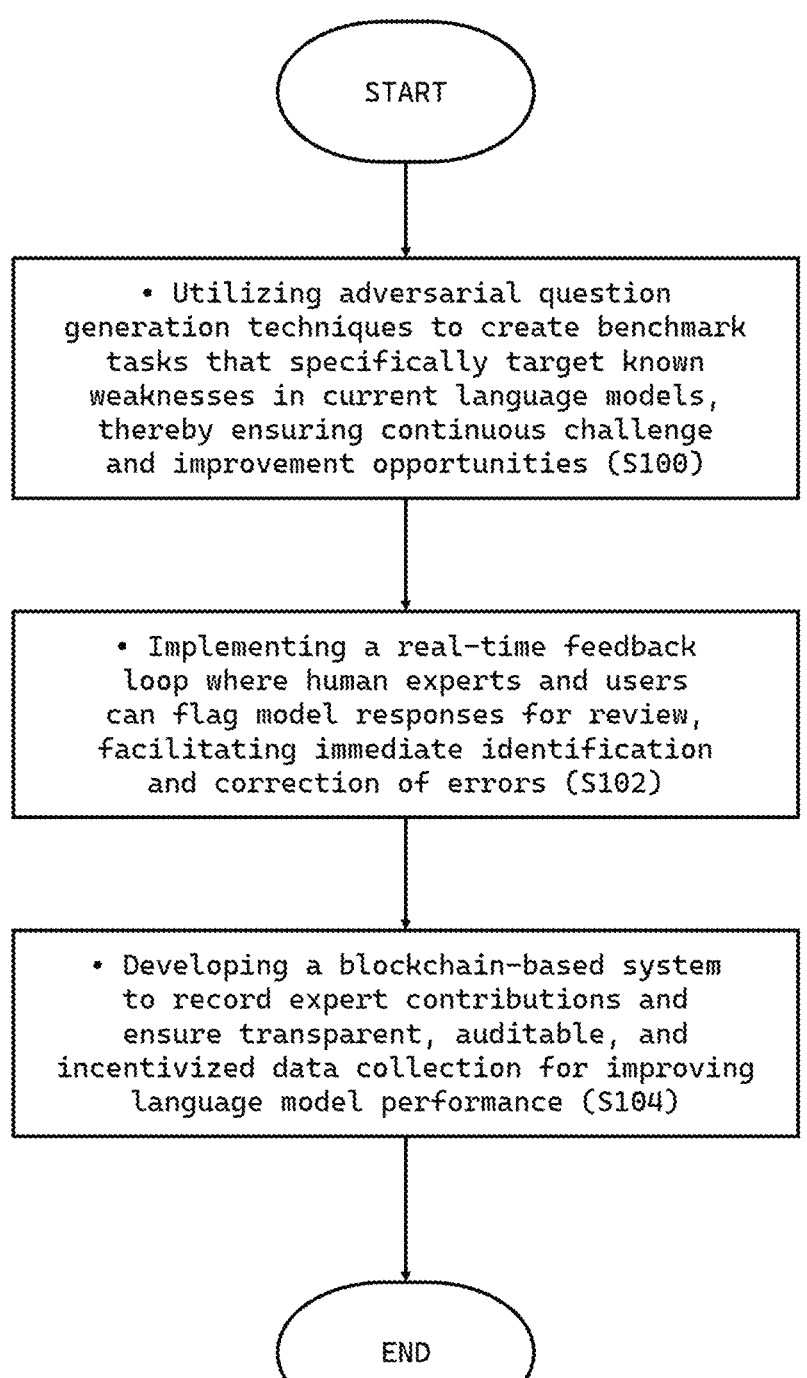

START

• Utilizing adversarial question
generation techniques to create benchmark
tasks that specifically target known
weaknesses in current language models,
thereby ensuring continuous challenge
and improvement opportunities (S100)

• Implementing a real-time feedback
loop where human experts and users
can flag model responses for review,
facilitating immediate identification
and correction of errors (S102)

• Developing a blockchain-based system
to record expert contributions and
ensure transparent, auditable, and
incentivized data collection for improving
language model performance (S104)

END

FIGURE 9

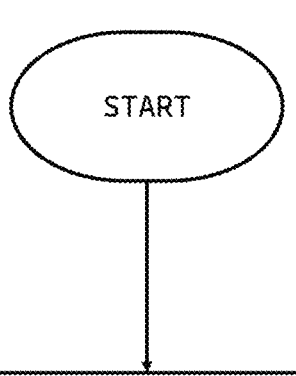

```
Using synthetic data generation
to simulate diverse demographic
scenarios and measuring the model's
responses for potential biases (S300)
```

```
Applying machine learning techniques to
detect subtle and emergent biases that may
not be apparent in individual responses
but are evident in aggregate analysis.
Conducting longitudinal studies on the
model's performance to track improvements
or regressions over time, providing insights
into the long-term effectiveness of different
training and fine-tuning strategies (S302)
```

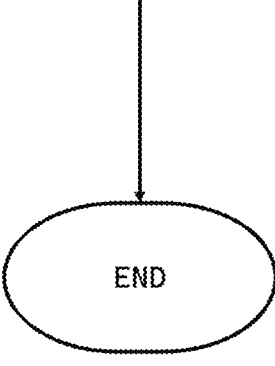

FIGURE 10

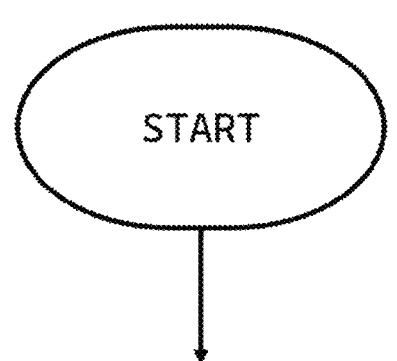
START
- Creating a collaborative platform where multiple experts can review, discuss, and refine model responses, ensuring a consensus on the accuracy and quality of the knowledge base contributions (S400)
- Providing detailed annotations and context for expert answers to enhance the training data's richness and applicability (S402)
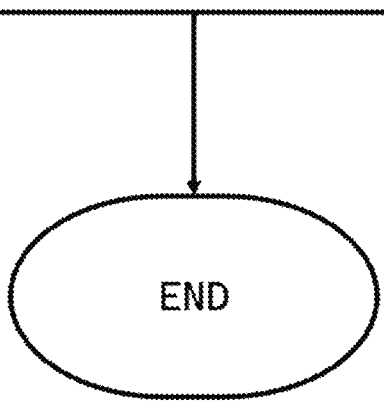
END
FIGURE 11

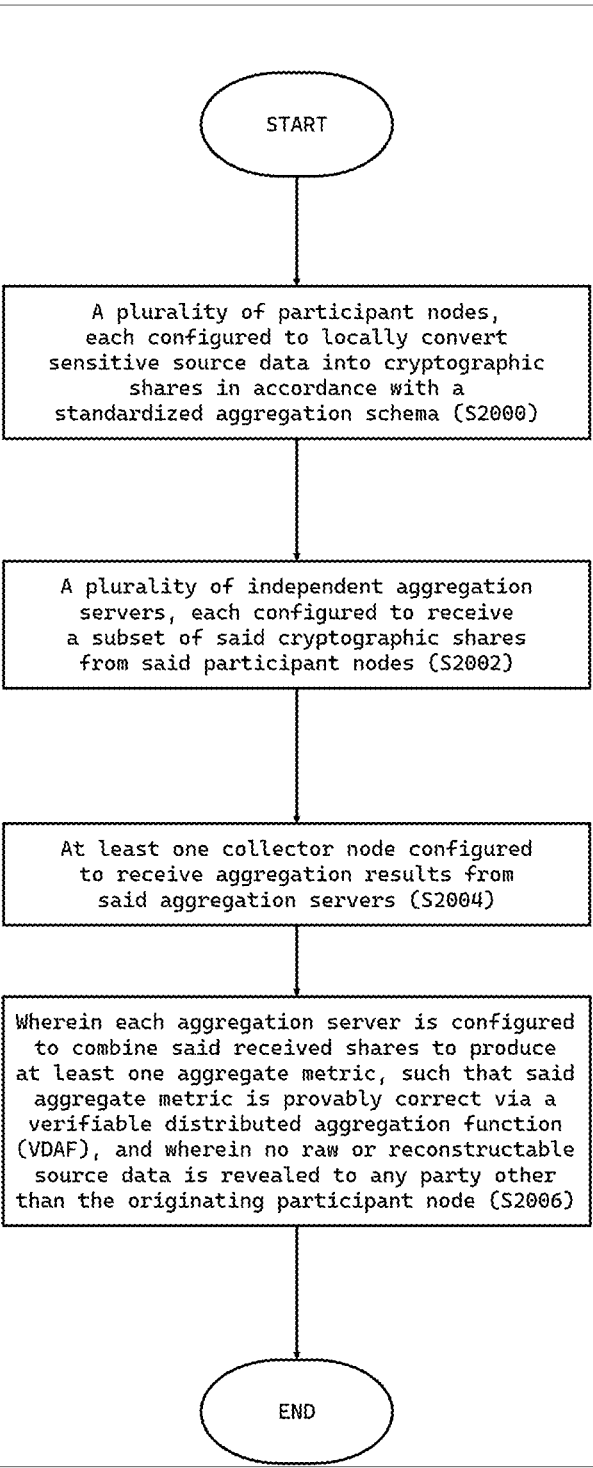

START

A plurality of participant nodes,
each configured to locally convert
sensitive source data into cryptographic
shares in accordance with a
standardized aggregation schema (S2000)

A plurality of independent aggregation
servers, each configured to receive
a subset of said cryptographic shares
from said participant nodes (S2002)

At least one collector node configured
to receive aggregation results from
said aggregation servers (S2004)

Wherein each aggregation server is configured
to combine said received shares to produce
at least one aggregate metric, such that said
aggregate metric is provably correct via a
verifiable distributed aggregation function
(VDAF), and wherein no raw or reconstructable
source data is revealed to any party other
than the originating participant node (S2006)

END

FIGURE 13

SYSTEM AND METHOD FOR DIRECT, STRUCTURED, AND VERSIONED DATA STORAGE AND RETRIEVAL ON A BLOCKCHAIN NETWORK

This application is a divisional application of Ser. No. 18/754,147 which claims priority to Provisional Ser. 63/631,952 filed Apr. 9, 2024, the content of which is incorporated by reference.

BACKGROUND OF THE INVENTION

The rapid growth of artificial intelligence (AI) and machine learning (ML) has led to an exponential increase in the demand for high-quality training data. The rapid advancements in artificial intelligence (AI) and machine learning (ML) have led to a surge in demand for high-quality training data. As AI/ML models become more sophisticated and ubiquitous, the value of data has skyrocketed, with leading technology companies investing heavily in data acquisition and curation. However, the internet might be too small for their plans. Ever more powerful systems developed by OpenAI, Google and others require larger oceans of information to learn from. That demand is straining the available pool of quality public data online at the same time that some data owners are blocking access to AI companies.

AI companies are hunting for untapped information sources, and rethinking how they train these systems. OpenAI, the maker of ChatGPT, has discussed training its next model, GPT-5, on transcriptions of public YouTube videos. Companies also are experimenting with using AI-generated, or synthetic, data as training material—an approach many researchers say could actually cause crippling malfunctions. Some executives and researchers say the industry's need for high-quality text data could outstrip supply within two years, potentially slowing AI's development. The current data ecosystem is plagued by issues of opacity, unfair compensation, and a lack of control for data providers.

SUMMARY OF THE INVENTION

In one aspect, a method to update a learning machine includes utilizing adversarial question generation techniques to create benchmark tasks that specifically target weaknesses in language models to provide continuous challenge and improvement opportunities; providing a feedback loop where experts and users flag model responses for review, facilitating immediate identification and correction of errors; and recording expert or user contributions to ensure transparent, auditable, and incentivized data collection for improving language model performance.

In another aspect, a privacy-preserving data collaboration platform includes a plurality of participant nodes, each configured to locally convert sensitive source data into cryptographic shares in accordance with a standardized aggregation schema. The platform further includes a plurality of independent aggregation servers, each configured to receive a subset of those cryptographic shares from the participant nodes. At least one collector node is configured to receive aggregation results from the aggregation servers. Each aggregation server combines the received shares to produce at least one aggregate metric, where the aggregate metric is provably correct via a verifiable distributed aggregation function, and no raw or reconstructable source data is revealed to any party other than the originating participant node.

Implementations can include one or more of:

2. The platform of claim 1, wherein the cryptographic shares are serialized and transmitted in a stable JSON wire format between participant nodes and aggregation servers.

3. The platform of claim 1, wherein the aggregation schema comprises a publicly shared metrics definition stored in a YAML file specifying at least one aggregation function and corresponding data attributes.

4. The platform of claim 1, wherein each aggregation server independently verifies schema parameters using a cryptographic parameter hash exchanged between participating entities.

5. The platform of claim 1, wherein the VDAF protocol is compliant with an Internet Engineering Task Force (IETF) standard and is implemented using a CIRCL cryptographic library.

6. The platform of claim 1, wherein each participant node operates on a separate physical host within distinct organizations, thereby enabling cross-institution analytics without centralized data storage.

7. The platform of claim 1, wherein the collector node is configured to output only final aggregate values without revealing any individual data set or intermediate aggregation result.

8. The platform of claim 1, wherein the aggregation schema is updateable via a hot-swappable metrics.yaml file to enable dynamic definition of new aggregation metrics.

9. The platform of claim 1, further comprising an application programming interface (API) for schema management and aggregation control.

10. The platform of claim 1, wherein the cryptographic shares are encrypted using a secret-sharing protocol selected from the group consisting of:

threshold secret sharing, additive secret sharing, or any verifiable sharing protocol.

11. The platform of claim 1, wherein each aggregation server is operated by an independent trusted party, and no single aggregation server can reconstruct the participant data.

12. The platform of claim 1, wherein the platform is configured to comply with at least one data privacy regulation selected from the group consisting of:

GDPR, HIPAA, and PSD2.

13. The platform of claim 1, wherein the platform is deployed on a set of machines executing standard Go code and communicating using HTTP protocol.

14. The platform of claim 1, wherein the platform is configured to process one or more aggregation functions selected from the group consisting of:

sum, count, mean, ratio, and conditional count.

15. The platform of claim 1, wherein the platform provides an analytics dashboard visualizing aggregated results to authorized consortium members.

16. The platform of claim 1, further comprising a developer software development kit (SDK) for integration with third-party applications, internet-of-things devices, or software-as-a-service platforms.

17. The platform of claim 1, wherein the platform supports multi-party aggregation for at least one use case selected from the group consisting of:

financial benchmarking, healthcare outcome analytics, AI model telemetry, civic statistics, retail market analytics, and sustainability reporting.

18. The platform of claim 1, wherein the aggregation results are verifiable by any participant via deterministic computation and cross-verification of parameter hashes.

19. The platform of claim 1, wherein the platform comprises a compliance module providing cryptographic proofs of privacy to regulators or auditors.

20. The platform of claim 1, wherein the platform is extensible to apply privacy-preserving analytics to any numeric, categorical, or count-based metric in future schemas.

Advantages of one implementation may include one or more of the following:

Preservation of participant privacy by ensuring that no raw or reconstructable source data is disclosed to aggregation servers or other parties beyond the originating node.

Provable correctness of aggregated outputs via verifiable distributed aggregation functions, enabling lightweight cryptographic assurance that results have not been tampered with.

Reduced trust requirements for any single server or operator because aggregation is performed from distributed cryptographic shares and verified independently.

Improved scalability relative to centralized raw-data collection, because participants send compact cryptographic shares and multiple aggregation servers can operate in parallel.

Lower communication and computational overhead at participant nodes compared to full homomorphic or heavy-weight MPC protocols, allowing resource-constrained devices to participate.

Robustness to server faults and partial network failures through distribution of shares to multiple aggregation servers and recombination at collector nodes.

Resistance to malicious or Byzantine contributors via incorporation of share-verification, redundancy, and cross-server consistency checks that detect and localize misbehavior without exposing raw data.

Support for heterogeneous participant capabilities and flexible deployment topologies (e.g., edge, cloud, hybrid) because share-generation is local and aggregation is decoupled across servers.

Support for multiple aggregation schemas and metrics (e.g., sums, counts, histograms, weighted aggregates), enabling applicability across diverse domains and analytics tasks.

Low-latency or near-real-time aggregation capability due to modular, parallelizable server-side computation and lightweight verification mechanisms.

Auditability and accountability of aggregation events through verifiable outputs and timestamped collection at the collector node, facilitating compliance and records for regulatory review.

Composability with complementary privacy-enhancing techniques (e.g., differential privacy, secure enclaves) and with existing cryptographic primitives, allowing tailoring of privacy/utility trade-offs.

Reduced operational complexity for collaborative workflows by providing standardized aggregation schemas and end-to-end verifiability, easing integration with existing data governance processes.

Enhanced commercial and legal acceptability for cross-organization collaboration by minimizing raw-data exposure while providing independently verifiable aggregate assurances.

BRIEF DESCRIPTION OF DRAWINGS

The accompanying drawings, which are incorporated in and constitute a part of this specification, illustrate embodiments of the invention and, together with the description, serve to explain the principles of the invention.

FIG. 2 is a diagram depicting the encoding of the Status Bits, which are used to efficiently represent metadata about the stored data.

FIG. 3 is a table comparing the storage costs of AIDIOS on Bitcoin Cash versus Ethereum, demonstrating the significant cost-effectiveness of the AIDIOS protocol.

FIG. 4-FIG. 5 show an exemplary AIDIOS engine.

FIG. 8-12 show an exemplary LLM training data system.

FIG. 13 shows a privacy-preserving data collaboration process.

DETAILED DESCRIPTION OF THE INVENTION

Figure 1A:
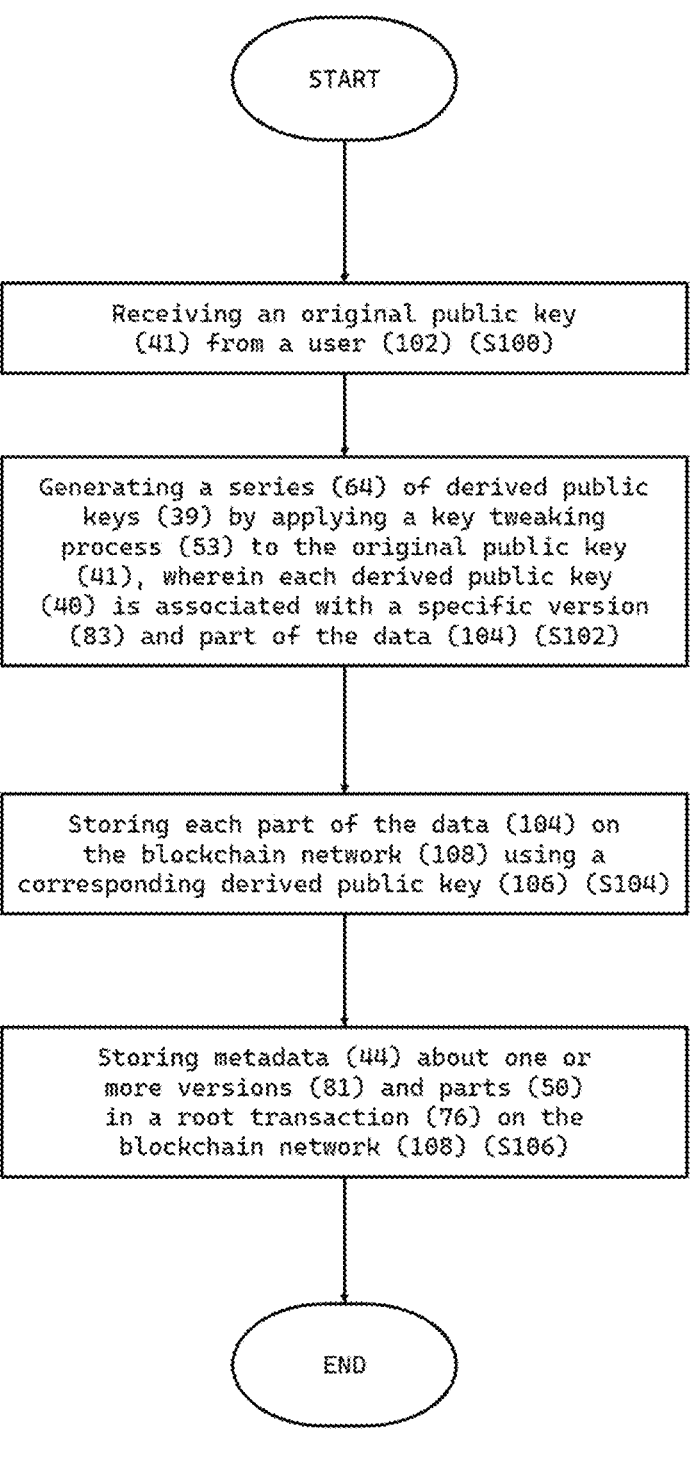
FIG. 1A shows an exemplary flow chart of the AIDIOS system.

In the following paragraphs, the present invention will be described in detail by way of example with reference to the attached drawings. Throughout this description, the preferred embodiment and examples shown should be considered as examples, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

In describing and claiming the present invention, the following terminology will be used in accordance with the definitions set forth below.

AIDIOS (Acyclic Immutable Decentralized Information Optimized Storage): A storage protocol, designed for efficient, scalable, fault tolerant storage and management of records on existing blockchain networks.

Blockchain: A peer-to-peer digital network, with a decentralized and distributed ledger.

op_return: An opcode used in Bitcoin-like to mark transaction outputs as 'provably unspendable', then allowing for the addition of arbitrary data.

KeyWeave: A proprietary I data structure protocol at the core of AIDIOS, inspired by Merkle trees and Directed Acyclic Graph (DAG) technology, allowing for efficient and decentralized storage.

Directed Acyclic Graph (DAG): A graph with no directed cycles, commonly used in data processing, scheduling, and/or data storage solutions.

SHA-256: An industry standard cryptographic hash function producing a 256-bit (32-byte) hash value, most commonly represented as a base64 representation. Status Bits: An intelligent bit-vector developed for AIDIOS to encode essential metadata about the data being stored.

UTXO (Unspent Transaction Output): The output of a blockchain transaction (earlier) that has not been spent and can be used as an input in a new transaction (current).

API (Application Programming Interface): An interface offering protocols and tools, allowing multiple programming languages to communicate with a given software. SDK (Software Development Kit): A set of software tools with libraries that developers use to create applications for specific platforms.

SAN (Storage Area Network): A fast network providing access to centralized, block-level data storage.

NAS (Network-Attached Storage): A multi protocol file sharing server, allowing multiple clients to connect to store and retrieve information, typically as a logically mounted volume.

Decentralized Storage: A method where data is stored across a network of decentralized nodes rather than centralized servers or systems. This is different from 'distributed' storage, and the concepts are unique to blockchain.

Bitcoin Cash (BCH): A fork of Bitcoin. It increases the op_return size to 220Bytes, and increases the block size (to 32 MB), allowing more data to be stored and transactions to be processed.

Ethereum: An alternative open-source, blockchain-based platform featuring smart contract (Turing complete) functionality.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

The present one embodiment describes a system, more specifically the AIDOS (Acyclic Immutable Decentralized Information Optimized Storage) system, designed to efficiently store and manage a wide range of data categories on existing blockchain networks.

The AIDIOS system allows for the secure and efficient management of safety-critical data such as healthcare records. The system ensures high-level integrity, confidentiality, and availability of medical data, including but not limited to, patient records, medical research data, and pharmaceutical data. The provisioning of versioned data storage ensures that any alterations in the healthcare records are effectively tracked, allowing for the storage of differential updates and not just the complete latest version.

Bitcoin limitations are addressed with AIDIOS, a data protocol that enables the direct storage and retrieval of substantial data on the Bitcoin blockchain itself. AIDIOS (Acyclic Immutable Decentralized Information Optimized Storage) is a novel decentralized storage protocol (complete with API), designed to store & access versioned data on existing blockchain networks. This storage protocol is engineered to integrate seamlessly with existing blockchain networks like Bitcoin, Bitcoin Cash, Litecoin and more. This is achieved through a proprietary data protocol called Key-Weave, which facilitates on-chain indexing and versioning of data without external database dependencies.

These options offer great flexibility for developers when choosing the most suitable storage solution, based on cost, availability and overall immutability. For example, BTC is widely accepted as the most established, decentralized and trusted network protocol. This whitepaper outlines the technical architecture of AIDIOS, its operational efficiency and potential applications (within high stake environments).

FIG. 1A shows an exemplary flow chart of the AIDIOS system. This exemplary method stores versioned data (23) on a blockchain network (108). This process begins with the receipt of an original public key (41) provided by a user (102). The generation of a series (64) of derived public keys (39) then ensues. This is accomplished by applying a key tweaking process (53) to the original public key (41). It is noteworthy that each uniquely derived public key (40) is associated with a distinct version (83) and a specific part of the data (104).

In the subsequent phase, each individual part of the data (104) is stored on the blockchain network (108). This storage uses a corresponding derived public key (106). The encoding of the versioned data employs a compact representation known as Status Bits, which serve to efficiently encapsulate the multiple versions and parts into a single root transaction (76). Therefore, the root transaction acts as a main reference point for retrieving the data, which itself contains the robust metadata (44) about one or more versions (81) of the data and their respective related parts (50).

In one embodiment, AIDIOS uses a data structure protocol called KeyWeave. KeyWeave allows for the efficient storage/retrieval of versioned data across multiple transactions. The structure ensures both data integrity and efficient data retrieval. KeyWeave works by tweaking an original (supplied) public key in such a way as to encode versioning, metadata and indexing information about the data into the blockchain framework directly. This system allows for scalable storage/retrieval of data across many (delta-encoded) parts, while abstracting all the details and nuances from the user, providing a seamless file or object storage and retrieval method.

Figure 1B:
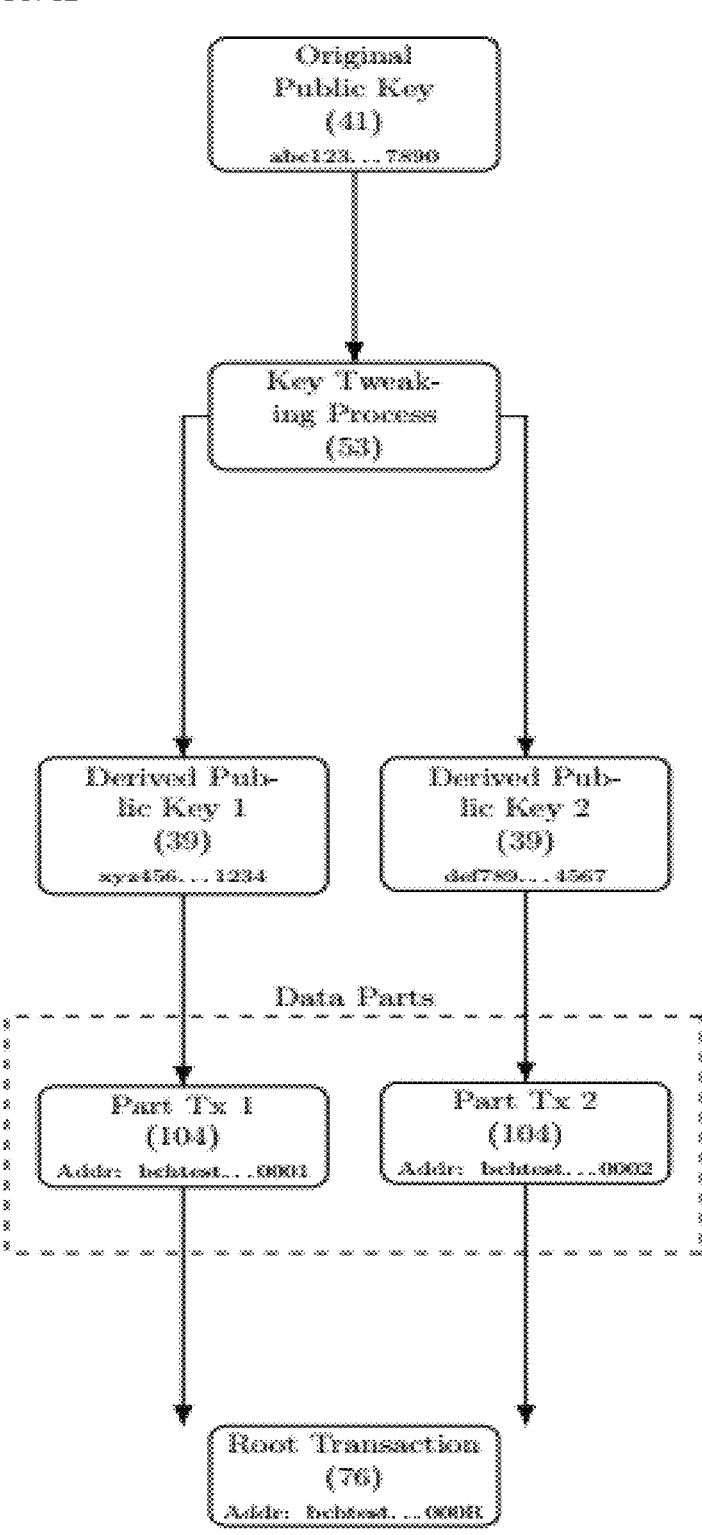
FIG. 1B is a high-level illustration of the AIDIOS Key-Weave module, showing the various components and transactions involved in the storage and retrieval of versioned data.

FIG. 1B shows a high-level illustration of the AIDIOS KeyWeave system. This diagram shows the processes involved in the storage and retrieval of versioned data. Tweaked keys (39) are derived from the original public key (41), modified by version and part identifiers, leading to separate transactions for each part (104). The root transaction (76) consolidates all parts into a single record. Each key and address is truncated for clarity. As an additional feature, the addresses which are created by AIDIOS, are fully owned by the original key pair holder. We achieve this without having access to any sensitive information, and our steps can be repeated on the user's private key (locally and offline) to generate the new keys for these addresses. This novel method ensures that we can produce valid addresses (spendable) for the user, but never have access to any private keys in the process.

Keyweave Ownership and Security: One of the significant features of KeyWeave is that users retain full ownership of their data. The addresses generated through the tweaking process are intrinsically linked to the user's original public key. This means, while AIDIOS handles the data storage, the control and ownership remain with the user. Importantly, AIDIOS does not require access to the user's private key. The tweaking process can be replicated by the users on their private key (while offline and completely secure), allowing them to generate the same set of private keys themselves which are connected to said public keys and addresses.

KeyWeave Scalability: KeyWeave is designed for scalability, accommodating large (in the context) datasets, by segmenting them into fully indexed and rapidly retrievable delta encoded shards. In all cases, a single root transaction contains the condensed form tweaking sequences required to generate all the public keys, thus addressing and rebuilding the data. In order to access the data, the original public key must be supplied, without this it is not possible (by design) for anyone to locate the data shards from the root alone. This is because although the root contains the tweaking information required, it must be applied to the original public key used when storing. By utilising KeyWeave, AIDIOS can address common challenges in blockchain data storage, such as limitations of holistic versioned and fully (on-chain) indexed data systems. With AIDIOS more context can be included (such as being in structured json format), or storing small data sets directly, for ultimate persistence.

How KeyWeave Works:

Key Tweaking:

Involves altering a base public key using additional data (version number, metadata, and identifier) to produce a unique, derived public key, and subsequently, a Bitcoin address.

Example: Base public key 3021f . . . is tweaked to produce a unique new key 023d. . . . And subsequent address mzAfr2 . . .

Versioning and Indexing of Data Parts:

Each file version is stored with a unique identifier.

A file is split into several parts(depending on network constraints), and each part is indexed.

Example: File Version 1 is split into 3 parts, indexed (expressed in simple form) as 1_1, 1_2, 1_3.

Root Transaction and OP_RETURN Data:

The root transaction contains metadata about file versions and their parts.

OP_RETURN data in the root transaction is a condensed representation of all parts and versions.

For multiple versions and parts, the OP_RETURN data encapsulates this complexity in a concise format.

The purpose of tweaking a public key is to create a new public key that is related to the original, but appears completely random to anyone who doesn't know the message used to create the tweak (the preimage).

The tweaked public key P' is calculated as follows:

$$P' = P + H(P\|m)*G$$

where:

P is the original public key.

m is the message or additional data (in this case the data versioning, delta encoding, metadata and associated checksums).

H is a cryptographic hash function (e.g., SHA-256).

G is the generator point of the elliptic curve.

‖ denotes concatenation.

Blockchain networks (like bitcoin) are utilised for use cases outside of finance already, with services such as Proof Of Existence and many others. However, often data is a reference only (via a single hash) of data stored off-chain somewhere, acting as a timestamped anchor. Some data (very critical data) requires absolute guarantees with regard to data integrity, persistence and availability.

FIG. 4 shows what the KeyWeave system looks like at a high level. Each of the components (nodes) are transactions. Each data part (or shard) has a dedicated Public Key, Public Address and a transaction, with a singular root node which encapsulates all the information required to run the sequence of tweaks needed to index the entire data set. One of the unique properties of this system is that each of these addresses is owned by the original key holder. The Public key supplied: The user can apply the same tweaks as we have to their private key, enabling them to spend from the address, even though AIDIOS was never given any sensitive information. The example of FIG. 4 shows a data structure containing 6 data shards, and a root transaction.

Figure 5:
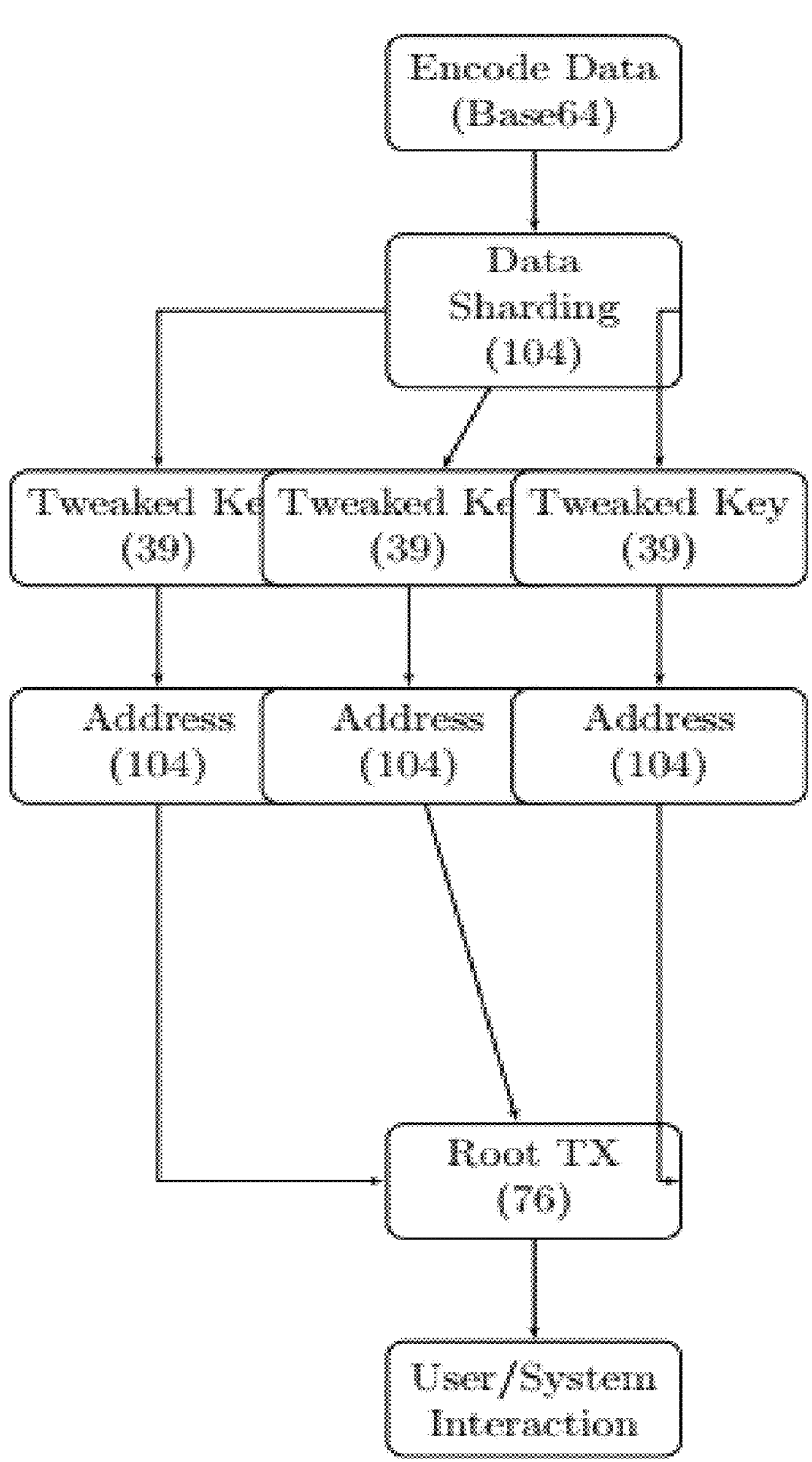

FIG. 5 illustrates the encoding of data into Base64, its sharding and storage under unique addresses via tweaked keys (39), coordinated through a root transaction (76). Interaction with the AIDIOS system, through user or system queries, utilizes the user's public key to automatically identify associated root transactions without needing to remember or manually enter them.

By utilizing KeyWeave, AIDIOS can address common challenges in blockchain data storage, such as limitations of holistic versioned and fully (on-chain) indexed data systems.

With AIDIOS more context can be included (such as being in structured json format), or storing small data sets directly, for ultimate persistence.

The system can use the blockchain for data storage by conveniently compartmentalizing information into several parts and versions, enhancing scalability and accessibility. Additionally, by connecting each part of the data to distinct public keys connected to an original public key supplied by the user, the method enhances user control over the data.

Moreover, this method enables the system to handle voluminous data by storing only differential changes in subsequent updates, thus optimizing storage efficiency as well. This capability also makes retrieval cost-effective as the appropriate part of data aligned with a specific derived public key can be directly fetched instead of retrieving the entire data every time. Furthermore, data integrity is maintained with the use of a 32-bit SHA-256 checksum.

The method addresses several current challenges in blockchain data storage, including size limitations and lack of holistic versioned and fully indexed data systems. It offers a more compact, scalable, versioned, and user-controlled system for data storage and retrieval on a blockchain network.

In the disclosed one embodiment, the key tweaking process (53) functions as a unique mechanism for generating a derived public key (39), providing an additional layer of security and verifiability to the data stored within the system (72). This process initiates with the original public key (41). The original public key (41) is then concatenated with the version (80) information, part information, and metadata information (34).

Following the concatenation process, the concatenated string is submitted to a cryptographic hash function (29). Cryptographic hash functions are mathematical algorithms that take an input and return a hash value of a fixed length. In the present one embodiment, the SHA-256 cryptographic hash function is used, which is renowned for its robust security credentials.

The output from the cryptographic hash function (29) is a unique set of characters, referred to as a derived public key (39). This derived public key (39) is intrinsically linked to the original public key (41), but appears completely random to any observer that does not know the exact information used to create the tweak, including the specific version (80), part, and metadata information (34).

Serves a dual role. Firstly, it introduces an additional layer of security, as it obscures the original public key (41) thus making it harder for unauthorized entities to associate the stored data with its original owner. Secondly, it facilitates a seamless and efficient data retrieval process by decoupling the versioning, indexing, and metadata storage functions from the storage and retrieval of the non-binary data itself, thereby optimizing the system's (72) storage space usage and operational efficiency. The system provides a secure, efficient and effective method of maintaining data integrity and versatility in a blockchain-anchored data storage and retrieval system, contributing to a more robust storage protocol for this application.

Application Programming Interface (API) referred to as numeral (6) enables interaction with the system and perform functions related to storing, retrieving, and managing the versioned data (23). Typically, APIs offer a set of protocols, routines, and tools for building software and applications. In the context of the present one embodiment, this API (6) primarily facilitates communication and interaction with the existing blockchain network (108).

As used herein, an endpoint refers to a touchpoint of communication or interaction in a network. In the present context, the endpoints (25) represent paths where the API can access resources in the system. Each endpoint facilitates a specific function such as storing new data, retrieving existing data, or managing the versioned data (23). One endpoint, for instance, could be designed for receiving data to be stored in the blockchain. When data is transmitted to this endpoint of the API (6), the system would process that data, determining its respective version according to predetermined rules or sequences in the system (72), and then store that data within the blockchain network (108) at an associated address (3).

Another endpoint could facilitate the retrieval of the versioned data (23). When a request is made at this endpoint with a specific version, the API processes the request, identifies and fetches the corresponding data from the appropriate location within the blockchain network (108), and then returns the requested data. Endpoints can facilitate the management of the stored data. For instance, one endpoint might be designated for updating the version of the stored data. When an update request is made on this endpoint, the API would allow the system to reference the original data, apply the changes, and store the updated data as a new version in the blockchain network (108).

The various endpoints (25) serve as an interface for external entities to communicate with the system (72), and perform various operations on the versioned data (23) stored on the blockchain network (108). This mechanism efficiently provides direct, structured, and versioned data storage and retrieval in a secure and decentralized manner.

The present one embodiment discloses a system involving a compact representation (59) of multiple versions (80) and parts (50) utilizing an innovative versioning and indexing scheme (62). This scheme is uniquely designed to contribute to efficient data handling and optimal utilization of storage resources.

The versioning function of the scheme (62) enables dynamic tracking and management of multiple data versions (80). Each unique version of data is tagged with a distinct identifier in the system to create an extensive version history, allowing for an efficient recall or rollback operations if necessary. Through this differential versioning mechanism, only the changes from the preceding versions are stored. This approach, as opposed to storing the entire data set for each version, optimally reduces data redundancy and saves significant storage space.

The indexing process of the scheme (62) systematizes the data parts (50) in order. Indexing plays a crucial role in data partition management and quick data retrieval. Each unique data part is allocated an exclusive index, creating a path to its location in the storage. Even when dealing with voluminous data sets encompassing considerable data parts (50), the indexing process allows for swift access to specific data elements.

The combined versioning and indexing scheme (62) assures data integrity and provides a compact representation (59) of the versions (80) and parts (50). It encapsulates a massive amount of the information about multiple versions and parts into a compact format. Given its design, the system can easily scale to manage an immense amount of versions (80) and parts (50) without a significant increase in the size of the representation. This compact yet comprehensive rendition brings about noteworthy efficiency and robustness into the system.

This versioning and indexing scheme (62) serves as a conduit to present a meaningful connection between complex data parts (50) and their versions (80) making the overall system more efficient and robust.

The patent detailed description of the concept involves a compact representation (59) that employs a specific format (28) to encode information (32) pertaining to multiple versions (82) and parts (50) of data. The compact representation, in this context, helps in optimizing the storage and retrieval process, making it more efficient and manageable.

This format utilizes unique identifiers for each version and part of data stored within the system. In the provided example, "V1" represents Version 1 (79) and "V2" denotes Version 2 (49). The "P" following the colon for each respective version indicates the parts associated with those versions. This encoding allows for a more precise and efficient organization of data, resulting in reduced complexity and improved readability.

The compact representation and specific format used in this system permits a high level of scalability. It is designed to cater to an extensive number of parts and versions, regardless of their size or complexity. Moreover, this format easily allows information concerning multiple versions (82) and parts (50) to be condensed into a compact yet comprehensive representation (59).

This combination of compact representation and specific format encoding forms a critical aspect of the overall system's function, ensuring that information pertaining to different versions and parts of data is carefully organized, easily retrievable, and well-managed. This overall structure thus contributes significantly to the system's efficiency, user accessibility, and data integrity.

The present one embodiment utilizes an intelligent bit-vector, referred to as Status Bits (9), to efficiently encode metadata (44) related to each data part (51) within the system. An integral part of the AIDIOS protocol, Status Bits (9) serves as a compact yet comprehensive means to represent important information about each data part (51) in a manner that facilitates its storage, retrieval, and versioning.

Each element of the Status Bits (9) vector is specifically mapped to a distinct metadata attribute. This unique mapping enables a compact representation of the metadata (44) without any loss of information, thereby making the storage and retrieval processes more effective and seamless.

Perform the vital task of recording metadata information (44) such as version (80) and part number (46) for each data part (51). This recorded information plays a critical role in ensuring the integrity of the data as the versions (80) help in tracking and managing the variations of the data parts while the part numbers (46) aid in the organization, classification, and retrieval of the data parts.

And part number (46), Status Bits (9) also encodes checksum information (33). The checksum information (33) provides an extra layer of data integrity as it ensures that the data part has been stored without any alteration or corruption. This is done by utilizing a cryptographic hash function such as SHA-256 where a hash value is calculated for each data part (51) and is stored as the checksum information (33). This stored checksum can be used at a later stage to verify the integrity of the retrieved data part by comparing it with a freshly calculated hash value of the data part.

Serve as an efficient coding system that encapsulates essential metadata (44) about each data part (51) in the AIDIOS system, aiding in effective data storage, retrieval, and versioning, thereby enhancing the overall performance and reliability of the system.

The present patent describes an inventive system and method that utilizes one or more status bits (10) to provide a compact yet comprehensive representation (60) of metadata (44) associated with each data part (51).

In this system, status bits, a form of intelligent bit-vector, are used to hold essential information about each part of the retained data (51). These status bits (10) are implemented in such a way to ensure a compact solution that represents sufficient information about the retained data for operational and retrieval purposes. Information about the specific data part (51) can include but is not limited to the version of data, part number, type of data, and associated checksum information (33). Given the diverse nature of the metadata, a compact representation is desirable as it economizes space and eases data handling.

The utilization of status bits (10) offers a compact means to encode such diverse metadata information. Each status bit represents some characteristic of the data part. The arrangement of these bits provides a detailed yet consolidated picture of the data without requiring extensive storage or processing power.

The ingenuity of this approach lies in its capacity to represent critical data about a file part or several file parts in a format that is both concise and rich in information. This efficient handling of metadata (44) is essential for effective data management and contributes significantly to the seamless integration (35) of the present system.

Furthermore, the compiled information existing in the status bits (10) can be harnessed during the data retrieval (61) process. This information aids in reassembling the data in the correct format during retrieval and maintains the integrity of the data structure.

In summary, this patent exhibits a unique strategy for managing and storing metadata information (44) by employing status bits (10) to create a compact yet comprehensive representation (60) of each data part (51) in a storage system. This method optimizes data handling and access performance, significantly enhancing the system's efficiency and user experience.

In this one embodiment, a unique feature includes the procedure used by the user (102) to generate derived public keys (39) and associated addresses (3). A key tweaking process (53) is employed in which the user applies it to their original private key (38).

Does not have access (2) to the private key (37) during this procedure. Therefore, it ensures that the user retains control and security over their data. The derived public keys (39) are based on the initial user's public key, implying that though AIDIOS manages the data storage, the control and ownership of the data remain with the user.

In essence, the tweaking process includes modifying the base public key using additional metadata including identifiers like version number and part number. The unique derived public keys then contribute to generating unique Bitcoin addresses.

This approach of tweaking a public key enables the creation of a new public key connected to the user's original key, but appears completely arbitrary to anyone who does not have knowledge of the tweak used to create it. Completing this process without having access (2) to any sensitive data further promotes the security and privacy of the system.

The concept of tweaking the public key plays a pivotal role in creating and linking new and unique public keys to the user's original public key without breaching the security of the private key in the process. This process significantly enhances security by providing new, seemingly arbitrary public keys that are intrinsically linked to the user's original public key, thereby enhancing data privacy.

This key tweaking process ultimately provides dual advantage by ensuring user's data security and privacy while simultaneously ensuring that every related transaction is owned and controlled solely by the user, thereby creating an additional security layer.

According to the claimed one embodiment, the system incorporates options (48) to provide enhanced security to users (102) in the data storage process. These options are designed to employ advanced cryptographic measures, more specifically, encryption methods, which the users can opt for before storing their data (104) on the blockchain network (108). This encryption process can serve as an additional layer of data security, ensuring that the data remains secure and confidential throughout the data transaction and storage process.

The encryption process can utilize various encryption methods, including symmetric and asymmetric encryption algorithms, which the users can choose from based on their specific requirements. The system provides a user-friendly interface that prompts the user to choose their preferred encryption method. Once chosen, the algorithm will convert the users' data (104) into cipher text that cannot be understood or accessed without the correct decryption key.

During this encryption and subsequent storage process, the system is designed to make sure that the user's data (104) is entirely safe from any unauthorized access or breach. If an unauthorized entity tries to access the data without the correct decryption key, the data will remain unreadable, thus maintaining the user's data confidentiality throughout.

Moreover, the encryption key, in case of symmetric encryption, or the private key, in case of asymmetric encryption, remains solely with the user (102). The system doesn't have access to these keys ensuring that only the user can decrypt the encrypted data, reinforcing the data safety.

By providing these encryption options (48), the system significantly enhances the security measures in place for users' data (104), making the system more robust and reliable. These encryption options can be implemented seamlessly with the aid of existing cryptographic libraries and can accommodate future advancements in encryption technology as well.

The described system can also be applied to manage educational records. This comprises student performance data, curriculum data, and administrative data, among others. The secure and efficient handling of this data contributes to the streamlining of educational processes and record keeping.

The AIDIOS system can manage financial data, including but not limited to, transaction data, trading data, banking data, and financial statements. The system offers the advantage of storing and retrieving structured and versioned data and providing seamless integration with existing systems in the financial sector.

The system's application extends to manage land registration data, providing a permanent, public, and tamper-proof land registry improving transparency and reducing disputes related to land ownership.

AIDIOS can be utilized in developing decentralized voting systems. These systems can ensure a secure, transparent, and efficient voting process where data integrity is maintained, and the versioned data storage capabilities allow for an immutable record of changes or updates.

The use of AIDIOS in content management can ensure the secured and efficient storage and retrieval of digital content. This can streamline the processes of content creation, editing, and publishing in addition to facilitating an efficient content versioning and indexing scheme (62).

Decentralized identity documents (24): By utilizing AIDIOS, it is possible to create a secure and tamper-proof system for managing decentralized identity documents. These documents can securely link identity information to a blockchain address, ensuring the confidentiality and integrity of identity information.

The AIDIOS system may be utilized for managing environmental control data, including data related to environmental monitoring, pollution control, and resource management. This could provide a secure, reliable, and efficient way to store and access data critical to environmental management and policy-making.

By employing AIDIOS, each of these use-cases can be securely managed and efficiently accessed through extended capabilities of blockchain technology, offering significant improvements in areas of data integrity, accessibility, and security. Thus, the system enhances the quality and reliability of data management in various crucial sectors.

In the disclosed system, a specific method is utilized to ensure data integrity (36), utilizing SHA-256 checksums (16). The SHA-256 checksum is a widely acknowledged cryptographic hash function that produces a unique, fixed-size 256-bit (32-byte) hash value for each input data set (18). It is commonly represented in a base64 format and provides a reliable way to verify the integrity of data.

Due to the system's ability to handle vast data volumes, such as files or objects of considerable size (67), the requirement of storage space (68) is significant. The utilization of SHA-256 checksums (16) inherently increases the necessary storage space for each data set (18) as it creates an extra hash value for each stored datum (21). However, the system judiciously implements a trade-off (75), utilizing only the first 32 bits of the SHA-256 checksum (16)

The choice to use only 32 bits of the hash value is a strategic compromise between the level (42) of assurance (8) and storage space (68). While a full 256-bit checksum would provide a high level of certainty about data integrity, it would require excessive storage space. On the other hand, a 32-bit checksum provides sufficient data integrity assurance while significantly reducing the need for storage space (68). The probability of collision, i.e., two different inputs having the same hash, is near-zero even for a 32-bit checksum, thereby providing a reasonable assurance (8) level (42).

In effect, the system efficiently balances the need for data integrity assurance (8) with the practicalities of storage space (68) management. By applying an intelligent use of SHA-256 checksums (16), the system ensures the authenticity and accuracy of every stored item while keeping the storage requirements compact and minimal. Thus, maintaining the economical and practical efficiency of the data storage system.

The present disclosure introduces a novel system for segmenting datasets (18) into fully indexed and rapidly achievable delta-encoded shards (65).

One aspect of the one embodiment involves dividing datasets (18) into multiple sections or portions known as shards (65). This segmentation is carried out in a way that each shard (65) contains a subset of the data (5) contained in the dataset (18). The segmentation facilitates efficient handling and retrieval of data because operations can now be performed on these smaller subsets.

Key to the process is the use of delta-encoding for each shard (65). Delta encoding is a technique where instead of storing or transmitting entire data items in each shard (65), one only maintains or sends changes or updates (78) in the data relative to some reference. This reference can be an earlier version (80) of the same dataset part (51) or some other predefined reference state. This delta-encoding significantly reduces the size of each shard (65), thus saving storage space (68) and making data transfer faster.

Are divided into delta-encoded shards (65), they are then fully indexed. Indexing involves assigning each shard (65) an index (part number, 46) or set of indexes that uniquely identify it. This indexing allows for the quick and efficient retrieval of any specific shard (65) because one can directly access the shard by querying its index.

In a way, the present system works like a highly efficient database system for storing and retrieving data on the bitcoin blockchain (13). When a record (55) needs to be fetched or updated, the system can rapidly find and retrieve the relevant delta-encoded shard (65) by looking up its index.

This approach to segmenting datasets into fully indexed and quickly retrievable delta-encoded shards significantly improves data storage and retrieval performance. Whether the dataset (18) involves healthcare records (57), financial data (20), or any other sensitive or substantial data (22), the present system makes it possible to securely store the data in distributed settings and retrieve each part quickly, scaling up to meet the needs of extensive and complex datasets.

The present system of AIDIOS incorporates digital signatures (66) as a crucial part of its protocol. This enables verification of subsequent updates (78) to the records (55) or files (27), enhancing its data integrity mechanism.

The use of digital signatures is tied with the fundamental methodology of the AIDIOS protocol. When a record (55) or file (27) is updated, a digital signature (66) is created using the private key (37) held by the original data author or owner. This significant characteristic of the system ensures that only the owner can validate updates made to records or files. Thus, interaction within the system, such as the modification of records or files is verifiably auditable and traceable to the original data creator, ensuring data integrity, traceability, and non-repudiation.

Furthermore, in the context of versioning and updating, the digital signatures (66) also play a critical role. Each version or update of a file or record within the system comes with a unique digital signature. When an update (78) is made to a file (27) or record (55), the system will create a new digital signature (66) for this version. This ensures each update (78) or version within the system can be individually verified and traced back to its author.

In addition, this feature of the protocol ensures robust security as it prevents unauthorized alterations to the data. Unauthorized attempts to modify the data will result in a different—and thus unverifiable-digital signature (66), alerting the system to the attempted breach of data integrity.

Are created using well-established cryptographic protocols, such as the Elliptic Curve Digital Signature Algorithm (ECDSA), ensuring they offer strong security guarantees. The signatures are tied to the original data and the private key (37) of the owner, meaning they cannot be forged or altered without access to the private key.

Therefore, the application of digital signatures (66) in the AIDIOS system plays a central role in ensuring data integrity, security, author verification, and traceability across the system. Further, it underscores the system's strength in providing auditable, non-repudiable, and secure data storage and retrieval.

The present one embodiment provides a system for abstracting blockchain complexities (17) using a standardized API (7) and an SDK (63). The complexity in the blockchain lies in the means of record storage, encryption techniques, transaction validation, and block mining. This complexity often manifests as a barrier for developers and users in leveraging blockchain technologies.

The one embodiment provides a standardized API (7) which simplifies interaction with the blockchain by providing a well-defined set of commands or functions for executing common tasks without requiring knowledge of the intricate workings of the underlying blockchain technology. This API functions as a bridge between the complex blockchain system and the user or developer. The API is designed to handle the lower-level complexities of data storage, retrieval, encryption, and decryption seen in the blockchain, thereby providing seamless integration with the system.

In addition to the API, the one embodiment includes an SDK (63). The SDK contains a set of software tools, libraries, documentation, code samples, processes, and guides that allow developers to create software applications on a specific platform. In this case, the SDK makes it possible for developers to build applications that can interact with the blockchain.

To handle the complexities of blockchain more effectively, the API and the SDK work in concert. The API abstracts the complexities of the blockchain and provides an accessible interface for the developers. Subsequently, the SDK uses these APIs to assemble resources in a user-friendly manner for application development.

The API and SDK in the system are designed to be agnostic of the underlying blockchain, thus supporting multiple blockchain platforms such as Bitcoin, Ethereum, or other custom blockchain implementations. This feature enhances the versatility and broad applicability of the system.

Thus, the one embodiment provides a significant contribution to abstracting blockchain complexities by incorporating a standardized API and an SDK, thereby making the blockchain technology more accessible, flexible, and user-friendly for application development and usage.

The present one embodiment introduces an enhanced system to Bitcoin's (12) existing capabilities for data anchoring (5) and timestamping (74). In this improved schema, data anchoring (5) and timestamping (74) are employed within the AIDIOS (Acyclic Immutable Decentralised Information Optimised Storage) system. While a given Bitcoin transaction already embeds a permanent timestamp on the network and anchors the transaction to the blockchain (13) with a cryptographic hash function (29), the AIDIOS system extends these key functionalities in a manner that can handle direct, structured, and versioned data storage and retrieval, independent of the size of the data.

AIDIOS enhances the traditional model, providing a way to link or 'anchor' large sets of data on the Bitcoin blockchain (13), overcoming the inherent data size limitations of Bitcoin transactions. This form of data anchoring (5) is achieved through a proprietary data structure protocol known as KeyWeave. KeyWeave allows for efficient storage and retrieval of versioned data across numerous transactions. The anchoring process begins with the partitioning or segmenting of the data into fully indexed and rapidly retrievable delta-encoded shards. Each of these shards is then linked to a unique, derived address on the Bitcoin network, providing a way to anchor substantial data on the blockchain (13).

In the AIDIOS system is essentially an extended method of the timestamp feature already present in Bitcoin transactions. Every transaction recorded in the Bitcoin network inherently embeds a timestamp element indicating the time of the transaction. However, the AIDIOS system added value to timestamping by recording the timestamp of each version or update of the data and noting the differential changes. This versioning and timestamping allow for effective tracking of data modifications over time, providing historicity to the saved data and facilitating effective version control.

These features, combined with the system's ability to ensure data integrity and offer seamless integration with existing blockchain networks, make AIDIOS an effective solution for enhancing the capabilities of data anchoring (5) and timestamping (74) on the Bitcoin network (12). Such an innovative implementation of these techniques offers a more extensive and reliable solution compared to traditional digital storage methods, with potential use-cases in numerous high-stakes applications, like healthcare and financial records, content management, land registration and decentralized identity documents, among others.

The one embodiment provides a method for direct, structured, and versioned data storage and retrieval on a Bitcoin network, facilitating storage of files or objects of a considerable size on said network. The method leverages the inherent attribute of security provided by Bitcoin networks while integrating the ability to operate with larger data sizes than typically possible.

The method begins by storing substantial data directly on the Bitcoin blockchain using a unique transaction ID as a data entry point. The data storage process adopts a decentralized approach, removing the limitations typically encountered in traditional centralized systems. By determining a unique transaction ID for each data entry point, the method ensures that every data or subset of data stored has a distinct point of access. This is crucial for efficient data retrieval and management, ensuring that the data handling process remains streamlined and efficient.

Files or objects of considerable size are stored on the Bitcoin network. The common perception is that the Bitcoin network is not conducive to the storage of large data files or objects owing to block size restrictions. However, the present method uses advanced data handling techniques to bypass these restrictions. The process involves breaking down these large files or objects into manageable data fragments or shards while ensuring each fragment retains its individual identity.

The method employs a versioning system that enables efficient handling of updates to stored data. In traditional systems, any alteration to the existing data requires the entire dataset's replacement for consistency in the version history. This operation is not only resource-intensive but also inefficient for systems dealing with large-sized data objects. The present method's versioning capabilities solves this inefficient process by only storing the differential changes made to the data. This means that whenever an update to the existing data occurs, only the changed data segments are stored as part of the new version.

Further advantages include the method's ability to reduce potential redundancies in data storage, thereby saving bandwidth and data storage space. This process also decreases the resources required for data retrieval and management, along with providing effective version control capabilities. Users can efficiently navigate through different versions of the stored data, viewing changes made in each iteration. Overall, the method revolutionizes the way data storage and retrieval are conducted on Bitcoin networks, resulting in improved system performance and user satisfaction.

A preferred embodiment of the present system, termed AIDIOS (4), is designed to overcome the limitations of storing substantial data directly on the Bitcoin network (45). This system (72) operates on the principles of direct data storage (70) and retrieval (61) by employing a single transaction ID (30) as an entry point to the stored data (21). This feature allows the system users (102) a convenient and efficient way to access their stored data (21) on the Bitcoin network (45).

Leverages the concept of data versioning (84) to manage updates (77) to the stored data (21) efficiently. Unlike conventional data storage solutions that would store new versions of the same data entirely, the present system only stores the differential changes (15). In other words, when an update (77) is made to a stored file or object, only the differences from the last version to the current one are stored-a strategy that drastically reduces the required storage space (68).

Scheme introduces a successive state being attached to a previous state in a dependency chain, adhering to the principles of a Directed Acyclic Graph, thereby allowing backward compatibility and maintaining data integrity (36). The user (102) can retrieve any version of the data (81), which is reassembled from the stored differential parts (51).

Of AIDIOS (4) with existing systems (73) is made possible through one or more GraphQL endpoints (26). They facilitate straightforward CRUD (Create, Read, Update, Delete) operations on the stored data (21), making the present system a versatile solution for a myriad of applications.

And version (81) is associated with a unique, derived public key (39). This arrangement enhances privacy as each new public key appears entirely random and disconnected from the original public key (41) to anyone who doesn't know the "tweaking" process (53) used to create it. This method bolsters the system's security as it doesn't require access to the user's private key (37).

Beyond the unique aspects mentioned above, the AIDIOS (4) system includes an innovative component referred to as Status Bits (9). These Status Bits (9), an intelligent bit-vector, are employed to encode essential metadata on the stored data (21) in a compact yet comprehensive fashion, providing quick, vital information about the data, such as its type, part number (46), and a checksum for data validation.

Example: Root Transaction for 2 Versions with 6 Parts

Let's consider a scenario where we have 2 versions of a file, each version having 3 parts.

Versions and Parts:

Version 1: Parts 1_1, 1_2, 1_3.

Version 2: Parts 2_1, 2_2, 2_3

Root Transaction OP_RETURN Structure:

The OP_RETURN data includes identifiers for each part of each version.

It uses a compact format to list versions and their respective parts.

Structure: V1:P[1-3];V2:P[1-3]

V1 and V2 denote versions 1 and 2.

P[1-3] indicates parts 1 to 3 for each version.

This structure efficiently encapsulates information about multiple versions and parts, keeping the OP_RETURN data concise, allowing for scaling with the number of parts.

Potential for Unlimited Parts and Versions:

The design allows for representing an extensive number of parts and versions.

By using ranges and compact identifiers, the system can scale to handle many revisions and parts without significantly increasing the size of the OP_RETURN data.

For instance, V1:P[1-100];V2:P[1-100] . . . can represent hundreds of parts across multiple versions within a manageable size.

Data Retrieval Process

Fetching Data:

To retrieve a specific version, AIDIOS reads the root transaction's OP_RETURN data.

It then identifies the parts associated with the desired version.

Reconstructing the File:

Each part is fetched from its respective transaction on the blockchain.

The parts are reassembled in the correct order to reconstruct the full file for the specified version.

Status Bits

AIDIOS employs an intelligent bit-vector, referred to as Status Bits, to encode important metadata. This bit-vector is a compact way to include critical information about the data, such as its type, part number, and checksum.

"STATUS_BITS={'version': (0, 8), # The version of the of schema used (currently v1.0.0) (256 places)

'node_type': (8, 10), # Data and root.

'total_parts': (23, 31), # parts file is sharded into

'part_number': (31, 39), # tells the position of the fragment

'checksum': (39, 71), # data integrity}

The Status Bits are encoded in such a way that they provide a compact yet comprehensive representation of the metadata associated with each data part.

Let S be the Status Bits vector, and $S_{version}$, $S_{nodetype}$, $S_{filetype}$, . . . be its components.

The Status Bits are encoded as:

$$S=[S_{version}, S_{nodetype}, S_{filetype}, \cdots]$$

The decoding function D extracts this information:

$$D(S) \rightarrow \{\text{"version"}: x, \text{"nodetype"}: y, \ldots \}$$

Since each bit-vector component S is uniquely mapped to a metadata attribute, the Status Bits encoding is both compact and lossless.

Checksums and Data Integrity

AIDIOS employs SHA-256 for checksums for each data shard but uses only the first 32 bits. The choice for 32 bits is a trade-off between the level of data integrity assurance and the storage space required.

Checksum Integrity

The 32-bit checksum provides a sufficient level of data integrity while optimising for storage space. Given that SHA-256 is a cryptographic hash function with a near-zero probability of collision, truncating it to 32 bits still provides a high level of assurance against data corruption.

API Endpoints

The AIDIOS API provides several endpoints that facilitate easy interaction with the protocol. They are designed with REST principles in mind, offering intuitive methods for storing and retrieving data. The API documentation provides examples in multiple programming languages, from Python to Java and Go. There is also a simplified web interface available at https://filemanagerv2.aidios.io Store File/Store

```
curl –X POST https://apiv2.aidios.io/store\
   –F "file=@/path/to/your/file.txt"\
   –F "signature=your_signature"\
   –F "original_pubkey=your_public_key"\
   –F "ipfs"# this flag stores data in ipfs, and anchors to
      blockchain\
   –F "encrypt=yes/no"
```

Get Versions/versions

```
curl       –X      GET       "http://localhost:5000/
versions?original_pubkey=your_public_key"
```

Retrieve Specific Version (/retrieveversion
curl     –X     GET     "https://apiv2.aidios.io/
retrieveversion?original_pubkey=your_public_
key&version=1"
Retrieve Latest Version (/retrieve)
curl     –X     GET     "http://localhost:5000/
retrieve?original_pubkey=your_public_key"
Verify Data Integrity (/digest)
curl     –X     GET     "http://localhost:5000/
digest?txid=your_transaction_id"
4. Use Cases
ADIOS has a wide range of use cases when considering
high-impact applications which can leverage, independently
verifiable, immutable storage:

Healthcare records
　　Educational records
　　Financial data
　　Land registration
　　Decentralised voting
　　Content Management
　　Decentralised Identity Documents
　　Auditible Environmental control
　　Power system data
　　Data Governance
　　& many more applications
Cost Comparisons
Direct cost comparisons become slightly difficult when
considering AIDIOS. There is no other solution which
allows for versioned storage of data (beyond op_return
limits) on existing blockchain networks. AIDIOS can run in
a dedicated 'Store all data on chain' mode, or for providing
verbose metadata storage (where the data is stored else-
where, such as IPFS, for example.
Comparing Equivalent Storage in Ethereum V Bitcoin Cash
A basic cost comparison is as follows:
Ethereum Storage Costs:

500 bytes: $393.75
　　1 KB: $806.40
　　2 KB: $1612.80
ADIOS (Bitcoin Cash) Storage Costs:
　　500 bytes: $0.02 (approximately 2 cents)
　　1 KB: $0.04
　　2 KB: $0.07
In each of the above, AIDIOS (when combined with Bitcoin
Cash) is over 13000× more cost effective than Ethereum.
Performance:
AIDIOS offers fully immutable data storage that is not only
independently verifiable, resistant to tampering, and one-
time cost, but also guarantees high availability.
Below are the performance results for AIDIOS. In this test
we assume:

4× Tests, 500 Bytes, 1 KB, and 2 KB and 5 KB
　　Response times are in milliseconds and seconds (where
　　　relevant).
　　Each test was conducted 10 times to determine a mean
　　　value for each.
　　Concurrency tests were also done (up to 10×, with no
　　　noticeable change in response times)
　　AIDIOS version 0.2.1 is tested
　　AIDIOS' unique combination of direct data storage (70)
on the Bitcoin network (45), versioned revisions (62) based
on differential changes (15), the introduction of status bits
(9) for efficient metadata handling, and the seamless inte-
gration (35) capability through GraphQL endpoints (26),
makes it a promising storage solution for sectors which
require highly secure, verifiable, and cost-effective data
management.

The system can store audit trail data, and the data prov-
enance across multiple chains (or on a single one). This can
be used to create pay addresses (locked in contracts as
dictated off-chain in one embodiment) for the user to actu-
ally spend from the addresses (as the addresses tied to the
public keys are accessible only to the original private key
holders). As a storage medium, it's identity tied, totally
immutable and can be used for the licensing terms for data
or content or IP licensing, among others, or even the smart
contracts themselves for full transparency. The system can
also store encrypted metadata (such as public keys for use in
Diffie Hellman secret generation, for use in data access keys
or proxy re-encryption purposes)

In one embodiment where AIDIOS is applied with
Ethereum (or a similar 'more' turing complete chain), the
tweaking capabilities can be used outside of the data storage
directly. For example, the system can embed conditions into
the keys themselves, which can be used by Smart Contracts.
Smart Contracts themselves can similarly manipulate a 3rd
party public key to embed conditions on.

In one implementation, for any blockchain that uses the
secp256k1 key type, the system can effectively embed a
condition into the 3rd party public key. The result provides
the ability to create addresses on behalf of other people,
which means that they can dictate an off-chain condition for
the address they derive. Only the private key holder can
spend from that address, but they must first receive the
tweak from the person (or contract) which originally
tweaked their key.

In one example, password protection is detailed. First we
generate a secp256k1 private key, and derive the public
key—Create a fresh private key on an offline machine. Next,
we will take only the public key, and this will be input into
txtailor on another different machine. Now, using only the
public key, which we then tweak, we have created a new
address(our super Cold Storage), where the private key for
the address technically doesn't exist yet. It's not until a user
needs to spend the funds/or provide a valid signature, that
they will need to bring this key into existence, by tweaking
the underlying original with the value (only they know, and
isn't written down anywhere typically, but it can be). The
address above, can't be accessed even if someone stole your
original private key. You can obviously add further steps into
this process (such as encrypting the private key and the
tweak elsewhere). The system uses Merkalized data struc-
tures. This allows a user to prove a particular piece of
information imbedded into an address, without exposing all
of it. The user can simply expose the branch, which contains
the valid info I want to share, for example, my email, or
some other piece of data, rather than the whole file, while
still being able to prove ownership, timestamping prov-
enance via the blockchain. Another feature is the ability to
generate addresses, both deterministically (as with a tradi-
tional HD wallet) and non-deterministically (as in using
random 256 bit nonces). The deterministic approach opens
up possibilities for structuring of keys based on an indexing
system (custom) tied to the user. The user can then choose
to associate particular branches of transactions as part of a
campaign (for example).

In another example of a campaign system, within this
system, the "Save the Planet" campaign (with it's associated
ID) acts as a root node from which all subsequent, more
granular campaigns or sub-categories derive. For instance,
under "Save the Planet," there might be sub-categories like
"Reforestation," "Ocean Cleanup," and "Wildlife Protec-
tion." Each of these sub-categories, in turn, could have
further subdivisions, such as specific projects or geographical locations for reforestation efforts, all the way down to specific elements or files. The "Save the Planet" campaign is first assigned a unique address using the root private key, creating a secure and identifiable wallet for donations. Then, to create a sub-category like "Reforestation," the system generates a tweak based on both the name "Reforestation" and its parent ID-linking it directly to "Save the Planet." This tweak is applied to the private key associated with "Save the Planet" to generate a new, unique address for "Reforestation." This process can be repeated at any level of the hierarchy, allowing each project or sub-campaign under "Reforestation" to have its own unique address, derived from tweaking the already tweaked key of its parent. This method creates a robust indexing system, where each address is deterministically generated and securely linked to its parent, ensuring a traceable lineage of funds and making the management of campaign addresses efficient and organized. For example, donations received in the "Reforestation" address can be easily identified as intended for that specific cause, under the broader "Save the Planet" initiative. Furthermore, this system can extend beyond fund management to include file storage, where documents, reports, and other relevant data can be indexed and retrieved based on their association with specific campaigns or sub-campaigns, enhancing the transparency and accountability of charitable activities, while maintaining self-sovereignty of your data.

In another aspect, an improved authentication system is detailed next. Existing approaches to enhancing ECDSA-based authentication systems have mainly focused on external or layered solutions, such as the application of MFA, without addressing the underlying static nature of the cryptographic keys themselves. Additionally, while the concept of key tweaking has been acknowledged as a means to enhance cryptographic security, its direct application in authentication (particularly ECDSA) and the integration of MFA principles into the cryptographic process remain underexplored. These gaps highlight the need for a new approach that can dynamically secure authentication sessions against a broader spectrum of threats, seamlessly incorporating MFA-like concepts directly into the cryptographic layer.

The system addresses these gaps by introducing a method for applying dynamic tweaks to secp256k1 keys, directly integrating an additional layer of authentication into the cryptographic process. This approach not only mitigates the inherent vulnerabilities associated with static keys but also leverages the homomorphic properties of elliptic curves to ensure the security and integrity of the tweaking process. By doing so, the system offers a novel solution that enhances the resilience of ECDSA-based authentication against advanced threats, aligning with the evolving requirements of cybersecurity.

Figures 6, 7:
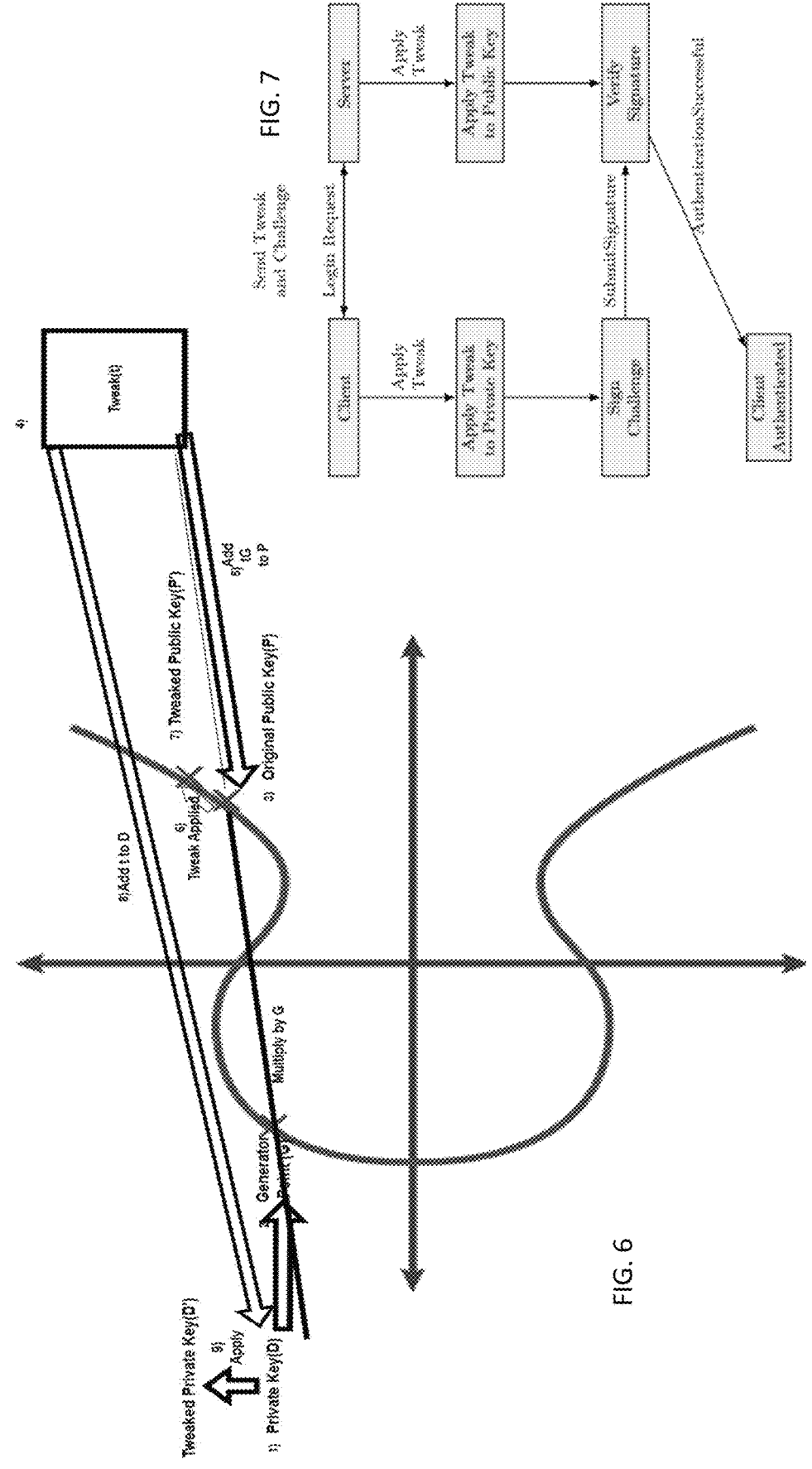
FIG. 6-7 shows an exemplary key tweaking process.

FIG. 6-7 shows an illustration of key tweaking and an exemplary key tweaking process to provide enhanced authentication with a direct tweak provision. he diagram outlines the steps taken to modify both the private and public keys to produce tweaked versions that are derived from the original keys. Here is a step-by-step description of the process as depicted in the diagram:

Private Key D: The process begins with an original private key, denoted as D. This key is the secret key in a public key cryptography system. Generation Point G: The private key D is then used with a generator point G to produce the original public key. The generator point G is a predefined point on the elliptic curve used in ECC.

Original Public Key (P): The result of multiplying the private key D by the generator point G is the original public key P.

Tweak (t): A tweak value t is introduced, which is an additional parameter used to modify the keys. The tweak t is added to the generator point G, as detailed below.

Tweak Applied: The result of the previous step is then applied to the original public key P Tweaked Public Key (P'): The application of the tweak results in a modified or "tweaked" public key.

Tweaked Private Key (D'): The result of adding the tweak to the original private key is the tweaked private key The process enhances the security of the cryptographic keys by introducing a tweak, which adds an additional layer of complexity and makes it more difficult for an attacker to compromise the keys. This kind of operation is often used in cryptographic protocols to provide forward secrecy or to bind keys to specific contexts or sessions. In one embodiment, a method for enhancing the security of a cryptographic key pair includes:

generating a private key (D);

applying a generator point (G) to the private key (D) to generate an original public key (P);

determining a tweak value (t);

modifying the generator point (G) with the tweak value (t) to produce a modified generator point;

applying the modified generator point to the private key (D) to generate a tweaked private key (D');

modifying the original public key (P) with the tweak value (t) to generate a tweaked public key (P)

Implementations can include the following:

the generator point (G) is a predefined point on an elliptic curve used in elliptic curve cryptography (ECC).

the tweak value (t) is added to the generator point (G) to produce the modified generator point.

the tweak value (t) is added to the original public key (P) to produce the tweaked public key (P).

the tweaked private key (D') is generated by adding the tweak value (t) to the private key (D).

The method uses the tweaked public key (P') for cryptographic operations including at least one of encryption, decryption, digital signature generation, or digital signature verification.

the cryptographic key pair comprising the tweaked private key (D') and the tweaked public key (P') is used in a cryptographic protocol to provide at least one of forward secrecy, context-specific key binding, or session-specific key binding.

Other implementations can include one or more of the following operations:

Incorporating the step of verifying the tweaked private key (D') and the tweaked public key (P') to ensure they are valid cryptographic keys after the tweaking process.

Utilizing the tweaked private key (D') in a secure communication protocol to establish a secure channel between two parties.

Employing the tweaked public key (P') to verify digital signatures that are generated using the tweaked private key (D').

Applying the tweak value (t) using a cryptographic hash function to ensure the security of the tweak before it is applied to the keys.

Generating the tweak value (t) based on a nonce or a counter to ensure that each tweak is unique.

Storing the tweaked private key (D') in a secure hardware module to prevent unauthorized access.

Transmitting the tweaked public key (P') over a network to a second party while keeping the tweaked private key (D') confidential.

Implementing the method in a blockchain environment where the tweaked private key (D') and the tweaked public key (P') are used for transaction signing and verification.

Using the tweaked key pair in a multi-factor authentication system to enhance user authentication.

Applying the tweak value (t) in a manner that is reversible, allowing the recovery of the original private key (D) and original public key (P) if necessary.

Associating the tweak value (t) with a specific user or device identifier to personalize the cryptographic keys.

Implementing the tweaking process as part of a key renewal or key rotation protocol to maintain cryptographic system security over time.

Configuring the tweak value (t) to be time-sensitive, such that the tweaked keys are only valid for a predetermined period.

One exemplary architecture consists of three main components:

Client: Manages cryptographic keys, applies server-provided tweaks, and signs challenges.

Server: Generates and sends unique tweaks and challenges, applies tweaks to the public key, and verifies client signatures. In our example web application, tweaks and challenges were simply displayed in the UI; however, these can be sent via MFA methods, or even using a hybrid system, where both the client and the server use ECDH to create and share a tweak which can be used for the session.

Authentication Flow: Involves key registration, tweak and challenge generation, signature creation, and verification processes.

Cryptographic Foundations

At the core of the system is ECDSA, a public-key cryptography algorithm essential for generating digital signatures. The security of ECDSA is based on the elliptic curve discrete logarithm problem (ECDLP), making it extremely difficult to derive the private key from the public key.

Tweaking Mechanism

A "tweak" is a server-generated value applied to both the user's public and private keys, modifying them securely for each session.

Public Key Operations(Server)

Tweak Generation: The server creates a unique tweak using a secure random number generator.

Application to Public Key: The server applies the tweak to the public key through an elliptic curve point addition, resulting in a tweaked public key.

Given a public key P, and a message m, the process of tweaking the public key can be represented mathematically as:

where:

$$P_{tweaked} = P + H(P\|m) \cdot G$$

P represents the original public key.
m is the message used for the tweak.
∥ denotes the concatenation operation.
H(·) represents the SHA-256 hash function, applied to the concatenation of the public key
P and the message m, producing a scalar.
G is the generator point of the elliptic curve used (in this case, secp256k1).
H(P∥m) computes the SHA-256 hash of the concatenation of P and m, which is then converted into an integer scalar.

This scalar is then multiplied by the generator point G of the elliptic curve, where the resulting point is added to the original public key P, producing the tweaked public key $P_{tweaked}$.

Private Key Operations(Client)

Tweaking Private Key: The user then applies the tweak to their private key d. The tweaking of the private key can be described mathematically as follows:

Given a private key d, and a message m, the process of tweaking the private key can be represented mathematically as: $d' = (d + H(P\|m))$ mod n where:

d represents the original private key.
P is the public key corresponding to the private key d.
m is the message used for the tweak.
∥ denotes the concatenation operation.
H(·) represents the SHA-256 hash function, applied to the concatenation of the public key
P and the message m, producing a scalar.
n is the order of the elliptic curve used (secp256k1).

The result d' represents the tweaked private key. Refer to FIG. 1 for an illustration of the process.

FIG. 6 illustrates the use of a key tweaking mechanism into the ECDSA framework significantly enhances the authentication system's security posture. This advancement not only aligns with the evolving landscape of digital security threats but also introduces a nuanced approach to safeguarding and the implications this has on the overarching security paradigms may include:

Enhanced Security Against Key Exposure: The dynamic nature of the proposed key tweak-ing mechanism introduces an essential layer of security:

Session-Specific Security: By employing a uniquely tweaked private key for each session, the potential damage from key exposure is drastically limited. An adversary's access to a session-specific tweaked key does not compromise the integrity of other sessions (past or future) nor the original private key, thereby encapsulating the breach within the confines of a predefined window.

Implementation of forward and backward secrecy: The system inherently supports the principles of forward and backward secrecy. The exposure of a single session tweaked key neither compromises the original private key nor facilitates access to other session keys, provided the tweak remains confidential.

Predictive and Collision Attacks: The unpredictability introduced through nonce-based key tweaking, coupled with the application of a secure cryptographic hash function, strengthens the system against a spectrum of predictive and collision-based threats:

Unpredictability: The reliance on securely generated nonces and the inherent properties of the hash function (SHA-256) ensure that each tweak is indistinguishable from a 'truly random value'. This feature effectively mitigates any pre-computation benefits that could be exploited by a bad actor, who could otherwise effectively try to compute multiple tweaked public keys to leverage for nefarious reasons.

Mitigation of Collision Risks: By hashing the nonce along with the public key to generate the tweak, we reduce the probability of a collision occurrence even further than if we were using the nonce as input for the hashing function alone.

Operational Considerations for Deployment: The enhancement of security through key tweaking is balanced with pragmatic considerations to ensure seamless integration into existing systems:

Optimization of Key Tweaking Operations: The introduction of additional computational steps necessitates a careful optimisation strategy. This includes streamlining hash function computations and elliptic curve operations to minimize latency and maintain system responsiveness.

Management of Nonces: The foundation of the tweaking mechanism's security lies in the effective generation and handling of nonces. Protocols must be established for the secure generation, usage, and eventual disposal of nonces, mitigating potential vulnerabilities from poor handling.

Secure Generation and Transfer of Tweaks

The next concern is the transmission or derivation (cooperative) of the tweaks themselves in a secure manner. This can be achieved in the following ways:

Hash OTP for Synchronized Tweaks: A hash-based one-time password (OTP) could allow both parties to independently compute the tweak, t=Hash (secret||counter), by synchronizing their operations while preserving confidentiality. This also has the added benefit in that there doesn't need to be a secure channel to transmit any tweaking information, because the tweaks are calculated locally by each party.

The Diffie-Hellman Exchange Mechanism In adapting the DH exchange for ECDSA key tweaking, the shared secret s generated through this process serves as the tweak (t). The application of this tweak to both the public and private components of the ECDSA key pair is as follows:

The public key P, expressed as a point on the elliptic curve, is tweaked by adding to it the product of the shared secret and the curve's generator point: $P_{tweaked}=P+s{\cdot}G$ Correspondingly, the private key d is adjusted by adding the shared secret modulo the order of the generator point: $d_{tweaked}=(d+s) \bmod n$ This procedure ensures that the tweak, derived from the shared secret s, is intimately tied to the unique DH exchange between the two parties. As a consequence, it inherits the DH protocol's established security properties, including resistance to eavesdropping and man-in-the-middle attacks. Moreover, by embedding this shared secret within the ECDSA keys themselves, the authentication process acquires an additional layer of cryptographic protection, rendering it significantly more resilient against a spectrum of potential attacks.

ECIES(Elliptic Curve Integrated Encryption Scheme To enhance the security framework within our ECDSA authentication system, particularly when transmitting tweaks, we can also harness the Elliptic Curve Integrated Encryption Scheme (ECIES). This methodology ensures that tweaks, although transmitted through potentially less secure channels such as a user interface (UI), remain confidential and accessible solely to the intended recipient. This process ensures that the encrypted tweak can only be decrypted by the holder of the corresponding private key, thus maintaining the tweak's confidentiality during transmission.

The procedure involves:

Encryption Phase: Utilising the recipient's public key, the tweak is encrypted, yielding a cipher that incorporates both the encrypted data and the symmetric key used for the encryption. This allows the entire payload to be securely transmitted to the recipient without exposing the tweak.

Transmission Phase: The encrypted tweak, now a cipher, is encoded into a Base64 string facilitating its transmission over less secure channels, such as a web-based UI, without compromising its integrity.

Decryption Phase: The intended recipient, now possessing the corresponding private key, decrypts the Base64-encoded cipher. This decryption not only reveals the original clear text tweak but also validates the recipient's exclusive ability to access and apply the tweak, given their possession of the private key.

The system employs a traditional Digital Signature challenge-response mechanism which is enhanced by key tweaking:

Registration: Users provide their public key for server storage.

Login Attempt: Users initiate authentication by requesting a login.

Tweak and Challenge Generation: The server creates a unique tweak and challenge, sending both to the client.

Signature Creation: The client signs the challenge with the tweaked private key.

Verification: The server verifies the client's signature, ensuring authenticity and integrity.

This process guarantees the uniqueness and security of each session, substantially improving the system's defense against replay attacks, private key leaks, and unauthorized access.

Modes of Operation

The proposed authentication system can operate in two distinct modes of operation based on how the key tweaking is applied: parallel and sequential. Each mode offers unique advantages and suits different security and operational requirements.

Parallel Key Tweaking: In this mode, each tweak is applied directly to the base public key for generating the tweaked public keys. This approach ensures that the tweaks remain independent of one another, making it straightforward to manage and verify keys without the need for tracking the history of applied tweaks.

Sequential Tweaking: Offers enhanced security by embedding a historical dependency within the key chain, making it more resilient to attacks that rely on the predictability and independence of authentication attempts. It is well-suited for systems where the integrity of the entire authentication sequence is critical.

Choosing between parallel and sequential key tweaking modes depends on the specific requirements of the application, including considerations for security, performance, and operational complexity. Implementations may also explore hybrid approaches, selectively applying each mode based on the context of use to optimise for both security and efficiency.

Next, a general analysis of the system's resilience against potential threats details the security benefits of key tweaking and offers a comparison with traditional ECDSA authentication mechanisms.

Theoretical Foundations of Key Tweaking: ECC security is predicated on the intractability of the Elliptic Curve Discrete Logarithm Problem (ECDLP), which remains unchanged even when keys undergo the process of cryptographic key tweaking. The operation of key tweaking involves the deterministic modification of ECC keys using arbitrary information, yet it preserves the computational hardness of ECDLP for the resultant tweaked keys.

Mathematical proof of the security of Tweaked Keys: The public key P, which is derived from the private key d, can be tweaked using a scalar t derived from a hash function. The tweaked public key P' is calculated as:

$$P'=P+tG$$

where G is the base point of the curve. Similarly, the private key d is tweaked by adding the scalar t directly: $d'=(d+t) \bmod n$, where n is the order of the curve.

Resistance to Manipulation: The SHA-256 hash function's properties, which are used to generate t, mitigate the implications of non-random or adversarial chosen tweaks. Assuming the hash function behaves as a random oracle (RO), the output t is indistinguishable from random.

Indistinguishably and Uniqueness: For each tweaked key pair (d', P') these are unique and indistinguishable from any other secp256k1 key pair without possessing both the original key and tweak used to generate it.

Security Proof of the Tweaked Key System: Given the ECDSA system's reliance on the Elliptic Curve Discrete Logarithm Problem (ECDLP) for its security, we demonstrate that introducing a tweak based on a secure nonce and hash function does not weaken that inherent assurance. We assume the hash function H used for generating the tweak is a cryptographic hash function exhibiting properties of pre-image resistance, second pre-image resistance, and resistance to collision. In our example, we'll assume the use of SHA256.

Theorem: If a bad actor A can compromise the tweaked ECDSA system with non-negligible probability $\epsilon$, then a solver B can be constructed that solves the ECDLP with non-negligible probability $\epsilon'$.

Proof: Consider an bad actor A that claims to derive the original private key d from the tweaked public key Ptweaked. Our objective is to use A's strategy to solve the ECDLP, thereby proving that breaking the tweaked system is 'at least as hard' as solving the underlying ECDLP.

Given P=dG and a tweaked version $P_{tweaked}$=P+T·G, where T=H(nonce‖P) and G is the generator point of the elliptic curve, the task is to find d given Ptweaked.

B initializes the attack by selecting a random nonce and computing T=H (nonce//Q), where Q is the ECDLP challenge, simulating the tweak generation process.

B then computes $Q_{tweaked}$=Q+T·G, forging the tweaked public key creation.

Given Qtweaked, A attempts to find the corresponding private key d'. If A is successful, B uses this information to reverse the tweaking process.

B calculates d=d'−T mod q, where q is the order of the point G, effectively solving the ECDLP for Q=dG.

This reduction shows that if a bad actor A can effectively compromise the tweaked key system, such capability implies the existence of a method to solve the ECDLP, given the cryptographic strength of the hash function H and the secure generation of nonce. Therefore the probabilities $\epsilon$ and $\epsilon'$ are linked by the computational complexities of A's attack and the ECDLP itself, reflecting the security equivalence between solving the ECDLP and breaking the tweaked system under our understanding.

The threat model for our system considers a range of attack vectors that traditional authenti-cation systems might face, including:

Replay Attacks: Where an attacker reuses previously (or currently) valid authentication data to gain unauthorized access.

Key Theft: The acquisition of private keys by a bad actor, allowing attackers to impersonate legitimate users.

Man-in-the-Middle (MitM) Attacks: Where an attacker intercepts communication between the client and server to steal or tamper with the information.

Side-Channel Attacks: this relates to exploiting information gained from the physical implementation of a crypto-system, such as timing information, power consumption, electromagnetic leaks, or sound, to compromise the system.

The key tweaking mechanism introduces several security benefits that mitigate the threats outlined in the threat model:

Mitigation of Replay Attacks: By incorporating a unique tweak for each authentication session, the system ensures that captured authentication data (e.g., signatures) cannot be reused by attackers, as the underlying keys change with each session.

Enhanced Protection against Key Theft: Even if a private key is compromised, the dynamic nature of the tweaked keys limits the timeframe in which the stolen key can be used for unauthorized access. The attacker would also need the specific tweak applied during the authentication attempt, which is not reusable in subsequent sessions.

Resistance to MitM Attacks: The use of unique, session-specific tweaks and challenges complicates MitM attacks, as the attacker cannot generate valid responses without access to the dynamically tweaked private key.

Reduced Risk from Side-Channel Attacks: Since the private key is tweaked for each session, side-channel attacks that rely on observing operations involving the static private key are less likely to succeed, as they would provide information relevant only to a single session.

Compared to traditional ECDSA authentication mechanisms, the system offers significantly enhanced security features:

Dynamic vs. Static Keys: Traditional ECDSA uses static key pairs, making it susceptible to attacks if the private key is compromised. Our system's use of dynamic key tweaking for each session significantly reduces this vulnerability.

Session Uniqueness: Traditional systems do not inherently ensure the uniqueness of each authentication session, making them more vulnerable to replay attacks. The proposed sys-tem's requirement for a unique tweak and challenge for each session inherently defends against such attacks.

Integrated Multi-Factor Authentication: While traditional ECDSA systems may require additional layers or external systems to implement MFA, the system integrates an additional authentication factor (the tweak) directly into the cryptographic process, enhancing security without added tangible complexity for the user.

Implementation

The implementation of the system as a proof of concept is realised through a UI-based web application. This section details the key components of the implementation, focusing on the integration of the cryptographic key tweaking mechanism and the challenge-response protocol. The Python ECDSA library plays a pivotal role in facilitating cryptographic operations.

Application Structure

The web application is structured to provide endpoints for user registration, login, and authentication, leveraging sessions for state management between the client and server. The key aspects of the code include:

User Registration and Public Key Storage: Users register by submitting their public key to the server via a registration form. The server stores these keys in a database for future authentication attempts.

Tweak and Challenge Generation: Upon initiating a login attempt, the server generates a unique tweak and a cryptographic challenge. These are sent to the client as part of the login process.

Application of Tweak: The server tweaks the stored public key, while the client applies the same tweak to their private key. Once the server receives the signature, it checks it against the tweaked public key, rather than the original.

Key Cryptographic Operations

ECDSA Library (Python ECDSA): The ECDSA library is used for all cryptographic operations in this proof of concept, including key generation, signing, and verification. This library provides a straightforward interface for working with keys and signatures, enabling the application of tweaks to keys and the verification of signatures.

Tweak and Challenge Handling: The server's generation of tweaks and challenges is implemented using Python's secrets module to ensure cryptographic strength. The hashlib module is employed to hash the challenge, ensuring its integrity during transmission and verification.

Application Flow

Registration Phase:

Users generate an secp256k1 key pair on their client device and submit the public key to the server for registration. In production, a signature verification step would be prudent for additional security.

After receiving the public key, the server stores it for future authentication attempts.

Login Phase

Server generates a unique tweak and challenge for the login attempt.

These are sent to the user, who then applies the tweak to their private key and signs the challenge.

The user submits this signature back to the server as proof of identity.

The server verifies the signature against the stored, tweaked public key. If the signature is valid, authentication is successful; otherwise, access is denied.

Discussion on Libraries and Tools

The implementation leverages several key technologies:

Web Server: Manages routing, sessions, and the server-client interface.

ECDSA Library: Facilitates core cryptographic operations, including working with secp256k1 keys and signatures.

Hashlib and Secrets: Used for secure hash generation and cryptographic randomness, ensuring the security of the tweak and challenge values.

The introduction of a key tweaking mechanism into the authentication flow adds computational overhead compared to traditional ECDSA authentication. This overhead primarily arises from:

Tweaking Operations: Both the server and client perform additional cryptographic operations to apply the tweak to the public and private keys, respectively. However, given the efficiency of elliptic curve operations and the computational capabilities of modern hardware, this overhead is relatively small.

Signature Verification: The process of verifying a signature against a tweaked public key does not differ in complexity from standard ECDSA verification. The primary computational cost lies in the initial application of the tweak to the stored public key.

From rough initial tests, the tweaking process is on the order of less than 1 millisecond on a small AWS EC2 instance, negligible for most authentication scenarios. However, performance may be a consideration in systems requiring extremely high throughput or in environments with constrained computational resources.

Usability

The system's impact on usability primarily concerns the user's interaction with cryptographic keys:

Key Generation and Management: Users generate a key pair once and register the public key with the server. The presence of key tweaking does not alter this process from the user's perspective, as the application of tweaks and generation of signatures can be seamlessly integrated into client-side software.

Transparency of Tweaking Process: For end-users, the key tweaking and challenge-response mechanism operates transparently. Users are not required to manually apply tweaks or alter their authentication behavior, ensuring that the system's enhanced security does not come at the expense of user experience.

Evaluating the system's scalability involves considering its performance under increasing loads, such as a growing number of users or authentication requests:

Server-Side Processing: The most significant scalability concern lies in the server's ability to generate unique tweaks and challenges and to apply tweaks to public keys for each authentication attempt. Efficient implementation and caching strategies can mitigate potential bottlenecks, ensuring that the system remains responsive as demand increases.

Database and Session Management: Storing and retrieving public keys and managing session-specific data (e.g., challenges and tweaks) require efficient database operations. The system's design should accommodate scalable storage solutions to handle growth in user registrations and concurrent authentication sessions.

The system, which integrates cryptographic key tweaking into ECDSA for enhanced security, represents a significant advancement in authentication technologies. This discussion reflects on the strengths and potential limitations of the approach and explores its applicability in various domains beyond the initial proof of concept.

Enhanced Security: The primary strength of the system lies in its ability to mitigate common attack vectors such as replay attacks and key theft. By dynamically modifying the cryptographic keys for each session, the system introduces a level of unpredictability and session specificity that significantly bolsters security.

Seamless Integration of MFA: Incorporating an additional factor of authentication directly into the cryptographic layer, without necessitating external MFA tools, simplifies the authen-tication process while enhancing security, offering a streamlined approach to multi-factor authentication.

Utilisation of Existing Cryptographic Standards: By building upon the well-established ECDSA framework and leveraging the homomorphic properties of elliptic curves, the system maintains compatibility with existing cryptographic infrastructures, facilitating adoption and integration.

Applications may include one or more of the following:

Blockchain Technologies: The system's approach to enhancing security through key tweak-ing has natural applications in blockchain and distributed ledger technologies, where secu-rity, non-repudiation, and resistance to various attack vectors are paramount. Integrating this authentication mechanism could enhance the security of transactions, smart contracts, and blockchain-based identity systems.

Internet of Things (IoT) Devices: IoT ecosystems, characterized by a multitude of devices with varying computational capabilities, stand to benefit from the enhanced security and efficient key management offered by the system. The lightweight nature of the key tweaking process, combined with its security benefits, makes it suitable for securing device-to-device communications and access control within IoT networks.

Secure Communications: The system could be applied to secure messaging and com-munication platforms, ensuring that each message or session is protected with uniquely tweaked cryptographic keys, thereby enhancing privacy and security against interception and unauthorized access.

Auditing and Non-repudiation: This system can also be used to embed meaningful data into keys, meaning they can be used as a means to tie specific events to a session, and embed this information directly into the keys. Actions involving signatures, or decryption, then inherently also carry the intent behind the action.

Indexing: Using a defined schema (or protocol standard), it is possible to use the embedded information in such a way as to create a robust indexing system, which can handle many thousands (even millions) of sharded file parts, while encoding additional information such as delta encoding, and versioning metadata.

The inventors envision the following Enhancements to the Tweaking Mechanism

Optimization for Performance: Reducing the computational overhead introduced by the key tweaking process, especially for resource-constrained environments such as IoT devices.

Advanced Tweaking Use: Developing more sophisticated key tweaking systems that could further enhance security, possibly by incorporating additional data into the tweak calculation, such as session-specific information or user-specific attributes.

Automated Key Recovery Mechanisms: Designing mechanisms for key recovery that maintain the system's security posture, especially in scenarios where a user might lose access to their private key.

Encryption of the Tweak: Initial tests using Elliptic Curve Integrated Encryption Scheme (ECIES) for the tweak proved successful. This means that only the original private key can decipher the tweak.

Quantum Resistance: Exploring how this solution could be better positioned for Quantum threats, including the use of secure lattice-based key-exchange methods.

Integration with Hardware Security Modules (HSMs) and Enclaves: Investigating how the key tweaking process can be integrated with HSMs or secure elements in devices to further secure the private key material against physical attacks.

Side-Channel Attack Mitigation: Developing techniques to harden the implementation against side-channel attacks, ensuring that the key tweaking and authentication processes do not leak sensitive information.

Decentralised Identity Systems: Applying the authentication system in decentralised identity frameworks to enhance security and integrity of identity claims.

Blockchain Interoperability: Exploring the use of the tweaked key authentication mechanism to enhance security in blockchain interoperability solutions.

Secure Multi-Party Computation (SMPC): Adapting the system for use in SMPC scenar-ios, where parties collaborate to compute a function over their inputs while keeping those inputs private.

Figure 8:
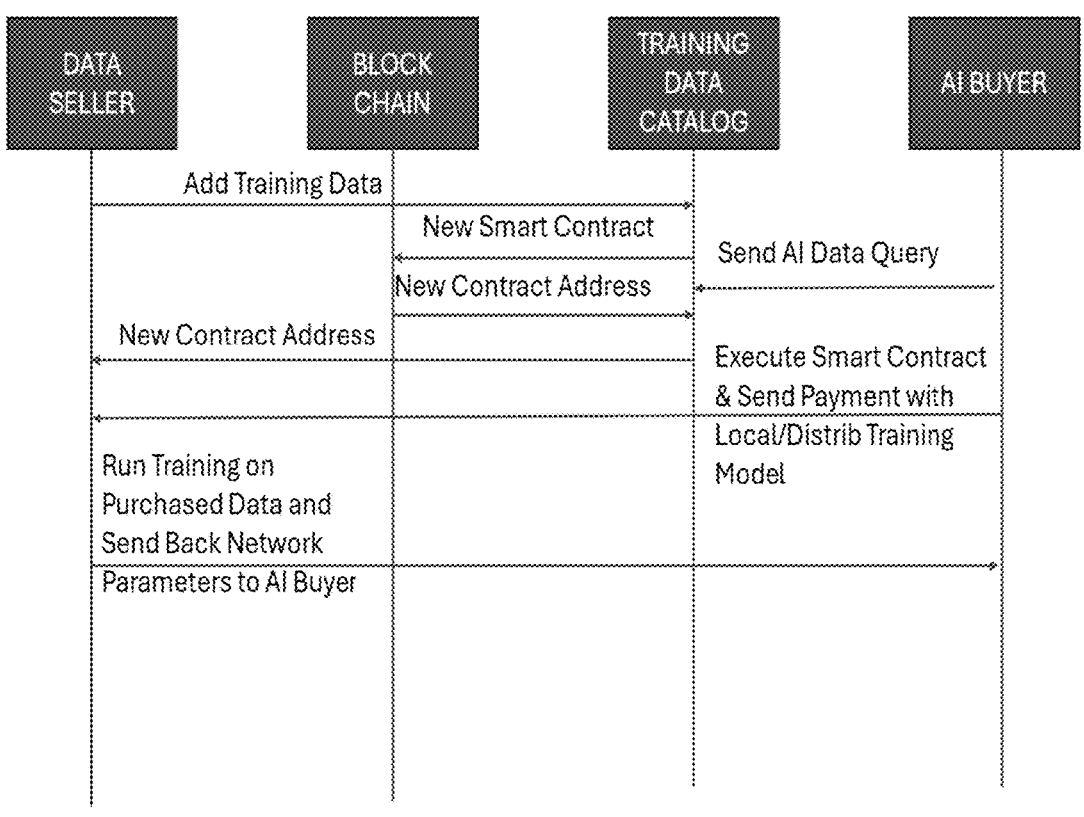
Figure 12:
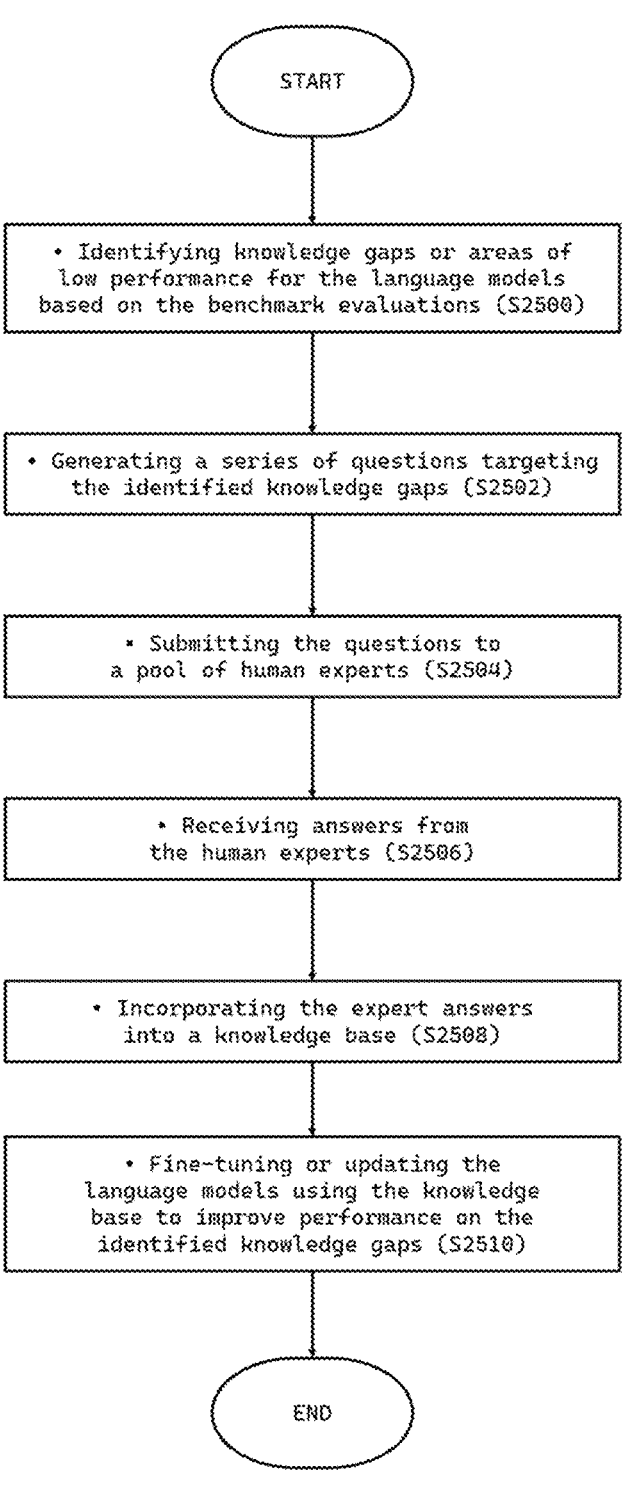

In another aspect called DatAIFair shown in FIG. 8, a decentralized data marketplace uses blockchain technology, cryptographic techniques, and advanced machine learning models. The decentralized data marketplace empowers data providers to maintain ownership and control over their data, while enabling fair compensation based on the actual value their data contributes to trained AI/ML models. DatAIFair utilizes a novel data valuation framework that can accurately attribute the importance of each data point, ensuring that data providers are rewarded proportionally to the impact of their contributions.

DatAIFair is a decentralized platform that enables the secure and fair exchange of data between data providers, model developers, and end-users. The key components of the DatAIFair ecosystem are as follows:

Data Providers: Individuals and organizations that own and contribute data to the DatAIFair platform. Data providers maintain full control over their data and can choose to share it with model developers in exchange for fair compensation.

Model Developers: Entities, such as AI/ML researchers and companies, that utilize the data provided on the DatAIFair platform to train and improve their models. Model developers compensate data providers based on the value their data contributes to the trained models.

End-Users: Individuals and organizations that consume the AI/ML models developed on the DatAIFair platform. End-users can access these models by paying a fee, which is then distributed to the data providers and model developers based on their contributions.

DatAIFair Platform: The decentralized infrastructure that facilitates the secure and transparent exchange of data and model training. The DatAIFair platform is built on blockchain technology and incorporates advanced cryptographic techniques and machine learning algorithms to enable fair data valuation and compensation as follows:

Data Ownership and Control: Data providers maintain full ownership and control over their data through the use of blockchain-based smart contracts and cryptographic techniques. Data providers can choose to share their data with model developers, while retaining the right to revoke access or withdraw their data at any time.

Fair Data Valuation: DatAIFair employs a novel data valuation framework that can accurately attribute the importance of each data point in improving the performance of AI/ML models. This ensures that data providers are compensated proportionally to the actual value of their contributions.

Transparent Transactions: All data transactions and model training processes are recorded on the blockchain, providing transparency and auditability for all participants. This transparency helps to build trust and accountability within the ecosystem.

Incentive Alignment: The DatAIFair platform aligns the incentives of data providers, model developers, and end-users, creating a collaborative ecosystem where all stakeholders benefit from the responsible development and deployment of AI/ML systems.

Privacy-Preserving Data Utilization: DatAIFair incorporates privacy-enhancing techniques, such as differential privacy and federated learning, to enable the use of sensitive data while protecting individual privacy. This ensures that data providers can participate in the ecosystem without compromising their privacy.

The system's approach to managing AI training data can enhance processing performance are:

Decentralized and Transparent Data Registry: The system creates a decentralized, blockchain-based registry to store and manage the AI training data, which improves the reliability, efficiency, and transparency of the data management processes. This decentralized approach addresses the shortcomings of centralized databases, which can be prone to delays, errors, and lack of transparency.

Automated Smart Contracts: The system leverages smart contracts to automate various AI training data-related transactions and processes, such as data ownership transfers and licensing agreements. The automation of these processes through self-executing, transparent, and tamper-resistant smart contracts improves the overall efficiency and reliability of the data management system, reducing the need for manual intervention and the associated risks of human error or manipulation.

Advanced Data Management and Analytics: The decentralized data registry and automated smart contracts enable the system to collect and maintain a comprehensive, tamper-resistant database of AI training data-related information. This data can be leveraged to provide advanced analytics and insights, such as predictive analysis of data value and automated data quality assessments. By integrating these data-driven capabilities, the system demonstrates a meaningful improvement in the underlying computer-implemented processes for managing AI training data, beyond just automating conventional activities.

Secure and Transparent Transactions: The blockchain-based architecture and smart contract functionality of the system provide a secure, transparent, and tamper-resistant platform for conducting AI training data-related financial transactions, such as data purchases and royalty payments. This improvement in the reliability, traceability, and auditability of the financial activities within the AI training data ecosystem can enhance processing performance by reducing the overhead and risks associated with conventional financial transactions.

Incentivized Participation and Ecosystem Collaboration: The system's use of virtual currency or cryptocurrency tokens to facilitate transactions and reward stakeholder participation creates a self-sustaining, incentivized ecosystem that encourages broader participation from various stakeholders, such as data providers, model developers, and service providers. This incentivized participation model promotes collaboration, information sharing, and the development of a robust AI training data ecosystem, which can lead to improved data quality, reduced redundancy, and more efficient utilization of computing resources.

By implementing these improvements to the underlying computer-implemented processes for managing AI training data, the system described in the search results can enhance processing performance by improving the reliability, efficiency, and transparency of the data management and transaction processes, as well as fostering a collaborative ecosystem that optimizes the utilization of computing resources The AI training data system and blockchain improve computer performance. The system creates a decentralized, blockchain-based registry to store and manage the AI training data, which is more than generic computer components to automate conventional activities. The decentralized and transparent nature of the registry, where data ownership information and transactions are recorded, represents an inventive concept that goes beyond simply automating a conventional database. The system leverages smart contracts to automate various AI training data-related transactions and processes, such as data ownership transfers and licensing agreements. The use of self-executing, transparent, and tamper-resistant smart contracts improves the efficiency and reliability of the data management system, and not the mere automation of conventional activities. The decentralized data registry and automated smart contracts enable the system to collect and maintain a comprehensive, tamper-resistant database of AI training data-related information. This data is then leveraged to provide advanced analytics and insights, such as predictive analysis of data value and automated data quality assessments. By integrating these data-driven capabilities, the system provides a meaningful improvement in the underlying computer-implemented processes, beyond just automating conventional activities. The blockchain-based architecture and smart contract functionality of the system provide a secure, transparent, and tamper-resistant platform for conducting AI training data-related financial transactions, such as data purchases and royalty payments. This improvement in the reliability, traceability, and auditability of the activities within the AI training data ecosystem is much more than the mere use of a computer to perform conventional transactions. The system's use of virtual currency or cryptocurrency tokens to facilitate transactions and reward stakeholder participation creates a self-sustaining, incentivized ecosystem that encourages broader participation from various stakeholders, such as data providers, model developers, and service providers. This incentivized participation model goes beyond simply automating conventional activities and creates a novel, blockchain-based platform that aligns the interests of all participants, promoting collaboration, information sharing, and the development of a robust AI training data ecosystem.

DatAIFair uses blockchain and cryptographic techniques to enable decentralized data ownership and control. Data providers on the DatAIFair platform maintain full ownership and control over their data through the use of blockchain-based smart contracts. In the DatAIFair ecosystem, data providers are issued a unique blockchain address, or "data wallet," that represents their ownership of a specific dataset. This data wallet serves as a secure and tamper-resistant record of the data provider's ownership, allowing them to maintain full control over their data. When a data provider wishes to share their data with model developers, they can create a smart contract on the DatAIFair blockchain that defines the terms of the data sharing agreement. These smart contracts can include provisions such as:

Data Access Permissions: The data provider can specify which model developers are granted access to their data, and for what duration.

Data Usage Restrictions: The data provider can impose restrictions on how the data can be used, such as prohibiting the use of the data for certain purposes or the sharing of the data with unauthorized third parties.

Data Withdrawal Rights: The data provider can reserve the right to revoke access to their data or withdraw their data from the DatAIFair platform at any time.

One exemplary pseudo-code is as follows:

```
# DataAccessContract
class DataAccessContract:
    def __init__(self, data_provider, model_developers, data_details):
        self.data_provider = data_provider
        self.model_developers = model_developers
        self.data_details = data_details
        self.access_permissions = { }
        self.usage_restrictions = { }
        self.withdrawal_rights = { }
```

-continued

```
def set_access_permissions(self):
    for developer in self.model_developers:
        access_duration = self.get_access_duration(developer)
        self.access_permissions[developer] = access_duration
def get_access_duration(self, developer):
    # Implement logic to determine access duration for each developer
    # e.g., based on developer reputation, past collaborations, etc.
    return 365 # 1 year access
def set_usage_restrictions(self):
    for restriction in self.data_provider.restrictions:
        self.usage_restrictions[restriction] = True
def withdraw_data(self, developer):
    if developer in self.access_permissions:
        del self.access_permissions[developer]
        # Revoke developer's access to the data
        self.notify_developer(developer, "Data access revoked")
def notify_developer(self, developer, message):
    # Implement logic to notify the developer of the change
    print(f"Notifying {developer}: {message}")
def execute(self):
    self.set_access_permissions( )
    self.set_usage_restrictions( )
    # Record the contract on the blockchain
    record_on_blockchain(self)
# Example usage
data_provider = DataProvider(...)
model_developers = [dev1, dev2, dev3]
data_details = {...}
contract = DataAccessContract(data_provider, model_developers, data_details)
contract.execute( )
# Later, data provider decides to withdraw data access
contract.withdraw_data(model_developers[1])
The significant part of this smart contract are:
DataAccessContract: The main class that handles the data access permissions, usage restrictions,
and withdrawal rights.
    set_access_permissions( ): Determines the access duration for each model developer and stores it
in the access permissions dictionary.
    set_usage_restrictions( ): Stores the usage restrictions specified by the data provider in the
usage_restrictions dictionary.
    withdraw_data( ): Revokes the data access for a specific model developer and notifies them of the
change.
    notify_developer( ): Implements the logic to notify the model developer of any changes to their
data access.
    execute( ): Records the contract on the blockchain after setting up the access permissions and
usage restrictions.
```

40

The example usage demonstrates how the data provider can create a DataAccessContract instance, execute it to record the contract on the blockchain, and later withdraw the data access for a specific model developer. By encoding these terms into blockchain-based smart contracts, data providers can ensure that their data is used in accordance with their preferences, and that they maintain the ability to control and protect their data assets.

Cryptographic Data Protection is detailed next. In addition to the blockchain-based ownership and control mechanisms, DatAIFair also employs advanced cryptographic techniques to further protect the data provided by data contributors. When a data provider uploads their data to the DatAIFair platform, the data is encrypted using the data provider's private key. This ensures that the data can only be accessed and used by authorized parties (i.e., model developers with the appropriate permissions) who possess the corresponding public key. Furthermore, DatAIFair utilizes secure multi-party computation (MPC) and differential privacy techniques to enable model training on sensitive data without compromising individual privacy. These privacy-preserving techniques allow model developers to train their AI/ML models on the data provided by data contributors, while ensuring that the underlying data remains confidential and protected.

By combining blockchain-based ownership, smart contracts, and cryptographic data protection, DatAIFair empow-ers data providers to maintain control over their data assets and participate in the data ecosystem on their own terms.

Fair Data Valuation is discussed next. DatAIFair addresses this challenge by introducing a data valuation framework that can accurately attribute the importance of each data point in improving the performance of AI/ML models. This framework ensures that data providers are compensated proportionally to the actual value of their contributions, fostering a fair and equitable data ecosystem. The DataIFair data valuation framework consists of three main components:

Data Impact Assessment: This component evaluates the impact of each data point on the performance of the AI/ML model being trained. By analyzing the model's performance with and without a particular data point, the framework can quantify the importance of that data point in improving the model's accuracy, robustness, and other relevant metrics.

Data Scarcity Estimation: This component estimates the scarcity of a particular data point or dataset based on factors such as its uniqueness, rarity, and the demand for similar data in the market. The scarcity of a data point is a key factor in determining its value, as rare or unique data is generally more valuable than commonly available data.

Data Valuation Framework

Let's define the following variables:

$D=\{d_1, d_2, \ldots, d_n\}$ be the set of data points contributed by the data providers.

$M$ be the AI/ML model being trained.

$P(M|D)$ be the performance of the model $M$ given the dataset $D$.

$s(d\_i)$ be the scarcity of the data point $d\_i$.

$b$ be the overall budget available for data acquisition.

Data Impact Assessment

The impact of a data point $d\_i$ on the model performance can be quantified as the difference in the model's performance with and without that data point:

$$I(d_i)=P(M|D)-P(M|D\setminus\{d_i\})$$

where $P(M|D\setminus\{d\_i\})$ is the performance of the model $M$ when trained on the dataset $D$ without the data point $d\_i$.

The data impact assessment component aims to find the $i(d\_i)$ for each data point $d\_i \in D$.

Data Scarcity Estimation

The scarcity of a data point $d\_i$ can be estimated based on factors such as its uniqueness, rarity, and the demand for similar data in the market. We can define the scarcity function $s (d\_i)$ as:

$$s(d_i)=\alpha\cdot\text{uniqueness}(d_i)-\beta\cdot\text{rarity}(d_i)+\gamma\cdot\text{demand}(d_i)$$

where $\alpha, \beta, \gamma$ are weights that can be adjusted based on the relative importance of each factor.

Data Compensation Calculation: The final component of the framework combines the data impact assessment and data scarcity estimation to calculate the appropriate compensation for each data point. This calculation takes into account the relative importance of the data point, its scarcity, and the overall budget available for data acquisition, ensuring that data providers are fairly compensated for their contributions.

The final component of the data valuation framework calculates the appropriate compensation for each data point $d\_i$ based on its impact $i(d\_i)$ and scarcity $s(d\_i)$, while considering the overall budget $b$ available for data acquisition.

The compensation for a data point $d\_i$ can be defined as:

$$C(d_i) = \frac{I(d_i)\cdot s(d_i)}{\sum_{i=1}^{n} I(d_i)\cdot s(d_i)}\cdot b$$

This formula ensures that the compensation for each data point is proportional to its impact and scarcity, and the total compensation across all data points does not exceed the available budget $b$.

The DataIFair data valuation framework is implemented using advanced machine learning techniques, such as feature importance analysis, meta-learning, and multi-task learning. These techniques enable the framework to accurately assess the value of data points, even in complex and high-dimensional datasets.

To ensure transparency and trust in the data valuation process, all the steps involved in the framework are recorded on the DataIFair blockchain. This includes the data impact assessments, scarcity estimations, and final compensation calculations for each data point.

Data providers can review the details of the valuation process for their contributed data, and model developers can verify the fairness and accuracy of the compensation paid to data providers. This transparency helps to build trust and accountability within the DataIFair ecosystem, encouraging greater participation from both data providers and model developers.

By implementing this fair and transparent data valuation framework, DataIFair ensures that data providers are compensated in proportion to the actual value of their contributions, aligning the incentives of all stakeholders and fostering a collaborative data ecosystem.

Transparent Transactions and Auditability

Transparency and auditability are crucial for building trust and accountability in a decentralized data ecosystem. In the DataIFair platform, all data transactions and model training processes are recorded on the blockchain, providing a tamper-resistant and auditable record of all activities within the ecosystem.

```
# Data Valuation Framework
class DataValuationFramework:
    def __init__(self, dataset):
        self.dataset = dataset
        self.data_impact_assessor = DataImpactAssessor( )
        self.data_scarcity_estimator = DataScarcityEstimator( )
        self.compensation_calculator = CompensationCalculator( )
    def assess_data_value(self):
        # Step 1: Assess data impact
        data_impact_scores = self.data_impact_assessor.assess_impact(self.dataset)
        # Step 2: Estimate data scarcity
        data_scarcity_scores = self.data_scarcity_estimator.estimate_scarcity(self.dataset)
        # Step 3: Calculate compensation
        data_compensation =
self.compensation_calculator.calculate_compensation(data_impact_scores, data_scarcity_scores)
        return data_compensation
class DataImpactAssessor:
    def assess_impact(self, dataset):
        impact_scores = { }
        for data_point in dataset:
            # Analyze model performance with and without data point
            model_performance_with = self.evaluate_model_performance(dataset,
include_data_point=True)
            model_performance_without = self.evaluate_model_performance(dataset,
include_data_point=False)
            impact_score = model_performance_with − model_performance_without
            impact_scores[data_point] = impact_score
        return impact_scores
```

-continued

```
    def evaluate_model_performance(self, dataset, include_data_point):
        # Implement logic to evaluate model performance
        # Return a performance metric (e.g., accuracy, F1-score)
        pass
class DataScarcityEstimator:
    def estimate_scarcity(self, dataset):
        scarcity_scores = { }
        for data_point in dataset:
            # Analyze uniqueness, rarity, and demand for data point
            uniqueness = self.calculate_uniqueness(data_point)
            rarity = self.calculate_rarity(data_point)
            demand = self.estimate_demand(data_point)
            scarcity_score = uniqueness * rarity * demand
            scarcity_scores[data_point] = scarcity_score
        return scarcity_scores
    def calculate_uniqueness(self, data_point):
        # Implement logic to calculate uniqueness of data point
        pass
    def calculate_rarity(self, data_point):
        # Implement logic to calculate rarity of data point
        pass
    def estimate_demand(self, data_point):
        # Implement logic to estimate demand for data point
        pass
class CompensationCalculator:
    def calculate_compensation(self, data_impact_scores, data_scarcity_scores, budget):
        data_compensation = { }
        total_impact = sum(data_impact_scores.values( ))
        total_scarcity = sum(data_scarcity_scores.values( ))
        for data_point, impact_score in data_impact_scores.items( ):
            scarcity_score = data_scarcity_scores[data_point]
            compensation = (impact_score / total_impact) * (scarcity_score / total_scarcity) * budget
            data_compensation[data_point] = compensation
        return data_compensation
```

This pseudocode outlines the components of the data valuation framework:

DataValuationFramework: The main class that orchestrates the data valuation process.

DataImpactAssessor: Responsible for evaluating the impact of each data point on the model performance.

DataScarcityEstimator: Estimates the scarcity of each data point based on uniqueness, rarity, and demand.

CompensationCalculator: Calculates the appropriate compensation for each data point based on its impact and scarcity, within the given budget.

The framework follows a three-step process:

Assess the impact of each data point on the model performance.

Estimate the scarcity of each data point.

Calculate the compensation for each data point based on its impact and scarcity.

Blockchain-Based Transactions

When a data provider shares their data with a model developer on the DataIFair platform, the transaction is recorded on the blockchain. This transaction includes details such as:

Data Provider's Identity: The unique blockchain address (data wallet) of the data provider.

Data Details: A cryptographic hash of the data being shared, along with metadata describing the data.

Compensation Terms: The agreed-upon compensation for the data, including the amount and the method of payment (e.g., cryptocurrency tokens).

Timestamp: The date and time of the data transaction.

Access Permissions: The specific model developers granted access to the data, and the duration of the access.

Similarly, when a model developer trains their AI/ML model using the data provided on the DataIFair platform, the training process is also recorded on the blockchain. This record includes details such as:

Model Developer's Identity: The unique blockchain address of the model developer.

Model Details: A cryptographic hash of the trained model, along with metadata describing the model.

Data Utilized: The specific data points used in the model training process, along with their corresponding data providers.

Performance Metrics: The key performance metrics of the trained model, such as accuracy, precision, recall, and F1-score.

Timestamp: The date and time of the model training process.

By recording all these details on the blockchain, DataIFair ensures that the entire data and model lifecycle is transparent and auditable. Data providers can verify that their data was used as intended and that they were compensated fairly, while model developers can demonstrate the provenance and quality of the data used in their models.

Transparency and auditability are crucial for building trust and accountability in a decentralized data ecosystem. In the DatAIFair platform, all data transactions and model training processes are recorded on the blockchain, providing a tamper-resistant and auditable record of all activities within the ecosystem. When a data provider shares their data with a model developer on the DatAIFair platform, the transaction is recorded on the blockchain. This transaction includes details such as:

Data Provider's Identity: The unique blockchain address (data wallet) of the data provider.

Data Details: A cryptographic hash of the data being shared, along with metadata describing the data.

Compensation Terms: The agreed-upon compensation for the data, including the amount and the method of payment (e.g., cryptocurrency tokens).

Timestamp: The date and time of the data transaction.

Access Permissions: The specific model developers granted access to the data, and the duration of the access.

Similarly, when a model developer trains their AI/ML model using the data provided on the DatAIFair platform, the training process is also recorded on the blockchain. This record includes details such as:

Model Developer's Identity: The unique blockchain address of the model developer.

Model Details: A cryptographic hash of the trained model, along with metadata describing the model.

Data Utilized: The specific data points used in the model training process, along with their corresponding data providers.

Performance Metrics: The key performance metrics of the trained model, such as accuracy, precision, recall, and F1-score.

Timestamp: The date and time of the model training process.

By recording all these details on the blockchain, DatAIFair ensures that the entire data and model lifecycle is transparent and auditable. Data providers can verify that their data was used as intended and that they were compensated fairly, while model developers can demonstrate the provenance and quality of the data used in their models.

Auditing and Dispute Resolution

The transparent and auditable nature of the DatAIFair platform also enables effective dispute resolution mechanisms. If a data provider or model developer has concerns about the fairness of a transaction or the accuracy of the data valuation, they can request an audit of the relevant blockchain records.

The DatAIFair platform incorporates a decentralized dispute resolution system, where a panel of trusted arbitrators (selected from the DatAIFair community) can review the blockchain records and make a binding decision on the dispute. This dispute resolution process helps to maintain the integrity of the ecosystem and ensures that all participants are treated fairly.

The DatAIFair platform is designed to align the incentives of all stakeholders-data providers, model developers, and end-users-creating a collaborative ecosystem that benefits everyone involved.

Data Providers: Data providers on the DatAIFair platform are incentivized to contribute their data through fair compensation and the ability to maintain control over their data assets. The data valuation framework ensures that data providers are rewarded proportionally to the value their data contributes to the trained AI/ML models. Additionally, data providers can choose to share their data with specific model developers or retain the right to withdraw their data at any time. This level of control and ownership encourages data providers to actively participate in the DatAIFair ecosystem, knowing that their data is being used responsibly and that they are being fairly compensated.

Model Developers: Model developers on the DatAIFair platform are incentivized to utilize high-quality data and develop accurate, robust, and responsible AI/ML models. By accessing a diverse pool of data from the DatAIFair marketplace, model developers can train their models more effectively, leading to improved performance and greater commercial value. Furthermore, the transparent and auditable nature of the DatAIFair platform ensures that model developers can demonstrate the provenance and quality of the data used in their models. This can be particularly valuable in regulated industries or when seeking to build trust with end-users.

End-Users: End-users of the AI/ML models developed on the DatAIFair platform benefit from the responsible and ethical development of these models. The fair compensation of data providers and the transparent model training process help to ensure that the models are not biased or exploitative, and that they are developed with the best interests of end-users in mind. Additionally, end-users can access these high-quality AI/ML models by paying a fee, which is then distributed to the data providers and model developers based on their contributions. This creates a sustainable ecosystem where all stakeholders are incentivized to participate and contribute to the development of responsible and valuable AI/ML systems. By aligning the incentives of all stakeholders, the DatAIFair platform fosters a collaborative ecosystem where data providers, model developers, and end-users work together to unlock the full potential of AI/ML technology.

The DatAIFair platform recognizes the importance of protecting individual privacy while enabling the responsible development of AI/ML systems. To address this challenge, DatAIFair incorporates advanced privacy-preserving techniques, such as differential privacy and federated learning, to enable the use of sensitive data without compromising individual privacy.

Differential Privacy

Differential privacy is a mathematical framework that provides a formal guarantee of privacy protection for individual data points. In the context of the DatAIFair platform, differential privacy is applied to the data valuation process, ensuring that the importance of each data point can be accurately assessed without revealing any sensitive information about the individuals or entities represented in the data.

The DatAIFair platform employs differentially private algorithms to compute the data impact assessments and scarcity estimations, adding carefully calibrated noise to the results to prevent the identification of individual data points. This ensures that data providers can contribute their data to the platform without fear of their personal information being compromised.

Privacy-Preserving AI Training

The key techniques for enabling privacy-preserving AI training on the DatAIFair platform include:

Federated learning allows AI models to be trained on decentralized data sources, such as user devices, without the data ever leaving those devices. The model is trained collaboratively, with each device contributing updates to a shared model without exposing the underlying data.

Differential privacy is a technique that adds controlled noise to the training data or model updates, ensuring that the trained model does not reveal too much about any individual data point. This prevents the model from memorizing or leaking sensitive information from the training data.

Secure multi-party computation allows multiple parties to jointly train a model without revealing their private data to each other. The computations are performed in an encrypted manner, ensuring that no party can access the others' data.

Homomorphic encryption enables computations to be performed directly on encrypted data, without the need to decrypt it first. This allows AI models to be trained and run on encrypted data, preserving privacy.

The combination of these techniques—federated learning, differential privacy, secure multi-party computation, and homomorphic encryption—can create a privacy-preserving AI training pipeline that protects the data of individuals contributing to the training process.

```
# Federated Learning for Decentralized Corporate (Medical) Databases
class FederatedLearner:
    def __init__(self, model, corporate_databases):
        self.model = model
        self.corporate_databases = corporate_databases
        self.aggregator = ModelAggregator( )
    def train(self):
        for round in range(NUM_ROUNDS):
            # Select a subset of corporate databases for this round
            participating_databases = self.select_participating_databases( )
            # Perform local training on each participating database
            local_model_updates = [ ]
            for database in participating_databases:
                local_update = self.perform_local_training(database)
                local_model_updates.append(local_update)
            # Aggregate the local model updates
            global_model_update = self.aggregator.aggregate(local_model_updates)
            # Update the global model
            self.model.apply_update(global_model_update)
            # Evaluate the global model
            self.evaluate_model( )
    def select_participating_databases(self):
        # Implement logic to select a subset of corporate databases for this round
        return [db for db in self.corporate_databases if self.should_participate(db)]
    def should_participate(self, database):
        # Implement logic to determine if a database should participate in this round
        # e.g., based on data quality, availability, or other criteria
        return True
    def perform_local_training(self, database):
        # Perform model training on the local database
        local_model = self.model.copy( )
        local_model.fit(database)
        local_update = local_model.get_update( )
        return local_update
class ModelAggregator:
    def aggregate(self, local_model_updates):
        # Implement logic to aggregate the local model updates
        # e.g., using federated averaging or other techniques
        global_update = sum(local_model_updates) / len(local_model_updates)
        return global_update
# Example usage
corporate_databases = [db1, db2, db3, db4, db5]
language_model = load_language_model( )
learner = FederatedLearner(language_model, corporate_databases)
learner.train( )
```

The modules in the above can include:

Federated Learner: The FederatedLearner class is responsible for coordinating the federated learning process. It selects a subset of participating corporate databases, performs local training on each database, aggregates the local model updates, and updates the global model.

Local Training: The perform_local_training method is responsible for training the model on a local corporate database. The local model is trained on the database and the model update is returned.

Model Aggregation: The ModelAggregator class is responsible for aggregating the local model updates into a global model update. This can be done using techniques like federated averaging or other federated learning algorithms.

Participant Selection: The select_participating_databases method is responsible for selecting a subset of corporate databases to participate in each training round. This can be based on criteria such as data quality, availability, or other factors.

The local training process for each corporate database in the federated learning approach can use a select_participating_databases method which is responsible for selecting a subset of the corporate databases to participate in each training round. This selection can be based on criteria such as data quality, availability, or other factors. The perform_local_training method is where the actual model training is done on each participating corporate database. A copy of the global model is made and trained on the local database. The local model updates are then extracted and returned as the local model update. The pseudocode for the perform_local_training method is:

```
def perform_local_training(self, database):
    # Perform model training on the local database
    local_model = self.model.copy( )
    local_model.fit(database)
    local_update = local_model.get_update( )
    return local_update
```

This method creates a copy of the global model, trains it on the local database, and then extracts the model updates. The local model updates are then returned to be aggregated by the ModelAggregator class. By performing the model training locally on each corporate database and only sharing the model updates, this federated learning approach enables the development of high-quality language models while preserving data privacy and security.

Benefits of this federated learning approach may include the following. The data never leaves the corporate databases, ensuring data privacy and security. The federated learning approach can scale to a large number of corporate databases without the need to centralize the data. The corporate databases collaborate to train a shared model, leveraging the collective knowledge without exposing individual data. The federated learning process can be adapted to the specific needs and constraints of the corporate environment, such as participant selection criteria and aggregation techniques. This federated learning approach enables the training of high-quality language models on decentralized corporate data while preserving data privacy and security. By using these advanced privacy-preserving techniques, AI models can be trained on sensitive data, such as personal information, medical data, or business data, without compromising the privacy of the individuals or organizations involved. This enables the development of AI systems that leverage valuable data sources while respecting privacy regulations and building trust with users.

In one example, a video service such as Youtube or Tiktok could be compensated for providing video data to train AI models under the DatAIFair platform:

Data Ownership and Control: YouTube would maintain full ownership and control over the video data it provides through blockchain-based smart contracts on the DataIFair platform. YouTube can choose to share specific video data with model developers, while retaining the right to revoke access or withdraw the data at any time.

Fair Data Valuation: DataiFair's novel data valuation framework would assess the importance and scarcity of the video data YouTube provides, and compensate YouTube proportionally based on the actual value the data contributes to the trained AI models. The transparent and auditable nature of the data valuation process would ensure YouTube is fairly compensated for its data contributions.

Micropayments and Incentives: The blockchain-enabled platform would facilitate seamless micropayment systems, allowing YouTube to be compensated directly each time its video data is accessed for AI training. This creates a financial incentive for YouTube to participate in the DataIFair ecosystem and share its valuable data.

Privacy-Preserving Data Utilization: DataiFair incorporates privacy-enhancing techniques like differential privacy and federated learning, which would allow the video data to be used for AI training without compromising user privacy.

Transparent Transactions and Auditability: All transactions involving YouTube's video data, including the compensation received, would be recorded on the blockchain and made transparent to all participants. This level of transparency and auditability would build trust between YouTube and the model developers utilizing its data.

By leveraging the key features of the DataiFair platform-data ownership, fair valuation, micropayments, privacy protection, and transparency-YouTube could be fairly compensated for contributing its valuable video data to train AI models, while maintaining control over its assets and protecting user privacy. The aligned incentives and collaborative ecosystem of DataiFair would encourage participation in responsible AI development.

The decentralized data marketplace model described could be applied to local newspapers, magazines, or special interest publications (such as influencers and course publishers who publish special local knowledge or technical how tos) in the following ways:

Data Ownership and Control: The model empowers individual content creators and publishers (e.g., local newspapers, magazines, special interest publications) to maintain full ownership and control over their content data through blockchain-based smart contracts. Publishers can choose to share their content data with AI model developers, while retaining the right to revoke access or withdraw the data at any time.

Fair Data Valuation: The novel data valuation framework could be used to accurately assess the importance and scarcity of the content data provided by local publishers, ensuring they are compensated proportionally based on the value their data contributes to the trained AI models.

Privacy-Preserving Data Utilization: The privacy-enhancing techniques, such as differential privacy and federated learning, would allow the content data to be used for AI training without compromising the privacy of the individuals or organizations represented in the data. This would address concerns local publishers may have about protecting the privacy of their readers and contributors.

Transparent Transactions and Auditability: All transactions involving the local publishers' content data, including the compensation received, would be recorded on the blockchain and made transparent to all participants. This level of transparency and auditability would build trust between the local publishers and the AI model developers utilizing their data.

Incentive Alignment: The aligned incentives and collaborative ecosystem of the decentralized data marketplace would encourage participation from local publishers, who could benefit from fair compensation and the responsible development of AI systems that leverage their valuable content.

By leveraging the key features of the decentralized data marketplace model-data ownership, fair valuation, privacy protection, transparency, and aligned incentives-local newspapers, magazines, and special interest publications could be empowered to monetize their content data while maintaining control and protecting the privacy of their readers and contributors. This could help sustain local media ecosystems and promote the responsible development of AI systems that incorporate hyperlocal or specialized content.

Medical

The rapid advancements in artificial intelligence (AI) and machine learning (ML) have led to a surge in demand for high-quality training data, including sensitive medical data from hospitals, clinics, and other healthcare providers. In one embodiment, a decentralized medical data marketplace, named MedFair, empowers data providers (e.g., hospitals, clinics, patients) to maintain ownership and control over their data, while enabling fair compensation based on the actual value their data contributes to trained AI/ML models. MedFair utilizes a data valuation framework that can accurately attribute the importance of each data point, ensuring that data providers are rewarded proportionally to the impact of their contributions as follows:

Data Providers: Individuals and organizations that own and contribute medical data to the MedFair platform. Data providers maintain full control over their data and can choose to share it with model developers in exchange for fair compensation.

Model Developers: Entities, such as AI/ML researchers and healthcare technology companies, that utilize the data provided on the MedFair platform to train and improve their models. Model developers compensate data providers based on the value their data contributes to the trained models.

End-Users: Individuals and organizations that consume the AI/ML models developed on the MedFair platform. End-users can access these models by paying a fee, which is then distributed to the data providers and model developers based on their contributions.

MedFair Platform: The decentralized infrastructure that facilitates the secure and transparent exchange of data and model training. The MedFair platform is built on blockchain technology and incorporates advanced cryptographic techniques and machine learning algorithms to enable fair data valuation and compensation.

In the MedFair ecosystem, data providers are issued a unique blockchain address, or "data wallet," that represents their ownership of a specific dataset. This data wallet serves as a secure and tamper-resistant record of the data provider's ownership, allowing them to maintain full control over their data. When a data provider wishes to share their data with model developers, they can create a smart contract on the MedFair blockchain that defines the terms of the data sharing agreement. These smart contracts can include provisions such as:

Data Access Permissions: The data provider can specify which model developers are granted access to their data, and for what duration.

Data Usage Restrictions: The data provider can impose restrictions on how the data can be used, such as prohibiting the use of the data for certain purposes or the sharing of the data with unauthorized third parties.

Data Withdrawal Rights: The data provider can reserve the right to revoke access to their data or withdraw their data from the MedFair platform at any time.

By encoding these terms into blockchain-based smart contracts, data providers can ensure that their data is used in accordance with their preferences, and that they maintain the ability to control and protect their data assets. When a data provider uploads their data to the MedFair platform, the data is encrypted using the data provider's private key. This ensures that the data can only be accessed and used by authorized parties (i.e., model developers with the appropriate permissions) who possess the corresponding public key. MedFair utilizes secure multi-party computation (MPC) and differential privacy techniques to enable model training on sensitive medical data without compromising individual privacy. These privacy-preserving techniques allow model developers to train their AI/ML models on the data provided by data contributors, while ensuring that the underlying data remains confidential and protected.

By combining blockchain-based ownership, smart contracts, and cryptographic data protection, MedFair empowers data providers to maintain control over their medical data assets and participate in the data ecosystem on their own terms.

Data Valuation Framework includes a Data Impact Assessment component that evaluates the impact of each data point on the performance of the AI/ML model being trained. By analyzing the model's performance with and without a particular data point, the framework can quantify the importance of that data point in improving the model's accuracy, robustness, and other relevant metrics. A Data Scarcity Estimation component estimates the scarcity of a particular data point or dataset based on factors such as its uniqueness, rarity, and the demand for similar data in the market. The scarcity of a data point is a key factor in determining its value, as rare or unique data is generally more valuable than commonly available data. A Data Compensation Calculation component of the framework combines the data impact assessment and data scarcity estimation to calculate the appropriate compensation for each data point. This calculation takes into account the relative importance of the data point, its scarcity, and the overall budget available for data acquisition, ensuring that data providers are fairly compensated for their contributions. Machine learning techniques, such as feature importance analysis, meta-learning, and multi-task learning. These techniques enable the framework to accurately assess the value of data points, even in complex and high-dimensional medical datasets. All steps involved in the framework are recorded on the MedFair blockchain. This includes the data impact assessments, scarcity estimations, and final compensation calculations for each data point. Data providers can review the details of the valuation process for their contributed data, and model developers can verify the fairness and accuracy of the compensation paid to data providers. This transparency helps to build trust and accountability within the MedFair ecosystem, encouraging greater participation from both data providers and model developers.

All data transactions and model training processes are recorded on the blockchain, providing a tamper-resistant and auditable record of all activities within the ecosystem. When a data provider shares their medical data with a model developer on the MedFair platform, the transaction is recorded on the blockchain. This transaction includes details such as:

Data Provider's Identity: The unique blockchain address (data wallet) of the data provider.

Data Details: A cryptographic hash of the data being shared, along with metadata describing the data.

Compensation Terms: The agreed-upon compensation for the data, including the amount and the method of payment (e.g., cryptocurrency tokens).

Timestamp: The date and time of the data transaction.

Access Permissions: The specific model developers granted access to the data, and the duration of the access.

Similarly, when a model developer trains their AI/ML model using the data provided on the MedFair platform, the training process is also recorded on the blockchain. This record includes details such as:

Model Developer's Identity: The unique blockchain address of the model developer.

Model Details: A cryptographic hash of the trained model, along with metadata describing the model.

Data Utilized: The specific data points used in the model training process, along with their corresponding data providers.

Performance Metrics: The key performance metrics of the trained model, such as accuracy, precision, recall, and F1-score.

Timestamp: The date and time of the model training process.

By recording all these details on the blockchain, MedFair ensures that the entire data and model lifecycle is transparent and auditable. Data providers can verify that their data was used as intended and that they were compensated fairly, while model developers can demonstrate the provenance and quality of the data used in their models. The MedFair platform incorporates a decentralized dispute resolution system, where a panel of trusted arbitrators (selected from the MedFair community) can review the blockchain records and make a binding decision on the dispute. This dispute resolution process helps to maintain the integrity of the ecosystem and ensures that all participants are treated fairly.

Data providers on the MedFair platform are incentivized to contribute their medical data through fair compensation and the ability to maintain control over their data assets. The data valuation framework ensures that data providers are rewarded proportionally to the value their data contributes to the trained AI/ML models. Additionally, data providers can choose to share their data with specific model developers or retain the right to withdraw their data at any time. This level of control and ownership encourages data providers to actively participate in the MedFair ecosystem, knowing that their data is being used responsibly and that they are being fairly compensated.

End-users of the AI/ML models developed on the Med-Fair platform benefit from the responsible and ethical development of these models. The fair compensation of data providers and the transparent model training process help to ensure that the models are not biased or exploitative, and that they are developed with the best interests of end-users (e.g., patients, healthcare providers) in mind.

In one example, GPT can be used to do local distributed training on the MedFair platform as follows:

Users contribute their medical data to the MedFair platform under the terms of a smart contract, retaining ownership and control.

GPT model developers request access to the decentralized user data, and the data valuation framework determines the fair compensation.

Using differential privacy and federated learning techniques, the GPT model is trained on the local user data without exposing the raw information.

Model updates are shared back to the central GPT training system, and the users are compensated according to the smart contract terms.

The entire process is recorded on the MedFair blockchain, providing transparency and auditability for all participants.

the GPT model could be trained using differential privacy and federated learning techniques without exposing the raw user data:

The FederatedGPTTrainer class is responsible for coordinating the federated learning process. In the train method, we first convert the BatchNorm layers in the GPT model to make them compatible with differential privacy. Then, the process runs for the specified number of training rounds. In each round, we sample a subset of users to participate in the training process. For each sampled user, we call the train_on_user_data method, which computes the gradients on the user's local data. We aggregate the gradients from all the sampled users and apply differential privacy to the aggregated gradients using the PrivacyEngine from the *opacus* library. We then update the global GPT model with the differentially private gradients. After each round, we update the privacy accountant and check if the privacy budget has been exhausted. If so, we stop the training process. The training is performed on the user's local data, and only the model updates are shared with the central server. The aggregated gradients are clipped and randomized to ensure that the training process does not leak information about the individual user data. The PrivacyEngine keeps track of the privacy budget and stops the training process when the target privacy level is reached. By using this approach, the GPT model can be trained on sensitive user data without exposing the raw information, ensuring the privacy and security of the user data.

Next, pseudocode is detailed for a patient to agree to share their personal health information (PHI) with the MedFair platform and get compensated for downstream uses of their medical data:

```python
python
import tensorflow as tf
import numpy as np
from opacus import PrivacyEngine
from opacus.utils.module_modification import convert_batchnorm_modules
class FederatedGPTTrainer:
    def __init__(self, gpt_model, user_data_providers):
        self.gpt_model = gpt_model
        self.user_data_providers = user_data_providers
        self.privacy_engine = PrivacyEngine(self.gpt_model)
    def train(self, num_rounds, max_grad_norm, target_delta, target_epsilon):
        # Convert BatchNorm layers to make them compatible with differential privacy
        convert_batchnorm_modules(self.gpt_model)
        for round in range(num_rounds):
            print(f"Starting training round {round}")
            # Sample a subset of users for this round
            sampled_users = np.random.choice(self.user_data_providers,
size=min(len(self.user_data_providers), 10), replace=False)
            # Aggregate model updates from sampled users
            aggregated_grads = [ ]
            for user in sampled_users:
                user_grads = self.train_on_user_data(user)
                aggregated_grads.append(user_grads)
            # Apply differential privacy to the aggregated gradients
            clipped_grads, _ = self.privacy_engine.clip_and_accumulate(aggregated_grads)
            dp_grads = self.privacy_engine.randomize(clipped_grads)
            # Update the global GPT model
            self.gpt_model.optimizer.apply_gradients(zip(dp_grads,
self.gpt_model.trainable_variables))
            # Update privacy accountant
            self.privacy_engine.step(len(sampled_users), max_grad_norm)
            # Check privacy budget
            if self.privacy_engine.get_epsilon(target_delta) < target_epsilon:
                print(f"Privacy budget exhausted after {round} rounds. Stopping training.")
                break
    def train_on_user_data(self, user):
        user_data = user.get_data( )
        with tf.GradientTape( ) as tape:
            output = self.gpt_model(user_data)
            loss = self.gpt_model.loss(output, user_data)
        return tape.gradient(loss, self.gpt_model.trainable_variables)
```

```
# Patient Data Sharing Agreement
class PatientDataSharingAgreement:
    def __init__(self, patient, medFair):
        self.patient = patient
        self.medFair = medFair
        self.data_sharing_terms = self.define_data_sharing_terms( )
        self.compensation_terms = self.define_compensation_terms( )
    def define_data_sharing_terms(self):
        # Define the terms under which the patient will share their PHI
        # e.g., types of data, duration of sharing, usage restrictions, etc.
        data_sharing_terms = {
            "data_types": ["medical_records", "lab_results", "prescriptions"],
            "duration": 5, # years
            "usage_restrictions": ["no_resale", "no_identifying_info"]
        }
        return data_sharing_terms
    def define_compensation_terms(self):
        # Define the compensation the patient will receive for sharing their data
        # e.g., payment per data point, revenue share, etc.
        compensation_terms = {
            "payment_per_data_point": 0.10, # $0.10 per data point
            "revenue_share": 5 # 5% of revenue generated from data
        }
        return compensation_terms
    def create_smart_contract(self):
        # Create a smart contract on the blockchain that encodes the data sharing
        # and compensation terms
        smart_contract = SmartContract(self.data_sharing_terms, self.compensation_terms)
        smart_contract.deploy( )
        return smart_contract
    def share_data(self):
        # Share the patient's PHI with MedFair according to the smart contract
        self.medFair.receive_patient_data(self.patient.data)
    def receive_compensation(self):
        # Receive compensation from MedFair according to the smart contract
        compensation = self.medFair.pay_patient(self.patient)
        self.patient.wallet.deposit(compensation)
# Example usage
patient = Patient(name="John Doe", data={"medical_records": ..., "lab_results": ...,
"prescriptions": ...})
medFair = MedFairPlatform( )
agreement = PatientDataSharingAgreement(patient, medFair)
smart_contract = agreement.create_smart_contract( )
# Patient shares data
agreement.share_data( )
# Patient receives compensation
agreement.receive_compensation( )
```

The key aspects of this pseudocode are:

PatientDataSharingAgreement: The main class that handles the data sharing agreement between the patient and the MedFair platform.

define_data_sharing_terms( ) Defines the terms under which the patient will share their PHI, such as the types of data, duration of sharing, and usage restrictions.

define_compensation_terms( ) Defines the compensation the patient will receive for sharing their data, such as payment per data point and revenue share.

create_smart_contract( ) Creates a smart contract on the blockchain that encodes the data sharing and compensation terms.

share_data( ) Shares the patient's PHI with the MedFair platform according to the smart contract.

receive_compensation( ) Receives compensation from the MedFair platform according to the smart contract.

The example usage demonstrates how a patient can create a data sharing agreement with the MedFair platform, share their data, and receive compensation for its use.

Curriculum Learning

In another aspect, the data can be used with curriculum learning which is a technique used in training machine learning models, particularly language models, where the training data is fed to the model in a specific order or curriculum, rather than all at once. The idea behind curriculum learning is that by presenting the model with simpler or easier examples first, and then gradually increasing the complexity of the data, the model can form smarter connections between concepts and learn more effectively as follows:

Ordering the training data: The training data is organized and presented to the model in a specific order, from simple to complex. This could involve starting with shorter, less ambiguous sentences, and then gradually introducing longer, more complex sentences.

Pacing the curriculum: The pace at which the curriculum progresses is also important. The model should be given enough time to learn the simpler concepts before moving on to more complex ones, to avoid overwhelming the model.

Adapting the curriculum: The curriculum should be adaptable and responsive to the model's performance. If the model is struggling with a particular level of complexity, the curriculum can be adjusted to provide more examples at that level before moving on.

The benefits of curriculum learning for the pseudo-code below include:

Improved learning efficiency: By starting with simpler examples, the model can build a strong foundation of knowledge before tackling more complex concepts. This can lead to faster convergence and better overall performance.

Reduced risk of catastrophic forgetting: Catastrophic forgetting is a phenomenon where a model forgets previously learned information when exposed to new, conflicting data. Curriculum learning can help mitigate this by allowing the model to consolidate its learning gradually.

Better generalization: The gradual exposure to more complex data can help the model develop a more robust understanding of the underlying concepts, leading to better generalization to new, unseen examples.

```
# Curriculum Learning for YouTube Data
class CurriculumLearner:
    def __init__(self, model, youtube_data):
        self.model = model
        self.youtube_data = youtube_data
        self.curriculum = self.build_curriculum( )
    def build_curriculum(self):
        # Organize YouTube data by complexity
        simple_data = self.get_simple_youtube_data( )
        medium_data = self.get_medium_youtube_data( )
        complex_data = self.get_complex_youtube_data( )
        # Create curriculum stages
        curriculum = [
            {'data': simple_data, 'epochs': 5},
            {'data': medium_data, 'epochs': 10},
            {'data': complex_data, 'epochs': 15}
        ]
        return curriculum
    def get_simple_youtube_data(self):
        # Heuristics to identify simple YouTube data
        # e.g., shorter videos, less complex language, etc.
        return [vid for vid in self.youtube_data if self.is_simple(vid)]
    def get_medium_youtube_data(self):
        # Heuristics to identify medium complexity YouTube data
        return [vid for vid in self.youtube_data if self.is_medium(vid)]
    def get_complex_youtube_data(self):
        # Heuristics to identify complex YouTube data
        return [vid for vid in self.youtube_data if self.is_complex(vid)]
    def is_simple(self, video):
        # Implement heuristics to determine if a video is simple
        pass
    def is_medium(self, video):
        # Implement heuristics to determine if a video is medium complexity
        pass
    def is_complex(self, video):
        # Implement heuristics to determine if a video is complex
        pass
    def train(self):
        for stage in self.curriculum:
            data = stage['data']
            epochs = stage['epochs']
            self.model.fit(data, epochs=epochs)
            self.evaluate_model( )
            self.adjust_curriculum( )
    def evaluate_model(self):
        # Evaluate model performance on held-out test set
        pass
    def adjust_curriculum(self):
        # Monitor model performance and adjust curriculum if needed
        # e.g., increase/decrease difficulty, change pacing, etc.
        pass
# Example usage
youtube_data = load_youtube_data( )
model = load_language_model( )
learner = CurriculumLearner(model, youtube_data)
learner.train( )
```

The key aspects of this curriculum learning approach are:

Organizing YouTube Data by Complexity: The CurriculumLearner class first organizes the YouTube data into three categories: simple, medium, and complex. This is done using heuristics implemented in the get_simple_youtube_data, get_medium_youtube_data, and get_complex_youtube_data methods.

Building the Curriculum: The build_curriculum method creates a curriculum with three stages, each containing the corresponding data and the number of epochs to train on that data.

Training the Model: The train method iterates through the curriculum, training the model on each stage of the curriculum. After each stage, the model is evaluated, and the curriculum is adjusted if necessary.

Evaluating and Adjusting the Curriculum: The evaluate_model and adjust_curriculum methods are responsible for evaluating the model's performance and making any necessary adjustments to the curriculum, such as increasing or decreasing the difficulty of the data or changing the pacing of the training.

This curriculum learning approach aims to gradually expose the language model to more complex YouTube data, allowing it to build a stronger foundation and learn more effectively compared to training on the full dataset at once.

In another example, curriculum learning could be applied to training language models on medical personal health information (PHI) data, where the medical PHI data could include a variety of sensitive patient information, such as:

Electronic medical records

Clinical notes and doctor's reports

Diagnostic test results (e.g. lab reports, imaging scans)

Prescription drug information

Patient demographic and contact details

Billing and insurance information

Curriculum Learning Approach:

Organizing the PHI Data by Complexity

Simple PHI data: Short clinical notes, basic lab results, medication lists

Medium PHI data: Longer clinical notes, more detailed test results

Complex PHI data: Comprehensive medical records, complex treatment histories

Building the Curriculum

Stage 1 (5 epochs): Train the language model on the simple PHI data

Stage 2 (10 epochs): Train the model on the medium PHI data

Stage 3 (15 epochs): Train the model on the complex PHI data

Gradual Exposure to More Complex Data

Start with simpler PHI data to allow the model to build a strong foundation; Slowly introduce more complex and sensitive medical information; Monitor model performance and adjust the curriculum if needed; Utilize differential privacy and federated learning to train the model without exposing raw PHI data; and Aggregate updates from multiple healthcare providers without centralizing the sensitive data This curriculum learning approach aims to enable the language model to learn medical concepts and terminology effectively, while also protecting patient privacy. By gradually exposing the model to more complex PHI data, it can build robust representations of medical information without being overwhelmed or risking catastrophic forgetting.

The privacy-preserving techniques like differential privacy and federated learning ensure that the sensitive PHI data is never directly accessed or stored by the central training system. This allows the model to be trained on valuable medical data while fully respecting patient privacy regulations and building trust with healthcare providers.

One embodiment seeks to provide a method of providing a robust method of registering, transferring, licensing, applying, and valuating confidential training data assets using a decentralized ecosystem. This decentralized network will require at least one server, a processor, and at least one networking interface ("Network" or "DataIFair Platform" or "DataIFair"). Such a Network will allow the connection of user devices through the Internet. The Network itself will consist of at least one server, which will host a webpage, that when executed, will allow users to access a portal and be identified cryptographically using a private key and public key. The web portal or other network connected device will provide a platform to connect a data owner with other stakeholders in the data process.

In order for a decentralized system to function, one embodiment of the present invention envisions a data ecosystem functioning on a blockchain network. In one embodiment of the present invention, a transaction tool powered by smart contracts, combines solutions from the legal and payment industries to achieve a transparent system. Confidential data is subsequently maintained in a Registry that is accessible using a decentralized application ("DApp"). Each party involved in a data transaction—including the owner, licensee, buyer, broker and lawyers—can use the DApp to sign off on a transaction for the data.

In another embodiment, the workflow of the processes has been built to meet the current rules within the legacy registry system currently in use by the majority of data providers.

In one embodiment of the present invention, the decentralized network is a blockchain network. Blockchain technology (sometimes simply referred to as a blockchain) was developed and has been used in certain digital currency implementations such as Satoshi Nakamoto's "Bitcoin: A Peer-to-Peer Electronic Cash System," the entire contents of which are hereby incorporated by reference. With that being said, in certain embodiments discussed herein, the blockchain may be privately hosted (e.g., where all member nodes are run and provided by the same entity or a controlled group of entities). In certain example embodiments, the blockchain may be a distributed blockchain, such as the one provided by the bitcoin network. Thus, the term blockchain as used herein is not confined to the so-called blockchain that is only used for the bitcoin cryptographic currency.

The blockchain is a data structure that stores a list of transactions and can be thought of as a distributed electronic ledger that records transactions between source identifier(s) and destination identifier(s). Every transaction is "to" a destination identifier that is associated with a public/private key pair. In creating a new transaction, outputs from other, prior transactions that are to the "from" address (which may be multiple different addresses derived from the same private key) are used as inputs for this new transaction. The new transaction is then encumbered with the public key associated with the "to" destination identifier. In other words, outputs from prior blockchain transactions are used as inputs for new transactions that are then signed using the public key associated with the destination address. The new blockchain transaction is then submitted to the blockchain. Once on the blockchain multiple such transactions are bundled into a block and the block is linked to a prior block in the "blockchain." Computer nodes of the distributed system then maintain the blockchain and validate each new block (along with the transactions contained in the corresponding block). The techniques described herein make use of blockchain technology to address one or more problems with the conventional database systems to provide a pooled resource for data owners and other stakeholders.

A computer, network, or blockchain, may deploy a smart contract. A smart contract is computer code that implements transactions of a contract. The computer code may be executed in a secure platform (e.g., an Ethereum platform, IBM Hyperledger platform) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes initializing the smart contract and its state. The state of a smart contract is stored persistently in the blockchain (e.g., via a Merkle tree). When a transaction is recorded against a smart contract, a message is sent to the smart contract and the computer code of the smart contract executes to implement the transaction (e.g., debit a certain amount from the balance of an account, transfer the ownership of data). The computer processes the code and ensures that all the terms of the contract are complied with before the transaction is recorded in the blockchain. For example, a smart contract may request an exchange of one type of cryptocurrency token to another. The computer executes code to determine the exchange rate and transfers the correct amount of tokens to and from the correct accounts. The blockchain network may include multiple computers, networks, links, and databases. Miners may manage the blockchain, whereas the managing may include, for example, validating a smart contract and/or transaction according to the smart contract, updating the blockchain with a validated smart contract and update the blockchain with a transaction that is executed according to the smart contract, determine that a suggested smart contract is invalid, determine that a transaction is not according to a smart contract, and the like. In some embodiments, a smart contract may be accompanied by a digital certificate, or a digital signature which contains information regarding the source of the transaction. The computer, network, or blockchain will validate this information and determine the authenticity of the source of the transaction prior to deploying the smart contract.

The smart contract may determine the rules for evaluating a token price and an initial status of the token (such as the reserve of the token) and any other rules that should be applied during a transaction.

The above mentioned data recordation method is transparent (As it can be viewed by various (usually all) participants of the blockchain network (and even other computers that are coupled to the blockchain network) smart contracts in a blockchain network in which the content of the smart contract and any transaction according to the smart contracts), and dramatically reduces the computer resources that should allocated with the transactions between different coins, and provides a robust system for data searches, registration, brokering, transfers, and exchange (as it does not have a single point of failure).

In one embodiment of the present invention, a registry ("DataIFair Registry") is used to record information regarding confidential data on the blockchain. Each data asset has an owner. The owner—also called the "contributor" when the data is in the contribution stage and the "assignee" once the data is accepted—is encouraged, but not required, to file an assignment record with the various data providers to serve as evidence of ownership. These assignment databases are run by organizations that receive the assignment information by electronic filing—which then take time to record and become publicly available.

In one exemplary architecture to do distributed training for large language models (LLMs) like GPT:

Decentralized Data Registry:

The system would create a decentralized, blockchain-based registry to store and manage the training data for the LLM. This decentralized data registry would address the shortcomings of centralized databases, improving the reliability, efficiency, and transparency of the data management processes.

The system would leverage federated learning techniques to enable the training of the LLM on the decentralized training data without the data ever leaving the local devices or databases.

Each participant (e.g., individual, organization) would train a local model on their own data, and only the model updates would be shared with the central training system.

To further protect the privacy of the training data, the system would incorporate differential privacy techniques.

The model updates shared during the federated learning process would be carefully perturbed to prevent the leakage of sensitive information from the underlying data.

In addition to federated learning and differential privacy, the system could also leverage secure multi-party computation (MPC) techniques.

MPC would allow the central training system to perform computations on the encrypted model updates without ever accessing the raw data.

To encourage broader participation in the distributed training process, the system could utilize a virtual currency or cryptocurrency-based reward system.

Participants who contribute their data and compute resources would be compensated for their contributions, aligning the incentives of all stakeholders.

All the transactions related to the distributed training process, including data contributions, model updates, and reward payments, would be recorded on the blockchain.

This would provide transparency and auditability for the entire training lifecycle, addressing concerns about the provenance and integrity of the training data and model.

By leveraging the decentralized data registry, federated learning, and secure multi-party computation, the system would be able to scale the distributed training process to handle large volumes of diverse training data. The automated and efficient nature of the system would also help reduce the computational and storage requirements compared to traditional centralized training approaches. This architecture combines the benefits of blockchain technology, federated learning, differential privacy, and secure multi-party computation to enable the distributed training of large language models like GPT while preserving the privacy and security of the training data. The incentivized participation model and transparent, auditable transactions further enhance the collaborative and responsible development of these powerful AI systems.

Distributed LLM Training on Blockchain Supercomputer distributed training for GPT using a mix of affordable and specialized GPU hardware on a blockchain, similar to mining:

Distributed GPT Training on a Blockchain

Leverage Existing Large Language Models: Start with an existing large language model like GPT-3 or LLaMA, rather than training from scratch. This allows you to build upon the compute and training already done by others.

Employ Distributed Parallelism Strategies:

Data Parallelism: Split the training data across multiple devices and have each device train on its own subset in parallel.

Model Parallelism:

Pipeline Parallelism: Split the GPT model across multiple devices, with each device handling a different stage of the model. This can improve training efficiency.

Tensor Parallelism: Distribute the model's parameters across multiple devices, allowing for larger model sizes.

Use a Blockchain-Based Distributed Training Framework:

Leverage a framework like HPE Swarm Learning that utilizes blockchain technology to enable a peer-to-peer network between the distributed training nodes.

The blockchain ensures the secure exchange of model parameters between the nodes, preventing tampering and maintaining the integrity of the training process.

Mix Affordable and Specialized GPU Hardware: Use a combination of affordable GPUs (e.g., RTX 2070) and specialized AI-focused GPUs (e.g., Nvidia A100) to create a heterogeneous hardware setup. The affordable GPUs can handle the bulk of the training workload, while the specialized GPUs can be used for more compute-intensive tasks like model inference.

Incentivize Participation with a Mining-like Reward System: Implement a mining-like reward system, where participants are incentivized to contribute their GPU resources to the distributed training process. Similar to cryptocurrency mining, participants could receive rewards (e.g., tokens) for successfully updating the GPT model parameters with new training data. This creates a decentralized, incentivized network of participants contributing to the continuous improvement of the GPT model.

Ensure Data Privacy and Compliance: The blockchain-based framework should enable the exchange of model parameters without the need to share the underlying training data. This helps address data privacy and compliance concerns. The distributed nature of the training process, with data remaining at the edge, can also help mitigate issues related to data ownership and regulations.

By leveraging this approach, the system can efficiently train and update the GPT model using a mix of affordable and specialized GPU hardware, while maintaining the integrity and security of the training process through the use of blockchain technology and a decentralized, incentivized network of participants. In one aspect for distributed GPT training on a blockchain:

A method for distributed training of a large language model on a blockchain network, the method comprising:

Obtaining an existing large language model, such as GPT-3 or LLaMA, as a starting point for further training;

Splitting the training data across multiple devices in the blockchain network;

Employing data parallelism to have each device train on its own subset of the training data in parallel;

Utilizing model parallelism techniques, such as pipeline parallelism and tensor parallelism, to distribute the model across the devices;

Leveraging a blockchain-based distributed training framework to securely exchange model parameters between the devices and maintain the integrity of the training process.

In one embodiment:

Utilizing a mix of affordable and specialized GPU hardware, such as RTX 2070 and Nvidia A100, to create a heterogeneous hardware setup;

Assigning the bulk of the training workload to the affordable GPUs and using the specialized GPUs for more compute-intensive tasks, such as model inference.

In one embodiment:

Implementing a mining-like reward system to incentivize participants to contribute their GPU resources to the distributed training process;

Rewarding participants (e.g., with tokens) for successfully updating the large language model with new training data.

In one embodiment:

Ensuring data privacy and compliance by enabling the exchange of model parameters without the need to share the underlying training data;

Leveraging the decentralized nature of the blockchain network to mitigate issues related to data ownership and regulations.

In one embodiment:

Continuously updating the large language model by incorporating new training data into the distributed training process;

Maintaining the integrity and security of the model updates through the use of blockchain technology.

In one embodiment:

Dynamically adjusting the model placement and parallelism strategies based on the available hardware resources and performance requirements;

Optimizing the distributed training process to address bottlenecks, such as the generation stage in RLHF training.

In one embodiment:

Enabling the participation of a diverse set of hardware resources, including edge devices and mobile GPUs, in the distributed training process;

Leveraging the decentralized nature of the blockchain network to harness the collective computing power of the participants.

In one embodiment Integrating the distributed training process with other blockchain-based applications, such as decentralized storage or federated learning, to create a comprehensive ecosystem for large language model development and deployment.

In one embodiment:

Providing mechanisms for the transparent and auditable tracking of the training process, model updates, and participant contributions;

Enabling the community to collectively monitor and validate the integrity of the distributed training system.

A method for promoting, maintaining, registering, and examining AI training data assets:

a network, the network comprising:

a plurality of nodes, wherein each node in the plurality of nodes is configured to transact autonomously with at least two nodes in the plurality of nodes and configured to communicate with at least one server;

the at least one server, the at least one server comprising at least one hardware processor, a non-transitory machine-readable storage medium having an executable computer readable program code, the at least one hardware processor configured to execute the computer-readable program code;

the server, capable of identifying at least one account holder using a private key and a public key and connected to an at least one user device;

The user device capable of communicating with the plurality of nodes.

In one embodiment, wherein the at least one server is further configured autonomously transact with the at least one account holder.

In one embodiment, wherein a first account holder can be associated with at least one other account holder.

The user device, capable of uploading information regarding AI training data assets.

In one embodiment, capable of issuing rewards in the form of virtual currency.

In one embodiment, capable of issuing rewards in the form of FIAT currency.

In one embodiment, further configured allow searches for AI training data.

In one embodiment, configured as a decentralized network.

In one embodiment, configured as a distributed network.

In one embodiment, configured a blockchain network.

In one embodiment, further configured to allow code to be executed that can record a change in ownership of an AI training data asset.

In one embodiment, further configured to allow code to be executed to define rules for registration of an AI training data asset.

In one embodiment 2, further configured to execute code to register an AI training data contribution.

In one embodiment, configured to allow the at least one user to contribute, sell, or license the at least one AI training data asset.

In one embodiment, configured to allow the at least one user to pay maintenance or renewal fees for an AI training data asset.

In one embodiment 6, further configured to allow payment of fees using a virtual currency token.

In one embodiment, further configured to allow payment of any governmental fee.

In one embodiment, further configured to allow payment of any private intermediary fee, including a data broker or AI model developer fee.

In one embodiment, further configured to apply for AI training data contributions.

In one embodiment, further configured to accept evidence of AI training data contributions.

In one embodiment, further configured such that at least one intermediary may upload AI model performance reports or AI training data valuation reports for sale.

In one embodiment, further configured such that at least one user can request AI model performance reports or AI training data valuations from at least one intermediaries.

In one embodiment, further configured to record data contributor exclusions.

A method for registering, recording, searching, or managing AI training data on a network, the network comprising:

a server, the server comprising at least one hardware processor, a non-transitory machine-readable storage medium, the server configured to:

receive at least one user input regarding at least one AI training data asset;

validate the user identity in connection with the AI training data asset;

In one embodiment, further configured as a distributed network.

In one embodiment, further configured as a blockchain network.

In one embodiment, wherein the network is configured to allow categorical searching of AI training data assets.

In one embodiment, capable of storing data regarding AI training data asset values.

In one embodiment, further capable of allowing communication between the at least two stakeholders.

In one embodiment, capable of analyzing and storing information regarding the at least two stakeholders.

In one embodiment, wherein each of the at least two stakeholders can define the terms governing the distribution of an AI training data asset.

In one embodiment, wherein each of the at least two stakeholders can define the amount of the reward;

In one embodiment, wherein the reward is distributed to a digital wallet.

A decentralized network for maintaining AI training data assets, the decentralized network comprising:

At least one hardware processor, a non-transitory machine-readable storage medium having an executable computer readable program code, the at least one hardware processor configured to execute the computer-readable program code to:

receive an executable smart contract;

the smart contract containing at least one term governing the ownership of an AI training data asset, a registration status, and an address of owner of the AI training data asset;

receive a request to validate the completion of the at least one term of the smart contract, validate the completion of the at least one term of smart contract;

assign a user information associated with an AI training data asset the distribution address;

and update a ledger with the distribution information.

The decentralized network, wherein the at least one term governing the assignment of an AI training data asset is of a reward is defined by at least one end user.

The decentralized network, wherein the at least one term governing the registration of an AI training data asset is autonomously determined based on publicly available regulations.

The decentralized network, wherein the transfer of ownership of an AI training data asset is defined by at least one end user.

The decentralized network, wherein the value of an AI training data asset is autonomously determined.

The decentralized network, wherein the at least one term governing the prior data associated with an AI model is autonomously created.

In one embodiment, further configured to allow payment of any governmental fee.

In one embodiment, further configured to allow payment of any private intermediary fee, including a data broker or AI model developer fee.

In one embodiment, further configured to apply for AI training data contributions.

In one embodiment, further configured to accept evidence of AI training data contributions.

In one embodiment, further configured such that at least one intermediary may upload AI model performance reports or AI training data valuation reports for sale.

In one embodiment, further configured such that at least one user can request AI model performance reports or AI training data valuations from at least one intermediaries.

In one embodiment, further configured to record data contributor exclusions.

In one aspect, a privacy-preserving data collaboration platform comprises a plurality of participant nodes, each configured to locally convert sensitive source data into cryptographic shares in accordance with a standardized aggregation schema. The reference label S2000 denotes this plurality of participant nodes and refers to a set of computing entities that perform local preprocessing of sensitive source data to generate cryptographic shares in conformance with the prescribed aggregation schema, wherein each participant node retains exclusive possession of its source data and outputs only non-reconstructable shares for transmission to other system components.

The platform further comprises a plurality of independent aggregation servers, each configured to receive a subset of the cryptographic shares from the participant nodes, and at least one collector node configured to receive aggregation results from the aggregation servers. Each aggregation server is configured to combine the received shares to produce at least one aggregate metric, such that the aggregate metric is provably correct via a verifiable distributed aggregation function (VDAF), and wherein no raw or reconstructable source data is revealed to any party other than the originating participant node. In embodiments, participant nodes operate on separate physical hosts within distinct organizations to enable cross-institution analytics without centralized storage of raw data, and communications among participant nodes, aggregation servers, and the collector node are conducted under protocols that preserve confidentiality and integrity.

Reference S2002 identifies a plurality of independent aggregation servers. Each aggregation server designated by S2002 is configured to receive a subset of the cryptographic shares generated and transmitted by the participant nodes, such that no aggregation server individually receives sufficient information to reconstruct original source data, and each aggregation server independently processes its received subset of shares as part of the distributed aggregation workflow.

Reference label S2004 denotes at least one collector node configured to receive aggregation results from said aggregation servers. The at least one collector node receives the provably correct aggregate metrics produced by the aggregation servers and forwards or makes available the aggregation results to authorized recipients, performing any required post-aggregation processing while remaining unable to access underlying raw source data or reconstructable shares, thereby preserving participant data confidentiality.

Reference label S2006 corresponds to the claim limitation that each aggregation server is configured to combine received shares to produce at least one aggregate metric, where the aggregate metric is provably correct via a verifiable distributed aggregation function (VDAF), and wherein no raw or reconstructable source data is revealed to any party other than the originating participant node.

FIG. 2 illustrates a flow in which, at S600, the platform operates such that each participant node runs on a separate physical host within distinct organizations, thereby distributing computation, and, at S602, this arrangement enables cross institution analytics without centralized data storage.

Reference label S600 denotes the operation in which each participant node is deployed on a separate physical host managed by a distinct organization, providing organizational and host-level isolation during local processing and generation of cryptographic shares prior to transmission.

Reference label S602 denotes the operation in which cross institution analytics are performed without centralizing participant data. In this operation, each participant node retains its sensitive records on a local host and produces cryptographic shares according to a standardized aggregation schema. Only the shares are provided to independent aggregation servers, which combine the received shares via a verifiable distributed aggregation function to yield one or more aggregate metrics with verifiability artifacts. A collector node receives the aggregation results, not raw or reconstructable source data, thereby enabling analytic insights that span multiple organizations without a shared raw data repository and while maintaining privacy and data minimization properties across administrative boundaries.

Each participant node implements the standardized aggregation schema to transform locally-held sensitive source data into an encoded aggregation-domain representation and then into a set of cryptographic shares suitable for distributed aggregation. The standardized aggregation schema specifies the aggregation domain, input encoding (e.g., bucketization, fixed-point encoding, or categorical mapping), share generation procedures, and verification parameters. Prior to share generation, the participant node performs schema-conformant validation and normalization to ensure inputs lie inside allowed ranges and to enforce consistent encodings across participants. For each reporting epoch, the participant node generates randomness and derives cryptographic shares using secret-sharing, additive-masking, or other share-splitting primitives so that each aggregation server receives only a subset of the shares and no single server can reconstruct the participant's original input. Each share is bound to the originating participant and to the epoch via metadata and authenticated using a message authentication code or digital signature to prevent tampering and replay.

Aggregation servers receive their respective shares over authenticated, confidential channels and first validate conformity with the standardized schema and the attached authentication metadata. Servers perform lightweight checks such as domain membership, consistency of epoch identifiers, and authentication verification before accepting shares for aggregation. Each aggregation server participates in a verifiable distributed aggregation function (VDAF) protocol that prescribes how the received shares are combined to compute aggregate metrics (for example sums, histograms, counts, or privacy-preserving sketches) and how a succinct correctness proof is produced. The VDAF enforces that the combination of shares yields a provably correct aggregate under the schema encoding while preserving the secrecy of individual inputs. Servers use cryptographic building blocks such as commitments, pseudorandom generators, and threshold-resilient combinations to produce an aggregate value along with a proof object that attests to correctness relative to the VDAF specification.

At least one collector node receives aggregate results and associated proof objects from the aggregation servers. The collector node verifies the proofs to confirm correctness of the aggregate metrics without gaining access to any raw or reconstructable participant data. Verification can include checking that the distributed combination followed the VDAF, that authentication metadata was valid for the reporting epoch, and that any allowed bounds or clipping rules from the schema were applied. The architecture supports fault tolerance and graceful handling of missing or delayed shares by allowing the VDAF and schema to specify tolerated loss thresholds, interpolation, or re-sharding procedures.

Privacy is preserved because no party other than the originating participant holds sufficient information to reconstruct source data: aggregation servers only hold disjoint subsets of non-reconstructable shares and the collector only receives aggregated outputs and proofs. The system supports cross-institution analytics without centralized data storage by placing each participant node on separate physical hosts within distinct organizations, enabling collaborative computation of useful aggregate metrics while keeping raw data localized and cryptographically protected.

Each participant node converts sensitive source data into cryptographic shares according to the standardized aggregation schema and serializes each share into a stable JSON wire format prior to transmission. The serialized JSON object contains a fixed set of fields required by the schema, including a schema identifier, serialization version, epoch or time-window identifier, participant pseudonymous identifier, share index or destination-server identifier, the cryptographic share payload encoded as a canonical binary-to-text string, and any associated VDAF metadata and auxiliary proof material. The JSON wire format is canonical and deterministic: field names and ordering are fixed by the schema, UTF-8 encoding is required for strings, numbers are encoded in a deterministic decimal form, insignificant whitespace is disallowed, and binary fields employ a specified URL-compatible base64 encoding. The serialization version field enables forward and backward compatibility, while the schema identifier binds the serialized bytes to the exact aggregation semantics used to generate the share.

Participants compute integrity/authenticity tokens over the canonical JSON bytes prior to transmission. The integrity/authenticity tokens are instantiated as digital signatures or message authentication codes whose input is explicitly the canonical serialization, thereby enabling any recipient to verify that the received JSON bytes correspond exactly to the authenticated share. Each aggregation server validates incoming JSON shares by checking conformity with the schema identifier and serialization version; verifying presence and format of required fields; canonicalizing the received bytes in accordance with the schema rules; and verifying the integrity/authenticity token. Upon successful validation, aggregation servers accept the verified shares as inputs to the VDAF. The VDAF processes subsets of shares held at each aggregation server and produces aggregate metrics together with a verifiable proof object; all proof generation references the canonical serialized representations and schema identifiers used by the participant nodes, thereby binding the proof to the exact transmitted shares.

The stable JSON wire format supports deterministic proof verification by the collector node, which re-applies canonicalization rules to any retained or replayed shares or to proof metadata as needed. Throughout the process no raw or reconstructable source data is exposed: the share generation procedure is constructed so that individual shares or any subset available to a single party do not allow recovery of the original source inputs, and the combination performed by aggregation servers yields only aggregate metrics verifiable via the VDAF. Aggregation servers reject malformed or nonconforming JSON shares, and versioning ensures graceful evolution of the wire format without breaking verification semantics.

The aggregation schema comprises a publicly shared metrics definition stored in a YAML file that specifies at least one aggregation function and corresponding data attributes. The YAML definition encodes machine- and human-readable metadata used by participant nodes to convert local sensitive source data into cryptographic shares and by aggregation servers to validate, combine, and verify those shares. Core entries in the YAML include metric_id, schema_version, aggregation_function, input_attributes, contribution_rules, value_encoding, vdaf_parameters, output_domain, and verification_spec. The aggregation_function entry identifies the aggregation primitive (for example COUNT, SUM, HISTOGRAM, MIN, MAX, BUCKETED_SUM) together with algorithm-specific parameters (e.g., histogram bucket boundaries, quantization step, numeric precision). The input_attributes section lists each data attribute by name, type (integer, float, categorical, timestamp), expected domain or bounds, canonical encoding (endian, two's complement, fixed-point scale), and any required normalization or bucketing procedures. contribution_rules specify per-participant contribution bounds, per-metric contribution limits, and allowed deduplication or grouping keys to ensure correct contribution bounding prior to share generation.

The value_encoding and canonicalization entries define deterministic procedures for serializing attribute values into the canonical byte representations consumed by share-generation routines, including ordering, padding, and field separators. The vdaf_parameters block provides all parameters required by the verifiable distributed aggregation function: number of aggregation servers, threshold parameters, randomness seeds or seed-derivation methods, proof format identifiers, and cryptographic primitives (hash functions, curve identifiers, MAC or signature schemes). The verification_spec entry describes the structure of proof objects produced by aggregation servers and the steps a collector node performs to validate proofs without learning individual inputs.

The YAML file also includes metadata fields for lifecycle management: authoring authority, publication timestamp, signature or checksum for authenticity, backward-compatible versioning rules, and migration guidance when attributes or aggregation semantics change. Participant nodes fetch and cache the YAML; changes are accepted only after signature validation and version negotiation to prevent silent semantic shifts. During local preprocessing, participant nodes consult the YAML to perform attribute selection, clipping, quantization, canonical encoding, contribution limiting, and share generation according to the specified VDAF-compatible mapping. Aggregation servers validate incoming shares against the YAML-defined attribute types, bounds, and contribution limits prior to combining; nonconforming shares are rejected and logged.

By publishing the metrics definition in a standardized YAML format, heterogeneous participants and independent aggregation servers interoperably implement the same aggregation semantics, enabling provably correct, auditable distributed analytics without centralizing raw or reconstructable source data.

Each aggregation server independently enforces canonical schema conformance by computing and validating a cryptographic parameter hash that binds the standardized aggregation schema to the current protocol session. The parameter set comprises all elements that influence data encoding and share generation, including but not limited to: aggregation domain identifier, VDAF identifier and parameters, input encoding rules, numeric ranges and precision, modulus or field description, share-generation algorithm identifiers, verification parameters, protocol version, and any session-specific salts or nonces. Prior to use, the full parameter set is serialized into a canonical representation (deterministic field ordering, canonical integer and string encodings, and explicit unit tags) to prevent equivocation due to semantically equivalent but syntactically different encodings.

A domain-separated cryptographic hash function (for example, SHA-256 with an explicit domain prefix) is applied to the canonical serialization to produce the parameter hash. To protect against replay and to bind parameters to a particular aggregation epoch, the serialization includes a session identifier and an epoch timestamp or a monotonic counter. For large or extensible parameter collections, a Merkle-tree commitment can be used, with the root hash treated as the parameter hash; leaf-level commitments enable compact proofs of inclusion for optional parameters.

During setup, participant nodes and collector entities exchange the parameter hash over authenticated channels and sign the hash with their respective persistent credentials. Aggregation servers obtain the signed parameter hash from participants or from a trusted directory service and verify signature validity and certificate revocation status. Independently, each aggregation server recomputes the parameter hash from its locally stored canonical schema and session fields. Verification succeeds only if the locally computed hash equals the received signed hash and all required signatures validate. A mismatch causes the aggregation server to abort processing for the affected session and to emit an auditable error record describing the inconsistency; the server can request a re-synchronization broadcast or a signed parameter update.

To prevent man-in-the-middle substitution by malicious servers, parameter hashes are carried into cryptographic commitments and proofs produced by the VDAF: the parameter hash is included in VDAF commitment inputs and in any non-interactive zero-knowledge proofs or proof transcripts. The collector and participant nodes verify that the parameter hash contained in the proof matches the previously agreed hash before accepting aggregated outputs. Parameter updates follow a signed-rollover procedure in which a new canonical serialization and hash are published with migration metadata (effective epoch and deprecation window). Aggregation servers enforce migration windows and continue to log hash provenance to enable post-facto audits, thereby ensuring that schema parameters used in aggregation are provably the ones agreed between participating entities.

The VDAF implementation relies on CIRCL for foundational cryptographic primitives used in proof generation and verification. CIRCL provides deterministic, well-audited implementations of elliptic-curve operations, hashing, key-derivation functions (KDFs), and authenticated encryption primitives, which are used to construct commitments, commitment openings, and non-interactive proofs as required by the IETF VDAF profile. Proof objects bind the aggregate metric to the epoch, aggregation-schema identifier, and the set of contributing participant identifiers or commitments, and are constructed so that a collector can verify correctness without access to underlying shares or raw inputs.

Each participant node is instantiated on a physically separate computing host that is owned or operated by a distinct organizational entity, and is configured to retain full control over its local sensitive source data. The participant node executes local preprocessing operations that convert raw inputs into cryptographic shares or encodings in accordance with a standardized aggregation schema. Conversion is performed within the security domain of the participant host, optionally leveraging hardware-backed key material (for example, an HSM or TPM) to protect secrets used during share generation. No raw or reconstructable source data is exported from the participant host; only the resulting cryptographic shares, labeled and sized per the aggregation schema, are transmitted off-host.

Inter-node communication is restricted to transmission of shares to designated aggregation servers via authenticated, encrypted channels. Network endpoints are discovered or configured according to organizational policies; connection establishment can require mutual TLS, client certificates, or token-based authentication bound to the participant identity. The participant node enforces local policy checks prior to share emission, including consent verification, schema conformance, and rate-limiting. Audit logs describing share generation events are maintained locally and are capable of being cryptographically signed to support later dispute resolution or compliance review without disclosing underlying sensitive values.

Deployment supports fault tolerance and scalability by permitting participant nodes to partition shares among multiple aggregation servers and to retransmit or rekey shares when servers are rotated. Participant nodes can be configured to respect organizational network topologies, egress controls, and logging requirements. The system supports optional privacy enhancements such as differential privacy post-processing or threshold guarantees embedded within the VDAF. Governance mechanisms allow organizations to configure acceptable aggregation queries, auditors, and disclosure thresholds; participant nodes enforce these constraints locally before participating in any aggregation. Use cases include multi-institution research, federated telemetry, and cross-organization business intelligence, each benefiting from analytics that produce provably correct aggregates without centralized storage of sensitive source data.

The collector node enforces a policy that only final aggregate values are retained for output; intermediate aggregation states, partial aggregates, raw shares, and any reconstructable derivatives are neither requested nor stored. To effect this, the collector accepts only outputs that represent fully combined metrics as defined by the aggregation schema (for example, a sum, count, histogram bin, or other aggregate domain element) and rejects or discards any message containing element types deemed intermediate or per-participant. The collector maintains an access control module that logs only metadata necessary for audit and reproducibility (such as aggregation round identifiers, schema identifiers, timestamps, and verification outcomes) while ensuring that such logs cannot be used to infer individual data values.

The collector node is configured to apply disclosure controls prior to output to prevent inference from small aggregates or sparse buckets. These controls include, but are not limited to, thresholding (suppressing outputs below a minimum contributor count), binning (coarsening value domains), and addition of calibrated noise in accordance with a selected differential privacy mechanism. Such disclosure controls are applied only after successful proof verification and only to the final aggregate values; the collector ensures that their application does not rely on or expose intermediate aggregation results or participant-level information.

To preserve privacy and correctness across dynamic updates, the system supports version tagging and backward-compatibility rules embedded in metrics.yaml entries. Each share and aggregation message includes a metrics schema version identifier so aggregation servers only combine shares produced under a common schema version. If an update introduces incompatible changes, participant nodes and aggregation servers negotiate a migration window during which both old and new schemas are accepted and results are labeled with schema version metadata. The configuration distribution service supports roll-back to prior metrics.yaml versions on detection of validation failures, and components retain prior configurations for graceful fallback. Secure distribution, signature verification, atomic swap semantics, versioning, and VDAF-aware validation together enable dynamic, hot-swappable metric definition while maintaining provable correctness and non-disclosure of raw source data.

The system further comprises an application programming interface (API) that provides schema management and aggregation control functions to coordinate operations among the plurality of participant nodes (S2000), the plurality of independent aggregation servers (S2002), and the at least one collector node (S2004). The API exposes programmatic operations to define, publish, version, and retire standardized aggregation schemas used by participant nodes to convert sensitive source data into cryptographic shares. Schema management operations include creation of an aggregation domain, specification of input encodings, share generation procedures, VDAF selection and parameters, verification parameter distributions, and policy metadata such as retention, update windows, and compatibility constraints. The API validates proposed schemas against syntactic and semantic rules and signs approved schemas to enable authenticated distribution to participant nodes. Participant nodes poll or are notified of schema updates and fetch signed schema objects prior to local share generation, ensuring conformance to a canonical encoding and share generation procedure.

Aggregation control operations exposed by the API enable authorized controllers to instantiate, schedule, and terminate aggregation rounds, select cohorts of participant nodes, configure time windows, set privacy or utility parameters (for example, contribution bounding or thresholding), and declare the set of aggregation servers participating in a given round. The API supports selection and configuration of the verifiable distributed aggregation function (VDAF) to be used for a round, including parameters governing proof generation and verification. It provides endpoints to start an aggregation epoch, to fetch status and progress of aggregation servers, to request retransmission or resharding of shares in the event of failures, and to retrieve aggregate results and associated proof objects produced by aggregation servers.

Security features of the API include mutual authentication of callers, role-based authorization, cryptographic signing of control messages, and transport confidentiality and integrity. The API provides audit logs and attestation records that capture schema publication events, aggregation control commands, server assignments, and proof verification outcomes. It supports key management operations required to bootstrap and rotate keys used in signing schemas and control messages and can integrate with hardware-backed key stores or secure enclaves for enhanced trust.

The API is extensible to support multiple VDAF implementations and optional modules such as differential-privacy noise injection, adaptive contribution bounding, and server-side verification checks. It enables cross-institution analytics by allowing organizational administrators to negotiate and approve schemas and aggregation plans without centralizing raw data, while enabling the collector node to verify provable correctness of aggregated metrics via the VDAF proofs (S2006) without access to reconstructable source data.

The schema specifies parameters used for share generation: field or ring choice, modulus q, number of aggregation servers n, threshold t, randomness sources, and any encoding or clipping rules. To prevent tampering and leakage in transit, shares are transmitted over authenticated, encrypted channels and can themselves be encrypted under per-session keys or wrapped with authenticated encryption; commitment and proof objects accompany each share to enable local validation by aggregation servers prior to inclusion in the VDAF. Verifiable sharing procedures detect malformed or inconsistent shares from malicious participants by checking commitments and proofs; upon validation failure, the aggregation server can reject the share and report the incident in accordance with the schema's error-handling rules.

Operational safeguards include server independence policies, remote attestation or auditing of aggregation servers, rate-limiting, and optional differential-privacy post-processing of aggregates to bound disclosure risk from repeated queries. Together, these measures ensure that raw or reconstructable source data remains exclusively at the originating participant node and that provable, verifiable aggregation is achieved by independently operated aggregation servers without centralized data collection.

The platform implements a combination of organizational, procedural, and technical measures to enable compliance with at least one of the following data privacy regulations: GDPR, HIPAA, and PSD2. Participant nodes S2000 convert sensitive source data into cryptographic shares and never transmit raw or reconstructable data; distribution of shares to independent aggregation servers S2002 and combination via a verifiable distributed aggregation function (VDAF) produces aggregate metrics while preserving data minimization and purpose limitation principles mandated by GDPR and HIPAA. Pseudonymization and strong cryptographic isolation of shares are applied by default; optional differential-privacy noise parameters and configurable aggregation domains enforce additional statistical disclosure control to meet regulatory requirements for de-identification and risk reduction.

A policy engine governs retention schedules, lawful-basis attributes, and consent metadata attached to each contribution. This engine records processing purpose, consent status, and retention periods in immutable audit logs accessible to authorized compliance agents and to the collector node S2004 for accountability and Article 30-style record keeping. The platform supports subject-access and portability requests by enabling data exporters at participant nodes S2000 to produce portable representations or to revoke future contributions; erasure requests are enforced by ceasing collection and purging locally stored raw inputs and cryptographic seeds in accordance with configured retention policies.

For HIPAA compliance, the platform provides mechanisms for de-identification or limited data set creation at participant nodes S2000, supports Business Associate Agreements, and enforces role-based access control, multifactor authentication, encrypted storage and transmission, and comprehensive audit trails. Logging includes time-stamped, non-repudiable proof objects produced by the VDAF (S2006) so auditors can verify aggregate correctness without access to PHI. Administrative and physical safeguards are supported through documented procedures for key management, incident response, and breach notification consistent with HIPAA timelines.

For PSD2 compliance, the platform supports strong customer authentication, secure API endpoints for consent and token exchange, and end-to-end TLS with mutual authentication between participant nodes S2000, aggregation servers S2002, and collector node S2004. Consent tokens and SCA assertions are attached to contributions and validated prior to aggregation; PSD2-specific logging and reporting facilitate regulatory audits and dispute resolution.

Cross-border transfer controls, contractual safeguards (e.g., Data Processing Agreements, SCCs), and deployment-time configuration allow operators to select and enforce the subset of controls required by GDPR, HIPAA, or PSD2. The verifiable proofs from aggregation servers S2002 enable independent verification by regulators or auditors while preserving confidentiality, enabling demonstrable compliance without centralized storage of raw personal data.

The platform is implemented as a distributed system deployed on a set of machines executing standard Go code and communicating over HTTP. Each participant node executes a compiled Go binary on a separate physical host, typically within a distinct organization, and retains raw sensitive source data locally. Prior to any network transmission, each participant node converts each sensitive input into cryptographic shares in accordance with a standardized aggregation schema. The standardized aggregation schema defines the aggregation domain, input encoding, the share generation procedure (for example, additive secret sharing, randomized encoding, or other share constructions), verification parameters, and allowable aggregation operations. Participant nodes encode inputs, apply the schema's share generation procedure to produce multiple non-reconstructable shares, and transmit different subsets of those shares to different aggregation servers using authenticated HTTP requests.

The platform is configured to process one or more aggregation functions selected from the group consisting of: sum, count, mean, ratio, and conditional count. Participant nodes locally encode each sensitive datum according to the standardized aggregation schema, which specifies the aggregation domain, fixed-point or integer encoding, value clipping and discretization boundaries, and a share generation procedure. For sum and count, each participant converts its encoded input into cryptographic shares that, when combined across a quorum of independent aggregation servers, algebraically yield the desired aggregate without exposing individual inputs. Count is implemented by encoding a presence indicator (1 or 0) per reporting event; sum is implemented by encoding the numeric value subject to clipping and scaling defined by the schema.

Mean is produced by running two parallel VDAF aggregations: one VDAF computes the sum of encoded values and another computes the count of contributing records. Each aggregation server combines its received shares for both aggregations to produce two provably correct aggregate metrics. The collector node verifies the proofs and computes mean as the quotient of the verified sum and verified count, with handling for zero-count denominators as specified by the schema. Ratio is produced similarly by computing two sums corresponding to numerator and denominator predicates or counts; the collector computes the ratio after verifying the respective VDAF proofs.

Conditional count is supported by encoding predicate evaluation locally at each participant node into a binary indicator share. The standardized aggregation schema defines the predicate language or parameterization (for example, threshold-based comparisons, categorical membership, or time-window constraints) and requires participant nodes to evaluate the predicate locally prior to share generation. The resulting indicator shares are aggregated via the same VDAF machinery used for count, producing a provably correct conditional count without revealing which participants satisfied the predicate.

The platform provides an analytics dashboard that visualizes aggregated results for authorized consortium members. The dashboard displays only summary aggregates and provable verification status indicators; it does not expose participant-level data or information that could be reconstructed to identify individual participants. Access to dashboard functionality is enforced via authentication and role-based authorization so that visualization privileges are restricted to consortium members with appropriate permissions. The dashboard enables interactive exploration of aggregates through filtering, time-series plots, and cohort-level drill-downs that maintain privacy constraints, and it supports export of verified aggregate reports. Audit logs capture access, verification events, and administrative actions to support accountability and regulatory compliance.

The architecture enables cross-institution analytics without centralized data storage: participant nodes can operate on separate physical hosts within distinct organizations while contributing to collective analytics that are provably correct and privacy-preserving. Mechanisms for fault tolerance, share retransmission, and aggregation server rotation are supported to maintain availability while preserving the cryptographic guarantees.

A developer software development kit (SDK) is provided to enable integration of the claimed platform into third-party applications, internet-of-things (IoT) devices, and software-as-a-service (SaaS) platforms. The SDK exposes client-side libraries and APIs that implement the standardized aggregation schema and the share generation procedure required for each participant node to locally convert sensitive source data into cryptographic shares. The SDK includes language bindings for common development environments (for example, but not limited to, C, C++, Rust, Java, JavaScript/TypeScript, Python) and a compact runtime targeted for resource-constrained IoT devices, allowing deployment on embedded processors and secure elements.

The SDK implements the input encoding, domain checks, data validation, and preprocessing steps described by the standardized aggregation schema to ensure conformity prior to share creation. It contains vetted cryptographic primitives and protocols for secret sharing, key derivation, and authenticated encryption that produce the cryptographic shares transmitted to the plurality of independent aggregation servers. The SDK supports hardware-backed key storage and optional integration with trusted execution environments (TEEs) for attested share generation, enabling remote attestation of local processing when required by a deployment.

Connectivity modules within the SDK manage secure, authenticated channels to aggregation servers, applying mutual TLS, certificate pinning, and heartbeat/retry logic to tolerate intermittent network connectivity typical of mobile and IoT environments. The SDK supports batching, rate-limiting, and adaptive sampling to minimize resource usage and control the volume of shares generated, while preserving the guarantees of the verifiable distributed aggregation function (VDAF). Logging and telemetry facilities are included to assist developers in debugging and performance tuning without exposing raw source data; logs are designed to avoid retention of reconstructable inputs.

Developer tooling supplied with the SDK comprises schema authoring utilities, local test harnesses that simulate aggregation server behavior, and a verifier library that allows developers to locally validate VDAF proof objects produced by aggregation servers or collectors. The tooling enables end-to-end testing of integration flows, provides example integrations for common SaaS patterns and IoT sensor pipelines, and supplies migration utilities for updating aggregation schemas or VDAF parameters across deployed participant nodes.

Operational management features include secure provisioning workflows for client identities and keys, mechanisms for certificate rotation, and compatibility with enterprise device management systems. The SDK supports configurable privacy parameters (for example thresholding, clipping, or optional differential privacy mechanisms) as determined by policy, enabling deployments to balance utility and privacy. Documentation, sample code, and compliance guidance accompany the SDK to facilitate adoption by third-party developers while ensuring that no raw or reconstructable source data is disclosed outside the originating participant node.

The platform supports multi-party aggregation for at least one use case selected from the group consisting of: financial benchmarking, healthcare outcome analytics, AI model telemetry, civic statistics, retail market analytics, and sustainability reporting. In such deployments, participant nodes (S2000) operate within independent organizations and locally convert sensitive source data into cryptographic shares in accordance with a standardized aggregation schema that specifies metric types (e.g., sums, counts, histograms, quantiles), input encodings, value ranges, quantization, and optional noise parameters. Each participant node enforces local policy and input validation before share generation to prevent malformed inputs and to ensure conformance with schema constraints.

For financial benchmarking, participant nodes map institution-level transaction summaries, risk exposures, or performance ratios into fixed-domain encodings and produce cryptographic shares that reveal only standardized contributions. Independent aggregation servers (S2002) receive complementary subsets of shares from multiple participants and execute verifiable distributed aggregation functions (VDAFs) to produce aggregate metrics such as median returns, percentile risk measures, or aggregated balance sheets. The VDAF outputs include concise proof objects that a collector node (S2004) can verify to confirm correctness and completeness without accessing raw data.

In healthcare outcome analytics, participant nodes retain patient-level records locally and convert outcome indicators, cohort counts, and summary statistics into shares that preserve clinical provenance while preventing re-identification. Aggregation servers combine shares to compute population-level outcome rates, survival curve summaries, or stratified statistics across care providers. The standardized schema ensures common definitions (e.g., diagnosis codes, time windows) and the VDAF enforces correctness even in presence of misbehaving aggregation servers by enabling the collector to detect inconsistencies.

For AI model telemetry and other use cases—civic statistics, retail market analytics, sustainability reporting—the platform supports domain-specific encodings, such as gradient or metric clipping for model telemetry or emissions categories for sustainability, so that aggregation yields actionable, provably correct insights (e.g., average model drift, city-wide census aggregates, market share distributions, total emissions) while preventing reconstruction of participants' raw inputs. Aggregation servers validate conformity of received shares prior to combination (S2004), and the collector node verifies VDAF proofs to obtain final aggregates. Optionally, post-aggregation mechanisms such as thresholding, differential-privacy noise addition, or result suppression are applied at the collector to satisfy legal or policy requirements. Throughout, no raw or reconstructable source data is revealed to any party other than the originating participant node, enabling cross-institution analytics (S600, S602) without centralized data storage.

The platform comprises a compliance module providing cryptographic proofs of privacy to regulators or auditors. The compliance module ingests the proof objects generated by aggregation servers and augments them with audit artifacts that demonstrate adherence to privacy policies and regulatory constraints without disclosing source data. Examples of cryptographic proofs include non-interactive zero-knowledge proofs that the VDAF was executed correctly, signed attestations that each participant conformed to input encodings and sampling policies, and proofs that any added noise satisfies declared differential privacy parameters. The compliance module verifies signatures and proof validity, timestamps audit events, and generates compact audit bundles containing verifiable commitments, verification keys, and metadata required for offline verification by auditors.

Regulators or auditors obtain audit bundles or query the compliance module via authenticated APIs. Verification is performed using public verification keys or compact public parameters; auditors can confirm that aggregations were computed over shares derived from participant nodes according to the standardized schema, that aggregation servers executed the VDAF as specified, and that privacy budget and differential privacy guarantees were met. To minimize extraneous disclosure, audit bundles omit reconstructable secrets and contain only commitments, zero-knowledge proofs, and cryptographic attestations. Optionally, the compliance module records indelible, privacy-preserving audit logs (e.g., signed commitments anchored to an append-only ledger) to support later forensic review while preventing raw data exposure.

Key management, role-based access control, and optional hardware-backed attestations (e.g., TPM or HSM signing of proofs) are employed to bind proofs to execution environments and to enable key rotation and revocation. Variations include threshold signing by multiple aggregation servers, alternative proof systems for different performance/privacy tradeoffs, and policy-configurable disclosure scopes for different regulator roles.

The platform is extensible to apply privacy-preserving analytics to any numeric, categorical, or count-based metric in future schemas by modularizing schema components and VDAF implementations. New metric types are supported by adding encoder modules, share-generation procedures, and corresponding VDAF algorithms registered in a schema registry; schema versioning and backward-compatible converters enable coordinated rollout across participant nodes and aggregation servers. A schema negotiation protocol ensures participants and aggregators agree on encoding parameters, domain bounds, and verification settings prior to data exchange. Collector nodes accept aggregation results accompanied by proof objects and metadata identifying the schema version and metric type, enabling automated verification and downstream interpretation.

Security and robustness measures include independent aggregation server deployment across distinct administrative domains to enable cross-institution analytics without centralized data storage, cryptographic authentication of participants and servers, replay protection, and audit logging of schema usage and aggregation events. Optional post-aggregation mechanisms, such as aggregation-level clipping or noise addition, can be specified in a schema to satisfy policy or regulatory constraints while preserving the provable correctness guarantees provided by the VDAF proofs.

Automatic Copyright Registration

In one embodiment, a copyright registration is provided. The Copyright Registration System ingests the training data that needs to be copyrighted. It extracts the first and last 10, 50 or 100 pages of the training data. The system prompts the user (the copyright applicant) to provide the required information for the copyright registration, such as: Full name, Address, Email, Phone number, Title of the work, Year of creation, Author information, among others. Using the extracted pages and the applicant information, the system automatically fills out the copyright registration form. The form fields include: Title of the work, Author information, Year of creation, Claimant information, Contact information. Once the form is filled out, the system uploads the completed copyright registration form to the copyrights.gov website. The system may also provide the user with a confirmation number or tracking information for the submission. The system sends a notification to the applicant confirming the successful submission of the copyright registration. The system may also periodically check the status of the registration and notify the applicant of any updates or requests from the copyright office. This system aims to simplify the copyright registration process for users by automating the tedious tasks of form filling and document submission, while ensuring the necessary information and materials are provided to the copyright office.

The copyright owner is a natural person, legal entity, or social institution that owns the copyright of the digital content. The copyright owner may be the creator of the digital content or may not be the creator of the digital content. Generally, the creator of digital content is the owner of the copyright, but when the copyright is transferred, the object to which the copyright is transferred is the owner of the copyright. Copyright owners may have full control over the copyright management of digital content, for example, controlling the creation and transfer of copyrights, and various types of products and licenses to create copyrights. Can be managed, licenses can be sent to various target users, and product destruction can be managed according to the commercial needs of the copyright owner.

Content distributors are organizations that provide content services to consumers and can distribute digital content to end consumers. Generally, the content distributor is a commercial organization dealing with digital contents, for example, a video dissemination organization, a literary work dissemination organization, or a music dissemination organization. In the present invention, the content distributor is also referred to as a distributor in some cases.

Digital content may include literary works, text, video, audio, animation, photography, flash, and the like. It should be noted that this specification only shows, but is not limited to, some general forms of digital content works.

Digital content copyright is the right that the copyright owner receives with respect to the digital content owned by the copyright owner. In general, copyright includes the right to use digital content (eg, the right to use it by the owner or the right to use it given to others) and the right to control it (eg, the right to transfer copyright). In the present invention, the digital content copyright is abbreviated as copyright. The copyright notice in the copyright registration may provide for ownership and a declaration of right for the digital content copyright. The copyright notice includes the identity of the copyright owner, a digital content identifier, a description of the copyright, the identity of the creator, and the address of the copyright owner. The copyright notice may further include the signature of the copyright owner. The copyright notice may further include basic information about the digital content and a description of the status of the copyright of the work. The creator's identity information may be the creator's personal referral. The basic information of digital content includes a brief description or rating of the digital content. A description of the status of a digital content right includes how to acquire the right, the status of the right to own it, and a description thereof. The copyright management client performs a hash operation on the digital content according to the hash algorithm to get the hash value of the raw data content, and then the hash value of the content according to the hash algorithm to get the digital content ID. And you can perform a hash calculation on the address of the current owner of the copyright. When the copyright owner of a data content changes, so does the digital content ID of the same data content. Regardless of how it changes, the digital content ID is obtained as a result of performing a hash calculation on the hash value of the raw data content and the address of the current owner of the copyright. The address of the copyright owner may be pre-generated or may be generated in the process of performing a rights management operation. The copyright owner may have multiple addresses.

Licenses for the use of digital content are the rules of the copyright owner's right to perform the use or distribution operation of the content on behalf of the consumer or content distributor, the address of the authorized object, the digital content. Includes decryption key and authorized digital content identifier. In the present invention, the digital content use license may be referred to as a license for short. In general, the rules of copyright owner's rights to perform the use or distribution operation of content on behalf of consumers or content distributors may also be referred to as permission information. Specifically, the authorization information can include operations permitted by the license, restrictions on operations by the license, and license distribution restrictions. In general, the address of an authorized object may also be referred to as the license address. The permission information has the following contents, that is, A. The types of operations that are allowed to be performed, such as play, view, run, print, or export, B.I. Content operation constraints, such as the number of operations allowed, the time the operation is allowed, or the geographic location where the content operation is allowed, and C.I. It may include a license distribution constraint that specifies whether the license is allowed to be distributed to others (consumers or other content distributors), and may also include the following distribution constraints: the number of distributions, the start of distribution: It may include time and end time, distribution period, and so on. Licenses issued to consumers are generally set to non-distributable (eg, the number of distributions is set to 0).

The product contains one or more digital content identifiers, prices, and license definitions. Copyright owners publish different products to different viewers and geographic locations as needed for their commercial needs to meet the demands of consumers and distributors. The license can inherit the definition of the license of the product. That is, the limitation of the license distributed to the consumer is the limitation by the definition of the license of the product.

A transaction has multiple forms of data structure (eg, table, file) and data structure data. More specifically, as shown by the data structure of FIG. 1, the transaction in the data structure includes a transaction version number, a transaction type, an input content (Input), and an output content (output). In general, one digital content has only one copyright, but multiple licenses can be derived based on one copyright. In this regard, copyright is used as the parent asset of the license. In some cases, as shown in FIG. 3, the digital content copyright ecosystem has a product concept. In this case, one digital content also has only one copyright, but multiple products may be derived based on one copyright. In this regard, copyright can be used as the parent asset of the product. Multiple licenses can be derived as well based on the product. In this regard, the product may be used as the parent asset of the license. The copyright management process allows you to perform four operations on an asset. (1) Add: The add operation is used to create an asset, and this operation is used to add only the root asset (the asset without the parent asset), for example, to add a copyright asset. To. (2) Derivation: A derivation operation is used to create child assets, and this operation can be used to add only child assets, for example to derive product or licensed assets. (3) Transfer: The transfer operation is used to transfer the asset to the address of the new owner. For example, it is a copyright transfer operation. (4) Discard: The destroy operation is used by the owner to destroy the asset, the destroyed asset and its child assets are no longer valid, for example the product is destroyed.

Automatic Trade Secret Protection

As another parallel approach, the system sells the training data as a secret, where the system applies internal procedures to properly preserve the data as a secret, and where the smart contract includes non-disclosure agreement (NDA) terms: Secret Training Data Marketplace System. The system ingests the training data that needs to be sold as a secret. It applies various data anonymization and obfuscation techniques to preserve the confidentiality of the data, such as: Removing or hashing any personally identifiable information (PII), Aggregating or generalizing sensitive data points, Introducing controlled noise or perturbations to the data. The system generates a smart contract that governs the sale and usage of the secret training data. The smart contract includes the following NDA terms: Restrictions on the use of the data (e.g., no resale, no reverse engineering), Confidentiality obligations for the buyer, Penalties for breach of the NDA terms, Termination and data destruction clauses. The preprocessed training data is stored in a secure, encrypted manner, accessible only through the smart contract. The system implements robust access controls and logging mechanisms to ensure the data is only accessed by authorized parties and in accordance with the smart contract terms.

The system provides a marketplace interface where potential buyers can browse and purchase the secret training data. When a buyer expresses interest, the system verifies their identity and prompts them to review and agree to the smart contract terms. Upon acceptance of the smart contract, the buyer is granted secure access to the training data, and the transaction is recorded on the blockchain. The system continuously monitors the usage of the secret training data by the buyers to ensure compliance with the smart contract terms. In the event of a suspected breach, the system can initiate dispute resolution mechanisms, such as invoking the penalties defined in the smart contract or revoking the buyer's access. All transactions, smart contract deployments, and data access events are recorded on the blockchain, providing transparency and auditability for the entire process. The system allows authorized parties, such as regulators or independent auditors, to review the transaction history and verify the proper handling of the secret training data. In sum, the trade secret system: Preserves the confidentiality of the training data through advanced data preprocessing techniques; Enforces NDA terms through smart contracts, ensuring the proper use and protection of the secret data; Secure storage and access controls to prevent unauthorized access or misuse of the data; and Provide Transparent and auditable transaction history on the blockchain and Automated monitoring and enforcement of the smart contract terms to maintain data secrecy. This system aims to enable the secure and compliant sale of sensitive training data as a trade secret, leveraging blockchain technology and smart contracts to ensure the proper handling and protection of the data throughout the transaction lifecycle.

The above mentioned AI training data recordation method is transparent (As it can be viewed by various (usually all) participants of the blockchain network (and even other computers that are coupled to the blockchain network) smart contracts in a blockchain network in which the content of the smart contract and any transaction according to the smart contracts), and dramatically reduces the computer resources that should allocated with the transactions between different coins, and provides a robust system for AI training data searches, registration, brokering, transfers, and exchange (as it does not have a single point of failure).

In one embodiment of the present invention, a registry ("DataFair Registry") is used to record information regarding AI training data on the blockchain. Each AI training data asset has an owner. The owner—also called the "contributor" when the data is in the contribution stage and the "assignee" once the data is accepted—is encouraged, but not required, to file an assignment record with the various data providers to serve as evidence of ownership. These assignment databases are run by organizations that receive the assignment information by electronic filing—which then take time to record and become publicly available.

The DataFair Network allows a user to create an account, with which the user can register AI training data. The user's information is then used by the DataFair Network to create an account on the blockchain. This account has an address that is relayed back to the DataFair Network. At any time, DataFair can request verification information from the data contributor.

Independently, a third-party seeking information on a particular AI training data asset can deploy a smart contract, which seeks the identity of the owner of that data asset. The DataFair request will automatically feed that information regarding the identity back to the smart contract.

The DataFair Platform allows users to update the blockchain using a Data Catalog Contract. The user seeking to add AI training data to the catalog can use the DApp to initiate a smart contract known as the Data Catalog Contract that will update the blockchain with respect to that new data stored in the new data contract. Each AI training data asset has an individual address that is verified and sent back to the user for safe keeping.

The DataFair Network is powered by smart contracts. Using Blockchain technologies, the DataFair Network and the DataFair Registry will be accessible as a decentralized application (DApp) that allows each party to an AI training data transaction—including the owner, licensee, buyer, broker and others—to sign off on a transaction for the data asset. The workflow of the processes will be built to meet the current rules within the legacy registry system currently in use by various data providers.

The blockchain method can be utilized by various stakeholders. The present invention may include a unified and connected view of all AI training data information, workflows and tasks using the blockchain network. Each user will have the ability to register the AI training data while others can view those registrations.

The DataFair Network can be maintained by a central organization, and run by various stakeholders. Each of those stakeholders can receive funding in the form of virtual currency or FIAT currency in the form of commission revenue from AI training data transactions, registration fees, and services revenue.

The DataFair platform can provide a crowd source purchasing of AI training data for individual owners seeking to raise funding.

The network is configured to autonomously use historical data to draft concise descriptions of the asserted relevance of submitted AI training data.

The network is configured to allow for smart contracts to conduct examination of AI training data applications.

The network is configured to allow for an examiner to directly examine AI training data applications using historical and other data.

The network is configured to provide insight using historical data as to gaining revenue off AI training data, minimizing overhead expenses related to AI training data registration, obtaining venture capitalist funds, rewarding and incentivizing data contributors, and tracking competitors.

The stakeholders can be intermediaries that help maintain various aspects of the network, providing services such as innovation support, AI training data portfolio support, intelligence, search, watch, docketing, forecasting, filing, recordals, and analytics.

In one aspect, a method for registering, recording, searching, or managing intellectual property on a network, the network comprising a server, the server comprising at least one hardware processor and a non-transitory machine-readable storage medium, the method comprising: receiving at least one user input regarding at least one intellectual property asset; and validating the user identity in connection with the intellectual property asset. Implementations can include:

a. wherein the network is further configured as a distributed network.

b. wherein the network is further configured as a blockchain network.

c. wherein the network is configured to allow categorical searching of intellectual property assets.

d. wherein the network is capable of storing data regarding intellectual property asset values.

e. wherein the network is further capable of allowing communication between at least two stakeholders.

f. wherein the network is capable of analyzing and storing information regarding the at least two stakeholders.

g. wherein each of the at least two stakeholders can define the terms governing the distribution of an intellectual property asset.

h. wherein each of the at least two stakeholders can define the amount of the reward.

i. wherein the reward is distributed to a digital wallet.

j. further configured to allow payment of any governmental fee.

k. further configured to allow payment of any private intermediary fee, including a law firm, patent searcher, or patent broker fees.

l. further configured to apply for patent applications.

m. further configured to apply for trademarks.

n. further configured to apply for copyrights.

o. further configured to register domain names.

p. further configured to accept evidence of trademark use.

q. further configured such that at least one intermediary may upload IP search reports or patent valuation reports for sale.

further configured such that at least one user can request IP search reports or patent valuations from at least one intermediaries.

further configured to record licensee exclusions.

In one implementation, the system includes server and client components that work together to provide secure authentication. The server component includes modules for registration, tweak generation, key tweaking, and signature verification, along with a key database for storing user public keys. The client component has modules for key generation, key tweaking, and signature generation, as well as secure private key storage.

During the registration process, the client generates a private/public key pair and sends the public key to the server along with the user's identifying information. The server applies a cryptographic hash function to the public key and user identifiers to derive a unique tweak value. It then applies this tweak to the stored public key using an elliptic curve point addition operation, generating a tweaked public key that is stored associated with the user's account.

For authentication, the server generates a new random tweak and challenge for that specific session and transmits them to the client. The client applies the received tweak to its stored private key to compute a tweaked private key. It then uses this tweaked private key with the ECDSA algorithm to digitally sign the received challenge, generating a signature that is sent back to the server.

On the server side, the same per-session tweak is applied to the previously stored tweaked public key to generate a double-tweaked public key. The server then verifies the received signature against this double-tweaked public key and the supplied challenge using the ECDSA verification algorithm. If the signature is validated, the user is granted access.

The system performs dynamically tweaking both the public and private keys per authentication session using the server-generated random tweaks. This prevents replay attacks by ensuring the keys are different each time. Even if an attacker obtains the original public key, they cannot generate a valid signature without knowing the per-session tweak. The tweaked keys can be ephemerally stored and discarded after use for enhanced security.

The system is enabled by disclosing multiple means of generating the tweaks, such as via cryptographic hashes, key exchange protocols like Diffie-Hellman, or secure random number generators. Overall, the dynamic key tweaking approach enhances the security of ECDSA authentication against key theft and replay attacks.

The architecture consists of three main components:

Client: Manages cryptographic keys, applies serverprovided tweaks, and signs challenges.

Server: Generates and sends unique tweaks and challenges, applies tweaks to the public key, and verifies client signatures. In our example web application, tweaks and challenges were simply displayed in the UI; however, these can be sent via MFA methods, or even using a hybrid system, where both the client and the server use ECDH to create and share a tweak which can be used for the session.

Authentication Flow: Involves key registration, tweak and challenge generation, signature creation, and verification processes.

The authentication process outlined below integrates key registration, tweak and challenge generation, signature creation, and verification processes. This multi-step approach ensures robust security measures are in place to prevent unauthorized access and enhance the integrity of the system.

1) Registration Process: Users initiate the registration by submitting their public key along with identifying information such as their email address. The server then performs the following steps:

Generates a unique tweak using the user's public key and additional identifiers (e.g., email address).

Applies this tweak to the public key to create a tweaked version of the key.

Stores the tweaked public key in the database instead of the original. This approach ensures that the original public key is not directly stored, enhancing privacy and security.

2) Tweak and Challenge Generation: Upon a login request, the server generates a session-specific tweak and a cryptographic challenge. This tweak is derived using a secure, predetermined method that both the server and client can independently compute.

3) Signature Creation: The client applies the sessionspecific tweak to their private key and uses this tweaked private key to sign the challenge.

4) Verification Process: The server applies the same session-specific tweak to the stored public key and uses the resulting tweaked public key to verify the signature. If the verification is successful, it confirms the authenticity of the client and grants access.

This diagram, shown in FIG. 1, provides a visual representation of the complete authentication flow, enhancing the understanding of the registration process and the dynamics of tweak and challenge distribution. Each component's role is critical in ensuring the security and efficiency of the authentication process.

By storing only the tweaked version of the public key, the system ensures that the original key remains confidential and that the authentication process can be securely managed without exposing sensitive user information. This method also allows for the verification of the public key without direct storage, akin to hashing but with the added ability to dynamically verify through cryptographic operations.

At the core of the system is ECDSA, a public-key cryptography algorithm essential for generating digital signatures. The security of ECDSA is based on the elliptic curve discrete logarithm problem (ECDLP), making it extremely difficult to derive the private key from the public key.

A "tweak" is a server-generated value applied to both the user's public and private keys, modifying them securely for each session.

Tweak Generation: The server creates a unique tweak using a secure random number generator.

Application to Public Key: The server applies the tweak to the public key through an elliptic curve point addition, resulting in a tweaked public key.

Given a public key P, and a message m, the process of tweaking the public key can be represented mathematically as:

$$P_{tweaked} = P + H(P \| m) \cdot G$$

Where:

P represents the original public key.

m is the message used for the tweak.

‖ denotes the concatenation operation.

H(·) represents the SHA-256 hash function, applied to the concatenation of the public key P and the message m, producing a scalar.

G is the generator point of the elliptic curve used (in this case, secp256k1).

H(P‖m) computes the SHA-256 hash of the concatenation of P and m, which is then converted into an integer scalar.

This scalar is then multiplied by the generator point G of the elliptic curve, where the resulting point is added to the original public key P, producing the tweaked public key $P_{tweaked}$.

Tweaking Private Key: The user then applies the tweak to their private key d.

The tweaking of the private key can be described mathematically as follows:

Given a private key d, and a message m, the process of tweaking the private key can be represented mathematically as:

$$d=(d+H(P\|m))\bmod n$$

Where:

d represents the original private key.

P is the public key corresponding to the private key d.

m is the message used for the tweak.

∥ denotes the concatenation operation.

H(·) represents the SHA-256 hash function, applied to the concatenation of the public key P and the message m, producing a scalar.

n is the order of the elliptic curve used (secp256k1).

The result d' represents the tweaked private key.

Incorporating a key tweaking mechanism into the ECDSA framework significantly enhances the authentication system's security posture. This advancement not only aligns with the evolving landscape of digital security threats but also introduces a nuanced approach to safeguarding cryptographic keys. The subsequent discourse elaborates on the implications this has on the overarching security paradigms.

1) Enhanced Security Against Key Exposure: The dynamic nature of the key tweaking mechanism introduces an essential layer of security:

Session-Specific Security: By employing a uniquely tweaked private key for each session, the potential damage from key exposure is drastically limited. An adversary's access to a session-specific tweaked key does not compromise the integrity of other sessions (past or future) nor the original private key, thereby encapsulating the breach within the confines of a predefined window.

Implementation of forward and backward secrecy: The system inherently supports the principles of forward and backward secrecy. The exposure of a single session tweaked key neither compromises the original private key nor facilitates access to other session keys, provided the tweak remains confidential.

2) Predictive and Collision Attacks: The unpredictability introduced through nonce-based key tweaking, coupled with the application of a secure cryptographic hash function, strengthens the system against a spectrum of predictive and collision-based threats:

Unpredictability: The reliance on securely generated nonces and the inherent properties of the hash function (SHA-256) ensure that each tweak is indistinguishable from a 'truly random value'. This feature effectively mitigates any pre-computation benefits that could be exploited by a bad actor, who could otherwise effectively try to compute multiple tweaked public keys to leverage for nefarious reasons.

Mitigation of Collision Risks: By hashing the nonce along with the public key to generate the tweak, we reduce the probability of a collision occurrence even further than if we were using the nonce as input for the hashing function alone.

3) Operational Considerations for Deployment: The enhancement of security through key tweaking is balanced with pragmatic considerations to ensure seamless integration into existing systems:

Optimization of Key Tweaking Operations: The introduction of additional computational steps necessitates a careful optimisation strategy. This includes streamlining hash function computations and elliptic curve operations to minimize latency and maintain system responsiveness. · Management of Nonces: The foundation of the tweaking mechanism's security lies in the effective generation and handling of nonces. Protocols must be established for the secure generation, usage, and eventual disposal of nonces, mitigating potential vulnerabilities from poor handling.

The transmission or derivation (cooperative) of the tweaks themselves in a secure manner can be achieved in the following ways: A hash-based one-time password (OTP) allows both parties to independently compute the tweak t=Hash(secret∥counter), by synchronizing their operations while preserving confidentiality. This mechanism eliminates the need for a secure channel to transmit tweaking information, as the tweaks are calculated locally by each party. In adapting the DH exchange for ECDSA key tweaking, the shared secret s generated through this process serves as the tweak (t). The application of this tweak to both the public and private components of the ECDSA key pair is as follows:

The public key P, expressed as a point on the elliptic curve, is tweaked by adding to it the product of the shared secret and the curve's generator point: $P_{tweaked}=P+s\cdot G$.

Correspondingly, the private key d is adjusted by adding the shared secret modulo the order of the generator point: $d_{tweaked}=d+s$ mod n.

This procedure ensures that the tweak, derived from the shared secret s, is intimately tied to the unique DH exchange between the two parties. As a consequence, it inherits the DH protocol's established security properties, including resistance to eavesdropping and man-in-the-middle attacks. Moreover, by embedding this shared secret within the ECDSA keys themselves, the authentication process acquires an additional layer of cryptographic protection, rendering it significantly more resilient against a spectrum of potential attacks. The use of the ECDH method also provides a mechanism to ensure the Tweaks are unique, and are not transmitted directly.

ECIES (Elliptic Curve Integrated Encryption Scheme) To enhance the security framework within our ECDSA authentication system, particularly when transmitting tweaks, we can also harness the Elliptic Curve Integrated Encryption Scheme (ECIES). This methodology ensures that tweaks, although transmitted through potentially less secure channels such as a user interface (UI), remain confidential and accessible solely to the intended recipient. This process ensures that the encrypted tweak can only be decrypted by the holder of the corresponding private key, thus maintaining the tweak's confidentiality during transmission.

The procedure involves:

1) Encryption Phase: Utilising the recipient's public key, the tweak is encrypted, yielding a cipher that incorporates both the encrypted data and the symmetric key used for the encryption. This allows the entire payload to be securely transmitted to the recipient without exposing the tweak.

2) Transmission Phase: The encrypted tweak, now a cipher, is encoded into a Base64 string facilitating its transmission over less secure channels, such as a web-based UI, without compromising its integrity.

3) Decryption Phase: The intended recipient, now possessing the corresponding private key, decrypts the Base64encoded cipher. This decryption not only reveals the original clear text tweak but also validates the recipient's exclusive ability to access and apply the tweak, given their possession of the private key and is applied: parallel and sequential. Each mode offers unique advantages and suits different security and operational requirements.

Parallel Key Tweaking: In this mode, each tweak is applied directly to the base public key for generating the tweaked public keys. This approach ensures that the tweaks remain independent of one another, making it straightforward to manage and verify keys without the need for tracking the history of applied tweaks.

Sequential Tweaking: Offers enhanced security by embedding a historical dependency within the key chain, making it more resilient to attacks that rely on the predictability and independence of authentication attempts. It is well-suited for systems where the integrity of the entire authentication sequence is critical.

Choosing between parallel and sequential key tweaking modes depends on the specific requirements of the application, including considerations for security, performance, and operational complexity.

Implementations may also explore hybrid approaches, selectively applying each mode based on the context of use to optimise for both security and efficiency.

The system employs a traditional Digital Signature challenge-response mechanism which is enhanced by key tweaking:

Registration: Users provide their public key for server storage.

Login Attempt: Users initiate authentication by requesting a login.

Tweak and Challenge Generation: The server creates a unique tweak and challenge, sending both to the client.

Signature Creation: The client signs the challenge with the tweaked private key.

Verification: The server verifies the client's signature, ensuring authenticity and integrity.

This process guarantees the uniqueness and security of each session, substantially improving the system's defense against replay attacks, private key leaks, and unauthorized access.

The authentication system can operate in two distinct modes of operation based on how the key tweaking A. Integrity and Security of Tweaked ECC Keys 1) Theoretical Foundations of Key Tweaking: ECC security is predicated on the intractability of the Elliptic Curve Discrete Logarithm Problem (ECDLP), which remains unchanged even when keys undergo the process of cryptographic key tweaking. The operation of key tweaking involves the deterministic modification of ECC keys using arbitrary information, yet it preserves the computational hardness of ECDLP for the resultant tweaked keys.

2) Mathematical proof of the security of Tweaked Keys: The public key P, which is derived from the private key d, can be tweaked using a scalar t derived from a hash function. The tweaked public key P' is calculated as:

$$P'=P+tG$$

where G is the base point of the curve. Similarly, the private key d is tweaked by adding the scalar t directly:

$$d'=(d+t)\bmod n$$

where n is the order of the curve.

3) Resistance to Manipulation: The SHA-256 hash function's properties, which are used to generate t, mitigate the implications of non-random or adversarial chosen tweaks. Assuming the hash function behaves as a random oracle (RO), the output t is indistinguishable from random.

4) Indistinguishably and Uniqueness: For each tweaked key pair (d',P') these are unique and indistinguishable from any other secp256k1 key pair without possessing both the original key and tweak used to generate it.

5) Security Proof of the Tweaked Key System: Given the ECDSA system's reliance on the Elliptic Curve Discrete Logarithm Problem (ECDLP) for its security, we demonstrate that introducing a tweak based on a secure nonce and hash function does not weaken that inherent assurance. we assume the hash function H used for generating the tweak is a cryptographic hash function exhibiting properties of pre-image resistance, second pre-image resistance, and resistance to collision. In our example, we'll assume the use of SHA256.

Theorem: If a bad actor A can compromise the tweaked ECDSA system with non-negligible probability $\epsilon$, then a solver B can be constructed that solves the ECDLP with nonnegligible probability $\epsilon'$.

Proof: Consider an bad actor A that claims to derive the original private key d from the tweaked public key $P_{tweaked}$. Our objective is to use A's strategy to solve the ECDLP, thereby proving that breaking the tweaked system is 'at least as hard' as solving the underlying ECDLP.

Given P=dG and a tweaked version $P_{tweaked}=P+T\cdot G$, where T=H(nonce‖P) and G is the generator point of the elliptic curve, the task is to find d given $P_{tweaked}$.

1) B initializes the attack by selecting a random nonce and computing T=H(nonce‖Q), where Q is the ECDLP challenge, simulating the tweak generation process.

2) B then computes $Q_{tweaked}=Q+T\cdot G$, forging the tweaked public key creation.

3) Given $Q_{tweaked}$, A attempts to find the corresponding private key d. If A is successful, B uses this information to reverse the tweaking process.

4) B calculates d=d−T mod q, where q is the order of the point G, effectively solving the ECDLP for Q =dG.

This reduction shows that if an bad actor A can effectively compromise the tweaked key system, such capability implies the existence of a method to solve the ECDLP, given the cryptographic strength of the hash function H and the secure generation of nonce. Therefore the probabilities $\epsilon$ and $\epsilon'$ are linked by the computational complexities of A's attack and the ECDLP itself, reflecting the security equivalence between solving the ECDLP and breaking the tweaked system under our understanding.

The key tweaking mechanism introduces several security benefits that mitigate the threats outlined in the threat model:

Mitigation of Replay Attacks: By incorporating a unique tweak for each authentication session, the system ensures that captured authentication data (e.g., signatures) cannot be reused by attackers, as the underlying keys change with each session.

Enhanced Protection against Key Theft: Even if a private key is compromised, the dynamic nature of the tweaked keys limits the timeframe in which the stolen key can be used for unauthorized access. The attacker would also need the specific tweak applied during the authentication attempt, which is not reusable in subsequent sessions.

Resistance to MitM Attacks: The use of unique, session-specific tweaks and challenges complicates MitM attacks, as the attacker cannot generate valid responses without access to the dynamically tweaked private key.

Reduced Risk from Side-Channel Attacks: Since the private key is tweaked for each session, side-channel attacks that rely on observing operations involving the static private key are less likely to succeed, as they would provide information relevant only to a single session.

Compared to traditional ECDSA authentication mechanisms, the system offers significantly enhanced security features:

Dynamic vs. Static Keys: Traditional ECDSA uses static key pairs, making it susceptible to attacks if the private key is compromised. Our system's use of dynamic key tweaking for each session significantly reduces this vulnerability.

Session Uniqueness: Traditional systems do not inherently ensure the uniqueness of each authentication session, making them more vulnerable to replay attacks. The system's requirement for a unique tweak and challenge for each session inherently defends against such attacks.

Integrated Multi-Factor Authentication: While traditional ECDSA systems may require additional layers or external systems to implement MFA, the system integrates an additional authentication factor (the tweak) directly into the cryptographic process, enhancing security without added tangible complexity for the user.

The implementation of the system can be done through a UI-based web application. This section details the key components of the implementation, focusing on the integration of the cryptographic key tweaking mechanism and the challenge-response protocol. The Python ecdsa library plays a pivotal role in facilitating the cryptographic operations.

The web application is structured to provide endpoints for user registration, login, and authentication, leveraging sessions for state management between the client and server. The key aspects of the code include:

User Registration and Public Key Storage: Users register by submitting their public key to the server via a registration form. The server stores these keys in a database for future authentication attempts.

Tweak and Challenge Generation: Upon initiating a login attempt, the server generates a unique tweak and a cryptographic challenge. These are sent to the client as part of the login process.

Application of Tweak: The server tweaks the stored public key, while the client applies the same tweak to their private key. Once the server receives the signature, it checks it against the tweaked public key, rather than the original.

ECDSA Library (Python ecdsa): The ecdsa library is used for all cryptographic operations in this proof of concept, including key generation, signing, and verification. This library provides a straightforward interface for working with keys and signatures, enabling the application of tweaks to keys and the verification of signatures.

Tweak and Challenge Handling: The server's generation of tweaks and challenges is implemented using Python's secrets module to ensure cryptographic strength. The hashlib module is employed to hash the challenge, ensuring its integrity during transmission and verification.

The Application Flow is Detailed Next.

1) Registration Phase:

Users generate an secp256k1 key pair on their client device and submit the public key to the server for registration. In production, a signature verification step would be prudent for additional security.

After receiving the public key, the server stores it for future authentication attempts.

2) Login Phase: label=)

a) Server generates a unique tweak and challenge for the login attempt.

b) These are sent to the user, who then applies the tweak to their private key and signs the challenge.

c) The user submits this signature back to the server as proof of identity.

d) The server verifies the signature against the stored, tweaked public key. If the signature is valid, authentication is successful; otherwise, access is denied.

The implementation leverages several key technologies:

Web Server: Manages routing, sessions, and the server-client interface.

ECDSA Library: Facilitates core cryptographic operations, including working with secp256k1 keys and signatures.

Hashlib and Secrets: Used for secure hash generation and cryptographic randomness, ensuring the security of the tweak and challenge values.

The evaluation of the authentication system focuses on its potential performance, usability, and scalability, critical factors determining its viability for real-world applications. This analysis draws from the implementation of the system as a UI-based web application, considering the practical implications of integrating cryptographic key tweaking into the ECDSA authentication process holistically. The introduction of a key tweaking mechanism into the authentication flow adds computational overhead compared to traditional ECDSA authentication. This overhead primarily arises from:

Tweaking Operations: Both the server and client perform additional cryptographic operations to apply the tweak to the public and private keys, respectively. However, given the efficiency of elliptic curve operations and the computational capabilities of modern hardware, this overhead is relatively small.

Signature Verification: The process of verifying a signature against a tweaked public key does not differ in complexity from standard ECDSA verification. The primary computational cost lies in the initial application of the tweak to the stored public key.

From rough initial tests, the tweaking process is on the order of less than 1 millisecond on a small AWS EC2 instance, negligible for most authentication scenarios. However, performance may be a consideration in systems requiring extremely high throughput or in environments with constrained computational resources.

B. Usability

The system's impact on usability primarily concerns the user's interaction with cryptographic keys:

Key Generation and Management: Users generate a key pair once and register the public key with the server. The presence of key tweaking does not alter this process from the user's perspective, as the application of tweaks and generation of signatures can be seamlessly integrated into client-side software.

Transparency of Tweaking Process: For end-users, the key tweaking and challenge-response mechanism operates transparently. Users are not required to manually apply tweaks or alter their authentication behavior, ensuring that the system's enhanced security does not come at the expense of user experience.

Evaluating the system's scalability involves considering its performance under increasing loads, such as a growing number of users or authentication requests:

Server-Side Processing: The most significant scalability concern lies in the server's ability to generate unique tweaks and challenges and to apply tweaks to public keys for each authentication attempt. Efficient implementation and caching strategies can mitigate potential bottlenecks, ensuring that the system remains responsive as demand increases.

Database and Session Management: Storing and retrieving public keys and managing session-specific data (e.g., challenges and tweaks) require efficient database operations. The system's design should accommodate scalable storage solutions to handle growth in user registrations and concurrent authentication sessions.

The system, which integrates cryptographic key tweaking into ECDSA for enhanced security, represents a significant advancement in authentication technologies. This discussion reflects on the strengths and potential limitations of the approach and explores its applicability in various domains beyond the initial proof of concept. Advantages of the system may include the following:

Enhanced Security: The primary strength of the system lies in its ability to mitigate common attack vectors such as replay attacks and key theft. By dynamically modifying the cryptographic keys for each session, the system introduces a level of unpredictability and session specificity that significantly bolsters security.

Seamless Integration of MFA: Incorporating an additional factor of authentication directly into the cryptographic layer, without necessitating external MFA tools, simplifies the authentication process while enhancing security, offering a streamlined approach to multi-factor authentication.

Utilisation of Existing Cryptographic Standards: By building upon the well-established ECDSA framework and leveraging the homomorphic properties of elliptic curves, the system maintains compatibility with existing cryptographic infrastructures, facilitating adoption and integration.

Applications can Include the Following:

Blockchain Technologies: The system's approach to enhancing security through key tweaking has natural applications in blockchain and distributed ledger technologies, where security, non-repudiation, and resistance to various attack vectors are paramount. Integrating this authentication mechanism could enhance the security of transactions, smart contracts, and blockchain-based identity systems.

Internet of Things (IoT) Devices: IoT ecosystems, characterized by a multitude of devices with varying computational capabilities, stand to benefit from the enhanced security and efficient key management offered by the system. The lightweight nature of the key tweaking process, combined with its security benefits, makes it suitable for securing device-to-device communications and access control within IoT networks.

Secure Communications: The system could be applied to secure messaging and communication platforms, ensuring that each message or session is protected with uniquely tweaked cryptographic keys, thereby enhancing privacy and security against interception and unauthorized access.

Auditing and Non-repudiation: This system can also be used to embed meaningful data into keys, meaning they can be used as a means to tie specific events to a session, and embed this information directly into the keys. Actions involving signatures, or decryption, then inherently also carry the intent behind the action.

Indexing: Using a defined schema (or protocol standard), it is possible to use the embedded information in such a way as to create a robust indexing system, which can handle many thousands (even millions) of sharded file parts, while encoding additional information such as delta encoding, and versioning metadata.

Resilience of this solution against quantum threats by incorporating secure lattice-based key-exchange methods. Additionally, Quantum computers are expected to eventually break the Discrete Logarithm Problem (DLP) and, by extension, Elliptic Curve Cryptography (ECC). However, this quantum computational effort will still require significant resources and time, especially in the early stages of quantum computing. Initially, this effort might take days, hours, or even minutes. By dynamically adjusting the EECDSA system to operate within these computational windows, we can make it computationally infeasible or prohibitively expensive for quantum adversaries to break the authentication within the available timeframe.

Integration with Hardware Security Modules (HSMs) and Enclaves: Investigating how the key tweaking process can be integrated with HSMs or secure elements in devices to further secure the private key material against physical attacks.

Side-Channel Attack Mitigation: Developing techniques to harden the implementation against side-channel attacks, ensuring that the key tweaking and authentication processes do not leak sensitive information.

Decentralised Identity Systems: Applying the authentication system in decentralised identity frameworks to enhance security and integrity of identity claims.

Blockchain Interoperability: Exploring the use of the tweaked key authentication mechanism to enhance security in blockchain interoperability solutions.

Secure Multi-Party Computation (SMPC): Adapting the system for use in SMPC scenarios, where parties collaborate to compute a function over their inputs while keeping those inputs private.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method for with key tweaking, comprising:
at a server,
registering a user by receiving the user's public key and storing the public key;
upon a login attempt by the user, generating a unique tweak and challenge for the login session;
applying the tweak to the stored public key to generate a tweaked public key;
verifying a signature received from the user against the tweaked public key; and
granting access if the signature is successfully verified against the tweaked public key with the challenge;
at a client,
generating a private key and public key pair;
registering the public key with the server;
upon the login attempt, applying the tweak received from the server to the private key to generate a tweaked private key;
using the tweaked private key to sign the challenge received from the server to generate the signature; and
transmitting the signature to the server for verification against the tweaked public key.

2. The method of claim 1, wherein the tweak is generated by the server using a secure random number generator and a cryptographic hash function applied to the user's public key and additional identifiers.

3. The method of claim 1, wherein the step of applying the tweak to the stored public key comprises performing an elliptic curve point addition operation using the tweak as a scalar multiplier.

4. The method of claim 1, wherein the step of applying the tweak to the private key comprises adding the tweak to the private key modulo the order of the elliptic curve generator point.

5. The method of claim 1, wherein the challenge is a random value generated by the server using a secure random number generator.

6. The method of claim 1, wherein the signature is generated by the client using the Elliptic Curve Digital Signature Algorithm (ECDSA) with the tweaked private key.

7. The method of claim 1, wherein the verification of the signature comprises using the ECDSA verification algorithm with the tweaked public key.

8. The method of claim 1, wherein the tweak and challenge are transmitted to the client over a secure communication channel.

9. The method of claim 1, wherein the tweak is derived using a Diffie-Hellman key exchange between the server and the client.

10. The method of claim 1, wherein the tweaked public key is stored by the server in place of the original public key, and the original public key is not stored.

11. The method of claim 1, comprising storing versioned data on a blockchain network, including:

receiving an original public key from a user;

generating a series of derived public keys by applying a key tweaking process to the original public key, wherein each derived public key is associated with a specific version and part of the data;

storing each part of the data on the blockchain network using a corresponding derived public key;

storing metadata about one or more versions and parts in a root transaction on the blockchain network.

12. The method of claim 1, wherein the key tweaking process involves applying a cryptographic hash function to the original public key concatenated with version, part, and metadata information to produce a derived public key.

13. The method of claim 1, further comprising providing an API with endpoints for storing, retrieving, and managing the versioned data stored on the blockchain network.

14. The method of claim 1, wherein the metadata stored in the root transaction, includes a compact representation of the versions and parts using a versioning and indexing scheme.

15. The method of claim 1, wherein the user generates the derived public keys and associated addresses by applying a key tweaking process to their original private key, without having access to a private key.

16. The method of claim 1, further comprising providing encrypting the data before storing it on the blockchain network.

17. A method, further comprising:

at a server, registering a user by receiving the user's public key and storing the public key;

upon a login attempt by the user, generating a unique tweak and challenge for the login session;

applying the tweak to the stored public key to generate a tweaked public key;

verifying a signature received from the user against the tweaked public key; and granting access if the signature is successfully verified against the tweaked public key with the challenge;

at a client, generating a private key and public key pair;

registering the public key with the server;

upon the login attempt, applying the tweak received from the server to the private key to generate a tweaked private key;

using the tweaked private key to sign the challenge received from the server to generate the signature; and transmitting the signature to the server for verification against the tweaked public key;

utilizing adversarial question generation techniques to create benchmark tasks that specifically target known weaknesses in current language models, thereby ensuring continuous challenge and improvement opportunities;

providing a real-time feedback loop where human experts and users can flag model responses for review, facilitating immediate identification and correction of errors;

using a blockchain-based system to record expert contributions and ensure transparent, auditable, and incentivized data collection for improving language model performance.

18. The method of claim 17, wherein the benchmark tasks incorporate interdisciplinary challenges that require the integration of knowledge from multiple domains, such as combining mathematical reasoning with ethical decision-making or scientific knowledge with creative problem-solving.

19. The method of claim 17, further comprising providing a dynamic difficulty adjustment system within the benchmark that adapts the complexity of tasks based on the model's performance, ensuring a continuous and appropriate level of challenge.

* * * * *